United States Patent
Brown et al.

(10) Patent No.: US 12,027,779 B1
(45) Date of Patent: Jul. 2, 2024

(54) TWO-DIMENSIONAL PLANAR AND CROSSOVER-FREE BEAMFORMING NETWORK ARCHITECTURE

(71) Applicant: The Charles Stark Draper Laboratory, Inc., Cambridge, MA (US)

(72) Inventors: Julian A. Brown, Cambridge, MA (US); Benjamin F. Lane, Sherborn, MA (US); Hannah Clevenson, Cambridge, MA (US); Lucas D. Benney, Cambridge, MA (US); Michael G. Moebius, Arlington, MA (US); Robin M. A. Dawson, Watertown, MA (US); Steven J. Spector, Lexington, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 0 days.

(21) Appl. No.: 18/349,907

(22) Filed: Jul. 10, 2023

Related U.S. Application Data

(63) Continuation of application No. 17/407,755, filed on Aug. 20, 2021, now Pat. No. 11,699,862.

(60) Provisional application No. 63/068,667, filed on Aug. 21, 2020.

(51) Int. Cl.
*H01Q 3/40* (2006.01)

(52) U.S. Cl.
CPC ..................... *H01Q 3/40* (2013.01)

(58) Field of Classification Search
CPC ......... H01Q 3/40; H01Q 15/06; H01Q 25/008
See application file for complete search history.

(56) References Cited

U.S. PATENT DOCUMENTS

| | | | | |
|---|---|---|---|---|
| 2007/0257858 A1* | 11/2007 | Liu | ........................ | H01Q 1/246 343/893 |
| 2014/0328266 A1* | 11/2014 | Yu | ........................ | H04B 7/088 370/329 |

* cited by examiner

*Primary Examiner* — Daniel Munoz
(74) *Attorney, Agent, or Firm* — The Charles Stark Draper Laboratory, Inc.

(57) ABSTRACT

An antenna system has a two-dimensional field of view, yet can be implemented on a surface, such as on electronic or photonic integrated circuits. The antenna system includes an array of antennas disposed in a predetermined non-linear pattern and a two-dimensional beamforming network (BFN). The antenna system can be steered/selectively beamformed in two dimensions through beam port selection. The beamforming network is disposed entirely on a single first surface. The beamforming network has a one-dimensional array-side interface disposed on the first surface and a one-dimensional beam-side interface disposed on the first surface. The antennas of the array of antennas are individually communicably coupled to the array-side interface. Segments of the beam-side interface map to respective pixels in the two-dimensional field of view.

3 Claims, 45 Drawing Sheets
(16 of 45 Drawing Sheet(s) Filed in Color)

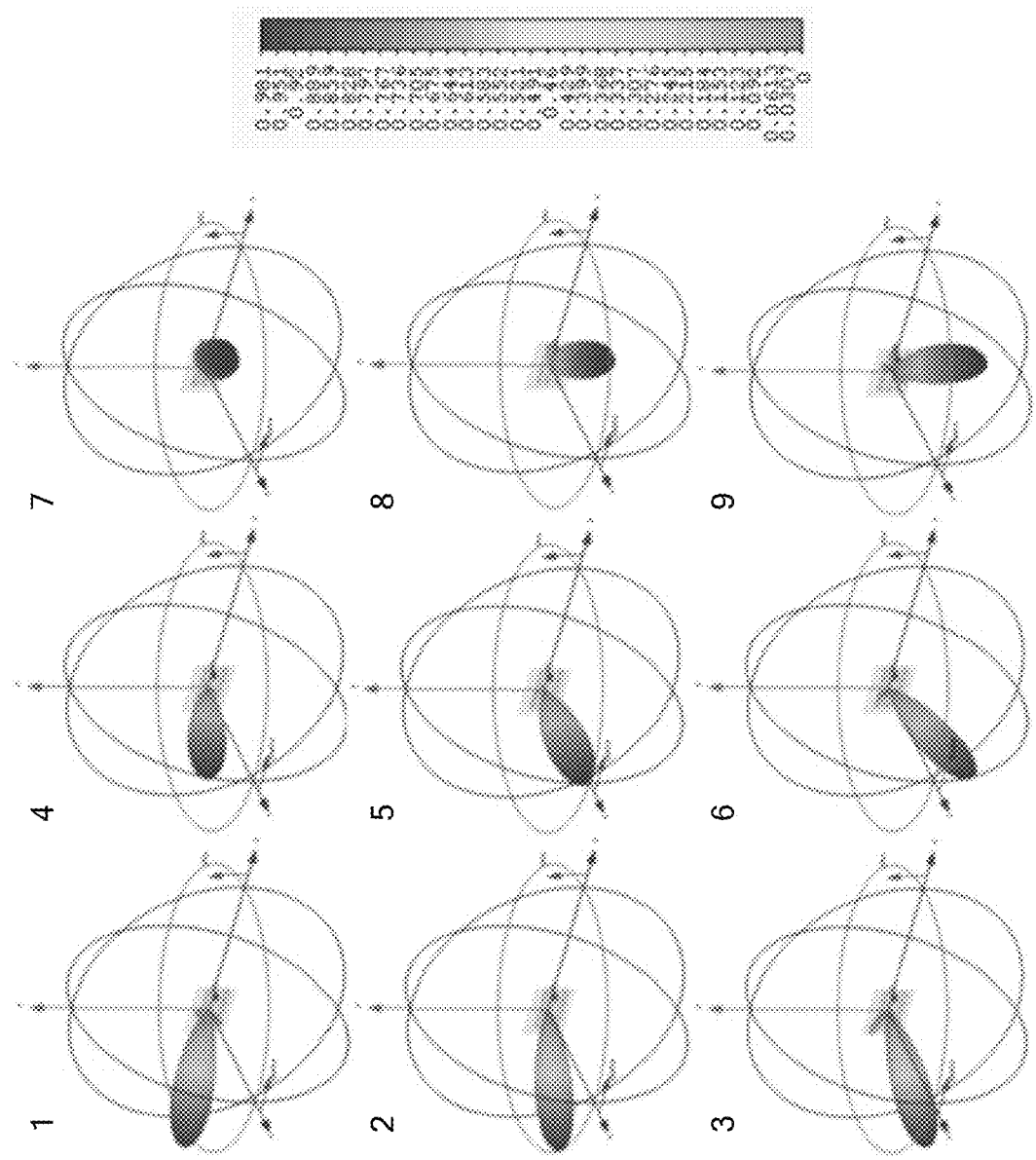
*Fig. 3 Continued* (Prior Art)

Table 2: Relative Path Delays Between First and Second Stage Beamforming Networks For a Regular 7x7 Antenna Array

| | Column -3 | Column -2 | Column -1 | Column 0 | Column +1 | Column +2 | Column +3 |
|---|---|---|---|---|---|---|---|
| Feedline -3 | -9 | -6 | -3 | 0 | +3 | +6 | +9 |
| Feedline -2 | -6 | -4 | -2 | 0 | +2 | +4 | +6 |
| Feedline -1 | -3 | -2 | -1 | 0 | +1 | +2 | 3 |
| Feedline 0 | 0 | 0 | 0 | 0 | 0 | 0 | 0 |
| Feedline +1 | +3 | +2 | +1 | 0 | -1 | -2 | -3 |
| Feedline +2 | +6 | +4 | +2 | 0 | -2 | -4 | -6 |
| Feedline +3 | +9 | +6 | +3 | 0 | -3 | -6 | -9 |

*Fig. 43*

TWO-DIMENSIONAL PLANAR AND CROSSOVER-FREE BEAMFORMING NETWORK ARCHITECTURE

CROSS-REFERENCE TO RELATED APPLICATIONS

This application is a continuation of U.S. patent application Ser. No. 17/407,755, filed Aug. 20, 2021, titled "Two-Dimensional Planar and Crossover-Free Beamforming Network Architecture," and claims the benefit of U.S. Provisional Patent Application No. 63/068,667, filed Aug. 21, 2020, titled "Two-Dimensional Planar and Crossover-Free Beamforming Network Architecture," the entire contents of each of which are hereby incorporated by reference herein, for all purposes.

BACKGROUND

Technical Field

The present invention relates to phased array antenna systems and, more particularly, to two-dimensional beamforming networks (BFN) for phased array antenna systems.

Related Art

Many systems need to emit or receive radio frequency (RF) signals or (humanly visible or invisible) collimated optical beams in directions that can be controlled with high precision. For example, such RF or optical beams are used in radio detection and ranging (RADAR) and light detection and ranging (LiDAR) systems, and often these beams need to be steered or swept in one or two dimensions to locate or track a target. Similarly, communications systems, such as fifth generation wireless communications technologies (5G), sometimes need to steer beams, such as to initially establish a line-of-sight communication channel between two terminals or if one or both of the terminals move.

Phased arrays of RF or optical antenna elements are commonly used in such systems to form electronically- or optically-steerable directional signal beams, i.e., without mechanical steering. One or more receivers, transmitters or transceivers are electrically or optically connected to an array of antenna elements via feedlines, such as optical fibers or coaxial cables. Taking a transmitter case as an example, the transmitter(s) operate such that the phase of the signal at each antenna element is separately controlled. Signals radiated by the various antenna elements constructively and destructively interfere with each other in the space (near field) in front of the antenna array. In directions where the signals constructively interfere, the signals are reinforced, whereas in directions where the signals destructively interfere, the signals are suppressed, thereby creating an effective radiation pattern of the entire array in the far field that favors a desired direction. The phases at the various antenna elements, and therefore the direction in which the antenna array's signal propagates, can be changed very quickly, thereby enabling such a system to be steered, for example to sweep over a range of directions.

According to the reciprocity theorem, a phased array of antenna elements can also be used to receive signals preferentially from a desired direction. By dynamically changing the phasing, a system can sweep over a range of directions to ascertain a direction from which a signal originates, i.e., a direction from which the signal's strength is maximum, or to steer a phased array toward a transmitting antenna or other signal source and/or away from interference (noise) sources.

Conventional electronic or optical circuits that control the phases of signals fed to, or received from, the antenna elements of a phased array are large and complex. A small, thin, and ideally planar, beamforming network (BFN), especially one that fits within a typical mobile telephone, that can electronically steer or differentiate one or more signals in two dimensions would be highly desirable. Thus, a problem with the prior art is how to build a small, thin, and ideally planar, beamforming network that can electronically or optically steer or differentiate one or more signals in two dimensions.

SUMMARY OF EMBODIMENTS

In the following summary, parenthetical reference numerals identify non-limiting exemplary elements described in this Application.

An embodiment of the present invention provides an antenna system. The antenna system includes an array (402) of antennas and a two-dimensional beamforming network (BFN) (420). The array (402) of antennas is disposed in a predetermined non-linear pattern (411). The array of antennas includes a plurality of antennas (404-410) and has a two-dimensional field of view (500). The two-dimensional beamforming network (BFN) (420) is disposed entirely on a single first surface (423). The two-dimensional beamforming network (BFN) (420) has a one-dimensional array-side interface (424) disposed on the first surface (423) and a one-dimensional beam-side interface (426) disposed on the first surface (423). The antennas (404-410) of the array (402) of antennas are individually communicably coupled (412-418) to the array-side interface (424), such that segments (428-432) of the beam-side interface (426) map to respective pixels (0-15) in the two-dimensional field of view (500).

Optionally, in any embodiment, the array (402) of antennas and the two-dimensional beamforming network (420) collectively form a true time delay system.

Optionally, in any embodiment, the one-dimensional array-side interface (424) is segmented.

Optionally, in any embodiment, the one-dimensional beam-side interface (426) is continuous.

Optionally, in any embodiment, the first surface (423) is planar.

An antenna system according to claim 1, wherein the first surface (423) is non-planar.

Optionally, in any embodiment, the first surface (423) is folded.

Optionally, in any embodiment, the predetermined non-linear pattern (411) defines a second surface (425) that extends smoothly from an edge of the first surface (423).

Optionally, in any embodiment that defines a second surface, the predetermined non-linear pattern (411) defines the second surface (425), and the array (402) of antennas (404-410) is communicably coupled to the array-side interface (424) via a crossover-free network disposed entirely on the first (423) and/or second (425) surface.

Optionally, in any embodiment, the predetermined non-linear pattern (411) defines a second surface (425), and the array (402) of antennas (404-410) comprises a plurality of disjoint sets (600-606) of antennas (404-410). Each disjoint set (600-606) of antennas (404-410) includes a plurality of antennas of the array (402) of antennas (404-410). For each disjoint set (600-606) of antennas, each antenna (404-410) of at least a non-empty subset of the disjoint set of antennas is perpendicularly displaced (608, 610) a respective distance (614) along the second surface (425) from a longitudinal axis (612) of a hypothetical linear array (700) of antennas disposed on the second surface (425).

Optionally, in any embodiment, the predetermined nonlinear pattern (411) defines a second surface (425), and the array (402) of antennas (404-410) includes a plurality of disjoint sets (600-606) of antennas. Each disjoint set (600-606) of antennas includes a plurality of antennas of the array (402) of antennas (404-410). For each disjoint set (600-606) of antennas, each antenna (404-410) of at least a non-empty subset of the disjoint set (600-606) of antennas is displaced a respective distance (614), measured along the second surface (425) and parallel to one dimension (616, 618) of the two-dimensional field of view (500), from a longitudinal axis (612) of a hypothetical linear array (700) of antennas disposed on the second surface (425).

Optionally, in any embodiment in which the array (402) of antennas (404-410) includes a plurality of disjoint sets (600-606) of antennas (404-410), the antenna system has a design wavelength λ. The plurality of disjoint sets (600-606) of antennas includes N disjoint sets of antennas. Within each disjoint set (600-606) of the antennas (404-410), the antennas (404-410) are spaced apart in a direction parallel to the longitudinal axis (612) of the hypothetical linear array (700) of antennas. Spacing between each pair of adjacent antennas (404-410) is an integral multiple of about 1/2λ. The antennas (404-410) are spaced apart in a direction perpendicular to the longitudinal axis (612) of the hypothetical linear array (700) of antennas.

Optionally, in any embodiment in which the array (402) of antennas (404-410) includes a plurality of disjoint sets (600-606) of antennas (404-410), the antenna system has a design wavelength λ. Within each disjoint set (600-606) of the antennas, the antennas (404-410) are spaced apart by respective integral multiples of (Δ/2) in the direction parallel to the longitudinal axis (612). The antennas (404-410) are spaced apart by respective integral multiples of (λ/2) in the direction perpendicular to the longitudinal axis (612).

Optionally, in any embodiment, the antenna system has a design wavelength between about 10 nanometers and about 1 millimeter.

Optionally, in any embodiment, the antenna system has a design wavelength between about 1 millimeter and about 100 meters.

Optionally, in any embodiment, the predetermined nonlinear pattern (411) defines a second surface (425). Each antenna (404-410) of the array (402) of antennas includes a grating coupler configured to optically couple to free space beyond the second surface (425) with a coupling efficiency of at least about 25%.

Optionally, in any embodiment, the two-dimensional beamforming network (420) includes a Rotman lens (422).

Optionally, in any embodiment, the two-dimensional beamforming network (420) includes a Fourier transformer.

Optionally, in any embodiment, the two-dimensional beamforming network (420) includes a Butler matrix.

Optionally, in any embodiment, the two-dimensional beamforming network (420) includes a single-stage beamforming network.

Optionally, in any embodiment, the two-dimensional beamforming network (420) includes a single Rotman lens (422).

Optionally, in any embodiment, the array (402) of antennas (404-410) includes N (N>1) disjoint sets (600-606) of antennas. Each disjoint set (600-606) of antennas includes a plurality of antennas (404-410) of the array (402) of antennas. The two-dimensional beamforming network (420) includes N first beamforming networks (2302, 2308-2312). Each first beamforming network is associated with a distinct set (600-606) of the antennas and has a beam-side interface (2322-2326) and a plurality of array-side ports (2328-2334). The array-side ports (2328-2334) of each first beamforming network (2302, 2308-2312) are individually communicably coupled to respective antennas (404-410) of the associated set of the antennas. The array-side ports (2328-2334) of the N first beamforming networks (2302, 2308-2312) thereby collectively form the one-dimensional array-side interface (424) of the two-dimensional beamforming network (420). The two-dimensional beamforming network (420) also includes N second beamforming networks (2304, 2314-2318). Each second beamforming network is associated with a distinct first beamforming network (2302, 2308-2312) and has an array-side interface (2346-2350) and a beam-side interface (2336-2340). The beam-side interface (2336-2340) of each second beamforming network is communicably coupled to the beam-side interface (2322-2326) of the associated first beamforming network (2302, 2308-2312). The two-dimensional beamforming network (420) also includes a third beamforming network (2320) having an array-side interface (2352) and a plurality of beam-side ports (2356-2360). The array-side interface (2346-2350) of each second beamforming network (2304, 2314-2318) is communicably coupled to a respective distinct portion of the array-side interface (2352) of the third beamforming network (2320). The plurality of beam-side ports (2356-2360) of the third beamforming network (2320) collectively forms the one-dimensional beam-side interface (426) of the two-dimensional beamforming network (420).

Optionally, in any embodiment in which the two-dimensional beamforming network (420) includes N first beamforming networks (2302, 2308-2312), N second beamforming networks (2304, 2314-2318), and a third beamforming network (2320), each first beamforming network (2302, 2308-2312) consists essentially of a respective one-dimensional beamforming network (2362-2364), each second beamforming network (2304, 2314-2318) consists essentially of a respective one-dimensional beamforming network (2366-2368), and the third beamforming network (2320) consists essentially of a distinct one-dimensional beamforming network (422).

Optionally, in any embodiment in which the two-dimensional beamforming network (420) includes N first beamforming networks (2302, 2308-2312), N second beamforming networks (2304, 23 14-2318), and a third beamforming network (2320), each first beamforming network (2302, 2308-2312) consists essentially of a respective Rotman lens (2362-2364), each second beamforming network (2304, 2314-2318) consists essentially of a respective Rotman lens (2366-2368), and the third beamforming network (2320) consists essentially of a distinct Rotman lens (422).

Optionally, in any embodiment in which the two-dimensional beamforming network (420) includes N first beamforming networks (2302, 2308-2312), N second beamforming networks (2304, 2314-2318), and a third beamforming network (2320), for each first beamforming network (2302, 2308-2312), the array-side ports (2328-2334) of the first beamforming network (2302, 2308-2312) are transversely ordered in a first order. The antennas (404-410) of the associated set of the antennas are transversely ordered in a second order. The antennas of the associated set of the antennas are individually communicably coupled to the respective array-side ports (2328-2334) such that the first order is opposite the second order.

Optionally, in any embodiment in which the two-dimensional beamforming network (420) includes N first beamforming networks (2302, 2308-2312), N second beamforming networks (2304, 2314-2318), and a third beamforming network (2320), the antenna system has a design wavelength $\lambda$. The beam-side interface (2336-2340) of each second beamforming network (2304, 2314-2318) is communicably coupled to the beam-side interface (2322-2326) of the associated first beamforming network (2302, 2308-23 12) by a respective associated first coupling (2342-2344, 2502-2508), thereby collectively defining a plurality of first couplings. Each non-central first coupling (2342-2344, 2502-2508) is configured to delay signals of wavelength $\lambda$ propagating therethrough by a respective relative delay amount. The delay amount varies monotonically transversely across the non-central first coupling (2342-2344, 2502-2508).

Optionally, in any embodiment in which each non-central first coupling (2342-2344, 2502-2508) is configured to delay signals of wavelength $\lambda$ propagating therethrough by a respective relative delay amount, each first beamforming network (2302, 2308-2312) is numbered with a unique integer j between $-[N/2]$ and $+[N/2]$. For each non-central first coupling (2342-2344, 2502-2508), the delay amount varies monotonically transversely across the non-central first coupling between about $+((N-1)/2)j\lambda$ and about $-((N-1)/\lambda)j\lambda$.

Optionally, in any embodiment in which the delay amount varies monotonically transversely across the non-central first coupling between about $+((N-1)/2)j\lambda$ and about $-((N-1)/2)j\lambda$, for each central first coupling, the relative delay amount is about zero.

Optionally, in any embodiment in which the delay amount varies monotonically transversely across the non-central first coupling between about $+((N-1)/2)j\lambda$ and about $-((N-1)/2)ja$, each first coupling (2342-2344, 2502-2508) includes a respective plurality of discrete waveguides.

Optionally, in any embodiment in which the delay amount varies monotonically transversely across the non-central first coupling between about $+((N-1)/2)j\lambda$ and about $-((N-1)/2)j\lambda$, for each first beamforming network (2302, 2308-2312), the set of the antennas associated with the first beamforming network (2302, 2308-2312) includes a respective number M of antennas. The associated first coupling includes M discrete waveguides.

Optionally, in any embodiment in which the delay amount varies monotonically transversely across the non-central first coupling between about $+((N-1)/2)j\lambda$ and about $-((N-1)/2)j\lambda$, each non-central first coupling (2342-2344, 2502-2508) includes a respective medium (4400) configured to delay signals propagating therethrough by a respective delay amount. The delay amount varies continuously transversely across the medium.

Optionally, in any embodiment, each dimension of a grating lobe-free two-dimensional field of view (502-508) includes a respective number of pixels. The two-dimensional beamforming network (420) includes a plurality of distinct elementary components. The two-dimensional beamforming network (420) is configured such that photons traverse, on average, a number of the distinct elementary components that is constant, with respect to the number of pixels along each dimension of the grating lobe-free field of view (502-508).

Another embodiment of the present invention provides an antenna system, the antenna system includes N second Fourier transform-based array phasers, and N third Fourier transform-based array phasers. Each second Fourier transform-based array phaser is associated with a distinct disjoint set of antennas and has a respective array-side interface and a respective beam-side interface. The antennas of each disjoint set of antennas are communicably coupled by respective non-crossing second couplings to the array-side interface of the associated second Fourier transform-based array phaser. Each third Fourier transform-based array phaser is associated with a distinct second Fourier transform-based array phaser and has a respective array-side interface and a respective beam-side interface. The beam-side interface of each third Fourier transform-based array phaser is communicably coupled to the beam-side interface of the corresponding second Fourier transform-based array phaser by a respective non-crossing third coupling. The array-side interface of each third Fourier transform-based array phaser is communicably coupled to the array-side interface of the first Fourier transform-based array phaser by a respective non-crossing fourth coupling. The non-crossing first coupling includes the non-crossing second couplings, the N second Fourier transform-based array phasers, the non-crossing third couplings, the N third Fourier transform-based array phasers, and the non-crossing fourth couplings.

Optionally, in any embodiment that includes N second Fourier transform-based array phasers and N third Fourier transform-based array phasers, each third coupling includes a respective distinct ordered plurality of third waveguides. Waveguides of each ordered plurality of third waveguides are configured to delay signals propagating therethrough by respective delay amounts. Each ordered plurality of third waveguides is configured such that the delay amount varies monotonically transversely across the ordered plurality of third waveguides.

Optionally, in any embodiment that includes N second Fourier transform-based array phasers and N third Fourier transform-based array phasers, each fourth coupling includes a respective distinct ordered plurality of fourth waveguides. Waveguides of each ordered plurality of fourth waveguides are configured to delay signals propagating therethrough by respective delay amounts. Each ordered plurality of fourth waveguides is configured such that the delay amount varies monotonically transversely across the ordered plurality of fourth waveguides.

Yet another embodiment of the present invention provides an antenna system. The antenna system includes a first 2-D beamforming network (BFN) and an array of antennas. The first 2-D BEN is disposed on a surface and has an array-side interface and a beam-side interface. The array of antennas is disposed in a predetermined non-linear pattern on the surface and has a two-dimensional field of view. Antennas of the array of antennas are individually communicably coupled to the array-side interface of the first BFN coupling disposed on the surface. Segments of the beam-side interface map to respective pixels in the two-dimensional field of view.

Optionally, in any embodiment with a non-crossing first coupling, the non-crossing first coupling includes a plurality of first waveguides.

Optionally, in any embodiment with a first waveguide, each first waveguide is configured to provide an equal path length.

Yet another embodiment of the present invention provides an antenna system. The antenna system includes an array of antennas and N first Rotman lenses. The array of antennas is disposed in a predetermined non-linear pattern and has a field of view. The array includes N sets (N>1) of the antennas. Each set includes a plurality of the antennas. Each first Rotman lens corresponds to a distinct set of the N sets of the antennas. Each antenna is communicably coupled to a respective array port of its corresponding first Rotman lens. Respective array ports of each first Rotman lens are individually communicably coupled to the antennas of a distinct set of the N sets of antennas by respective first waveguides, one first waveguide per antenna. A respective beam side of each second Rotman lens is communicably coupled to a respective beam side of a distinct first Rotman lens by a first delay medium having a delay that varies laterally across the medium. An array side of the third Rotman lens is communicably coupled to respective array sides of the second Rotman lenses by respective second delay media. Beam ports of the third Rotman lens collectively represent a linear array of pixels that maps to an unwound raster scan of pixels of the two-dimensional field of view.

Optionally, in any embodiment with a planar array of radiating elements and a second Rotman lens, the planar array of radiating elements has a design wavelength. For each second Rotman lens, a difference in delay between two maximally different delay line second waveguides is about $$2 \times \left(\frac{N-1}{2}\right)^2 \times \text{the design wavelength.}$$

Optionally, in any embodiment with delay line second waveguides and a second Rotman lens, for each second Rotman lens, all pairs of adjacent delay line second waveguides have equal (within manufacturing tolerances) differences in delay.

Optionally, in any embodiment with radiating elements, the radiating elements are equally spaced apart (within manufacturing tolerances) along each row and along each column, and intra-element row spacing of the radiating elements is about equal to intra-element column spacing of the radiating elements.

Optionally, in any embodiment with a planar array of radiating elements, rows and columns of the planar array of radiating elements is tilted, relative to a raster scan of the pixels of the two-dimensional field of view, at a slope of about Optionally, in any embodiment with a planar array of radiating elements, the planar array of radiating elements has a design wavelength between about 100 meters and about 1 millimeter.

Optionally, in any embodiment with a planar array of radiating elements, the planar array of radiating elements has a design wavelength between about 10 nanometers and about 1 millimeter.

Optionally, in any embodiment with a Rotman lens, for each second Rotman lens, N delay line second waveguides are coupled to the second Rotman lens and arranged in an S-bend design. The N delay line second waveguides are parallel (within manufacturing tolerances) to each other. Each delay line second waveguide includes a respective about three-quarter-circle curve. The N delay line second waveguides thereby collectively form a plurality of concentric, equally radially spaced-apart about three-quarter-circle curves. Each delay line second waveguide includes a respective about half-circle curve that extends in a direction opposite the about three-quarter-circle curve of the delay line second waveguide and has a radius different from the radius of the about half-circle curve of each other delay line second waveguide. The N delay line second waveguides thereby collectively form a plurality of about half-circle curves.

Optionally, in any embodiment with a Rotman lens, for each second Rotman lens, half-circle curves of a plurality of about half-circle curves are non-concentric, and centers of the half-circle curves are co-linear.

Optionally, in any embodiment with a second Rotman lens, for each second Rotman lens, the half-circle curves of the plurality of about half-circle curves are concentric.

Optionally, in any embodiment with a Rotman lens, delay line second waveguides are coupled to a second Rotman lens are arranged in an S-bend design. The path of each delay line second waveguide progresses into a half circle shape and a sloped half circle shape. The half circle and the sloped half circle shapes have a different radius for each delay line second waveguide. Longer delay line second waveguides fit around shorter delay line second waveguides.

Optionally, in any embodiment with delay line second waveguides, the half circle and sloped half circle shapes of left delay line second waveguides coupled to a second Rotman lens face opposite directions from right delay line second waveguides coupled to the second Rotman lens.

Optionally, in any embodiment with delay lines, path lengths of longer delay line second waveguides are accommodated by extending bends of the half circle shape of each delay line second waveguide, and the extensions of the bends become increasingly pronounced as progressing from the center delay line second waveguide toward the left or right delay line second waveguides ("tromboning").

Optionally, in any embodiment with delay line waveguides, the N delay line second waveguides coupled to a second Rotman lens have a width of about (3N−1) times spacing between a pair of N delay line second waveguides, plus a diameter of the half circle shape with minimal radius.

Optionally, in any embodiment with a Rotman lens, a waveguide enters and exits each Rotman lens orthogonal to the surface of the Rotman lens.

Optionally, in any embodiment, the array of antennas is planar.

Optionally, in any embodiment, the array of antennas is organized as N rows and N columns.

Optionally, in any embodiment, first waveguides have equal path lengths.

Optionally, any embodiment includes respective sets of N progressively longer delay line second waveguides.

Optionally, any embodiment includes a plurality of equal-path-length third waveguides.

Optionally, any embodiment includes N third waveguides per second Rotman lens.

Optionally, in any embodiment, each antenna is communicably coupled to the respective array port of its corresponding first Rotman lens via a respective first waveguide.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will be more fully understood by referring to the following Detailed Description of Specific Embodiments in conjunction with the Drawings, of which:

FIG. 43 contains a table of relative path delays between first and second stage beamforming networks for an exemplary 7×7 antenna array, according to an embodiment of the present invention.

DETAILED DESCRIPTION OF SPECIFIC EMBODIMENTS

Figure 1:
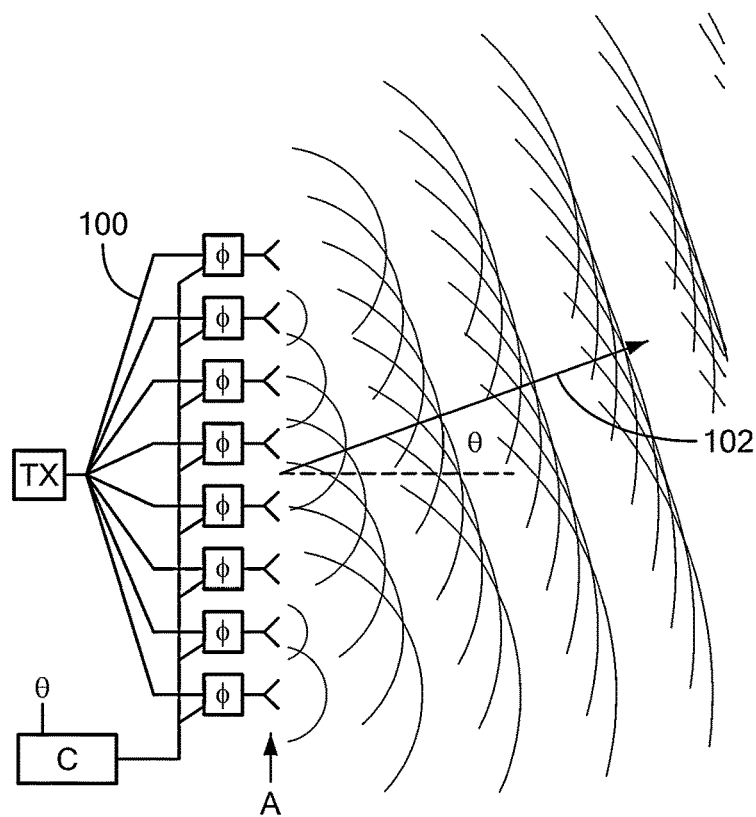
FIG. 1 is a diagram of a phased array of antennas, according to the prior art.

Embodiments of the present invention provide antenna systems that have two-dimensional fields of view, yet can be implemented on surfaces, such as on electronic or photonic integrated circuits. Each such antenna system includes an array of antennas disposed in a predetermined non-linear pattern and a two-dimensional beamforming network (BFN). "Two-dimensional" in this context means the array of antennas has a two-dimensional field of view and can differentiate points within the field of view with two degrees of freedom. The antenna system can be steered in two dimensions through beam port selection. The beamforming network is disposed entirely on a single first surface. The beamforming network has a one-dimensional array-side interface disposed on the first surface and a one-dimensional beam-side interface disposed on the first surface. The antennas of the array of antennas are individually communicably coupled to the array-side interface. Segments of the beam-side interface map to respective pixels in the two-dimensional field of view. In some embodiments, no signal crosses another signal in the BFN.

The antenna system may be used in mobile telephones, automotive LiDAR and other systems, particularly compact systems, in which directional transmission and/or reception of electromagnetic (EM) waves is desirable. For example, imaging systems ("cameras") can be thought of as collecting light from a discrete set of directions ("pixels") simultaneously or nearly simultaneously. Thus, the antenna system may be used in cameras. Signals to and/or from the beam-side interface may be processed by circuits that are also disposed on the first surface, or these signals may be carried by suitable waveguides to an edge of the first surface and there coupled to external circuits.

Definitions

A "beamforming network" is a network of waveguides that connects an array of C couplers to P output ports, such that a plane wave (as that term is commonly used by one of ordinary skill in the art) incident on the couplers from a particular direction gets substantially concentrated into a single output port. According to the reciprocity theorem, radiation input into a port is distributed among the couplers with such amplitudes and phase relationships that emissions from the couplers form a plane wave in a particular direction (a beam). A "coupler" is a device that interfaces waves propagating through a medium (including free space) and a signal carried by a lead, such as a waveguide. Examples include: metal conductors that interface between EM waves propagating through space and electric currents moving in the metal conductors; rectennas, including optical rectennas; optical gratings or mirrors disposed between waveguides and free space; sonic or ultrasonic transducers; and the like. For generality, couplers are referred to herein as antennas.

As used herein, EM waves include, but are not limited to, radio frequency (RF) signals (roughly about 20 kHz to about 300 GHz or about 1 mm to about 15 km in wavelength) and humanly visible and invisible optical signals (about 10 nm to about 1 mm in wavelength). Antenna systems are described herein in the context of EM waves. However, principles described herein apply to wavelengths longer or shorter than EM wavelengths, as well as to other types of waves, such as acoustic waves. Use of these principles at these other wavelengths or with these other types of waves is explicitly contemplated.

As described in Wikipedia, an antenna array (or array antenna or phased array) is a set of multiple connected antennas that work together as a single antenna, to transmit or receive EM waves. FIG. 1 is a diagram of a phased array of antennas A, according to the prior art. The individual antennas (elements A) may each be connected to (fed or driven by) a respective receiver or transmitter, or multiple individual elements A may be fed by a single receiver or transmitter (TX in FIG. 1). The elements A are fed in a specific static or dynamic phase relationship. The connections may include respective feedlines, represented by feedline 100, that feed to, or receive from, the elements A. "Driven" means connected to the receiver(s) and/or transmitter(s), as opposed to parasitic. An antenna array may, but need not, include parasitic elements, such as reflectors and/or directors, in addition to driven elements.

"Design wavelength" means a wavelength at which a device is designed to operate, or a center of a range of wavelengths over which the device is designed to operate. The range of wavelengths, over which the device is designed to operate, is referred to as a "design bandwidth."

In FIG. 1, the phase of the signal to each element A is controlled by a respective delay circuit (Φ in FIG. 1). The delay circuits Φ are controlled by a phase controller C. As a result of the specific feed phase relationship, the EM waves radiated by the respective individual antennas A combine and superpose, adding together (interfering constructively) to enhance the power radiated in desired directions, exemplified by arrow 102, and cancelling (interfering destructively) to reduce the power radiated in other directions. Although a single direction 102 is indicated in FIG. 1, some antenna arrays have multiple lobes, each aimed in a different direction. When used for receiving, separate EM signals from the individual antennas A combine with the correct phase relationship to enhance signals received from the desired directions and cancel signals from undesired directions.

Problematically, applying the same delay @ to all frequencies on a given feedline 100 creates a phenomenon known as "beam squint," which is a frequency-dependent distortion of the beam steering angle. The phase shift at the low end of a signal's spectrum and the phase shift at the high end of the signal spectrum are different enough that the beam points differently from one extreme to the other. Narrowband signals do not experience beam squint, but application often require broadband operation.

Figure 2:
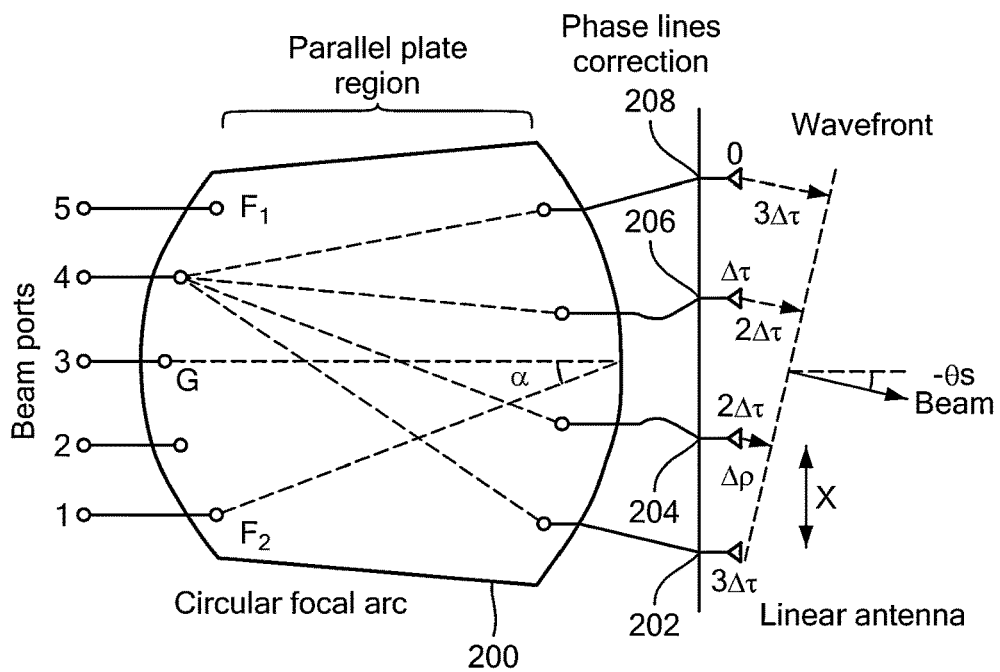
FIG. 2 is a diagram of a Rotman lens used as a phaser for a linear (one-dimensional) array of antennas, according to the prior art.

Various techniques are known for controlling the phase to each element A. In general, these techniques are referred to as involving beamforming networks (BFN). One such technique, illustrated in FIG. 2, involves coupling a Rotman lens 200 (sometimes called the Rotman-Turner lens) between a transmitter or receiver and a linear array of antenna elements, exemplified by antenna elements 202, 204, 206 and 208. A Rotman lens 200 is a type of beam-forming network that allows multiple beams to be formed without the need for switches or phase shifters. The Rotman lens 200 uses RF guided waves in a specially designed geometrical structure to produce delays for a number of discrete beams. The antenna elements 202, 204, 206 and 208 are connected to the right side (as shown in FIG. 2) array ports, with beam ports connected to the left.

Parallel plates (parallel to the plane of FIG. 2) define a cavity therebetween, through which signals propagate between the beam ports and the array (antenna) ports. Signals radiated within the Rotman lens by a given beam port, for example beam port 4, have different path lengths to the various antenna ports. Thus, the signals received at the various antenna ports, from the beam ports, have various phases, relative to each other. The beam and antenna ports are disposed, relative to each other, such that the phase shifts experienced by the antenna ports are appropriate for feeding the antenna elements.

Each beam port causes the antenna array to be phased (directed) in a different direction. Thus, the Rotman lens might be thought of as a quasi-microstrip or a quasi-stripline circuit, where the beam ports are positioned such that constant phase shifts are achieved at the antenna ports. Consequently, a Rotman lens concentrates EM signals received at the array ports with a particular phase slope (equivalently, a plane wave incident with a particular angle of arrival), into a particular beam port. We refer to this property of the Rotman lens as "analyzing the angle of arrival" of the incident wave.

Although a Rotman lens may have many beam ports, the beam ports are isolated from each other, in that the beam ports do not greatly affect the loss, or noise figure, of adjacent beams. A well-designed Rotman lens may have as little as 1 dB of loss. However, the Rotman lens circuit of FIG. 2 is limited to beamforming in a single dimension, i.e., along the X axis.

Figure 3:
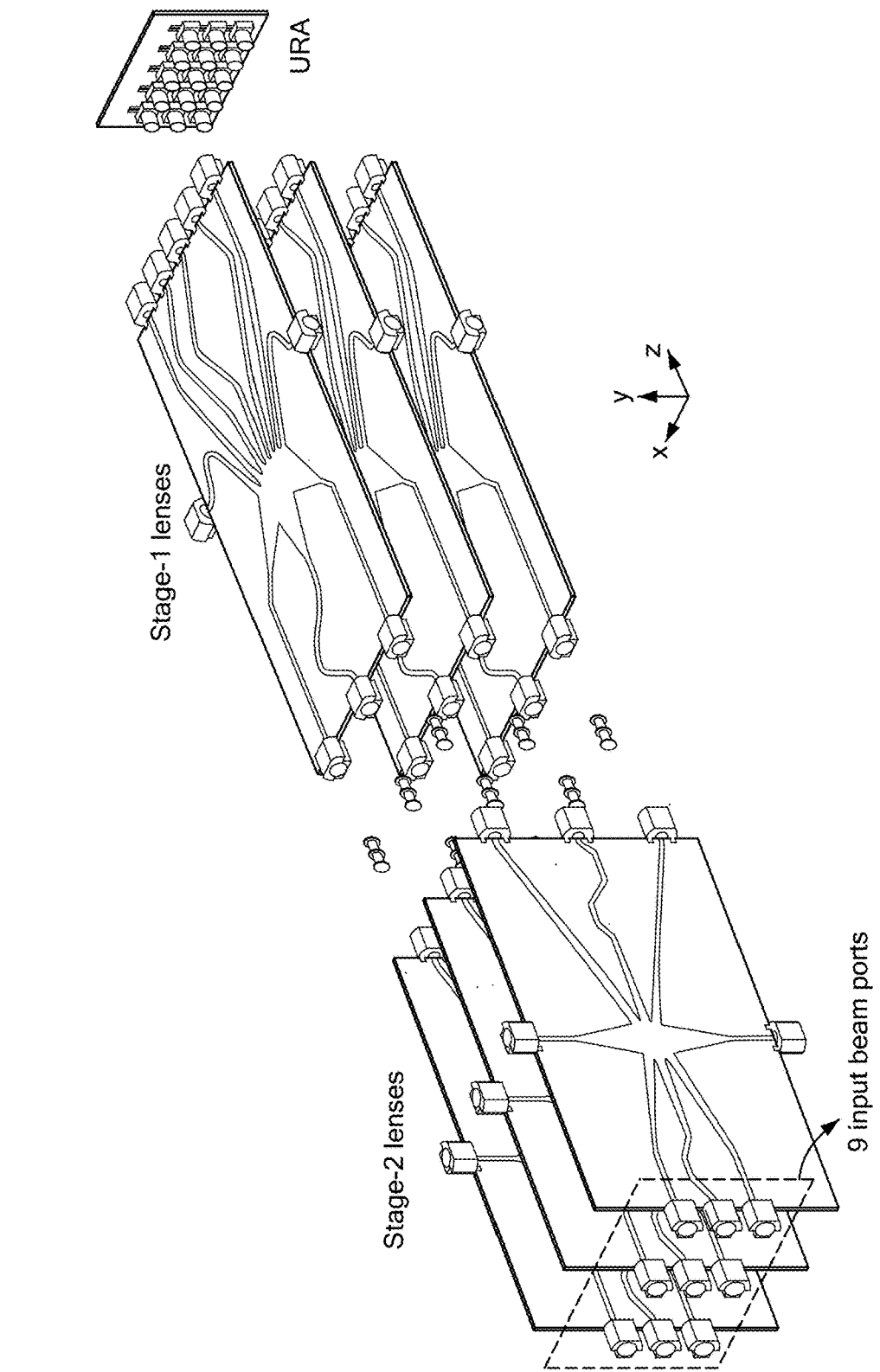
FIG. 3 is a diagram of a two-stage stacked Rotman lens-based two-dimensional beamformer, according to the prior art.
Figure 3:
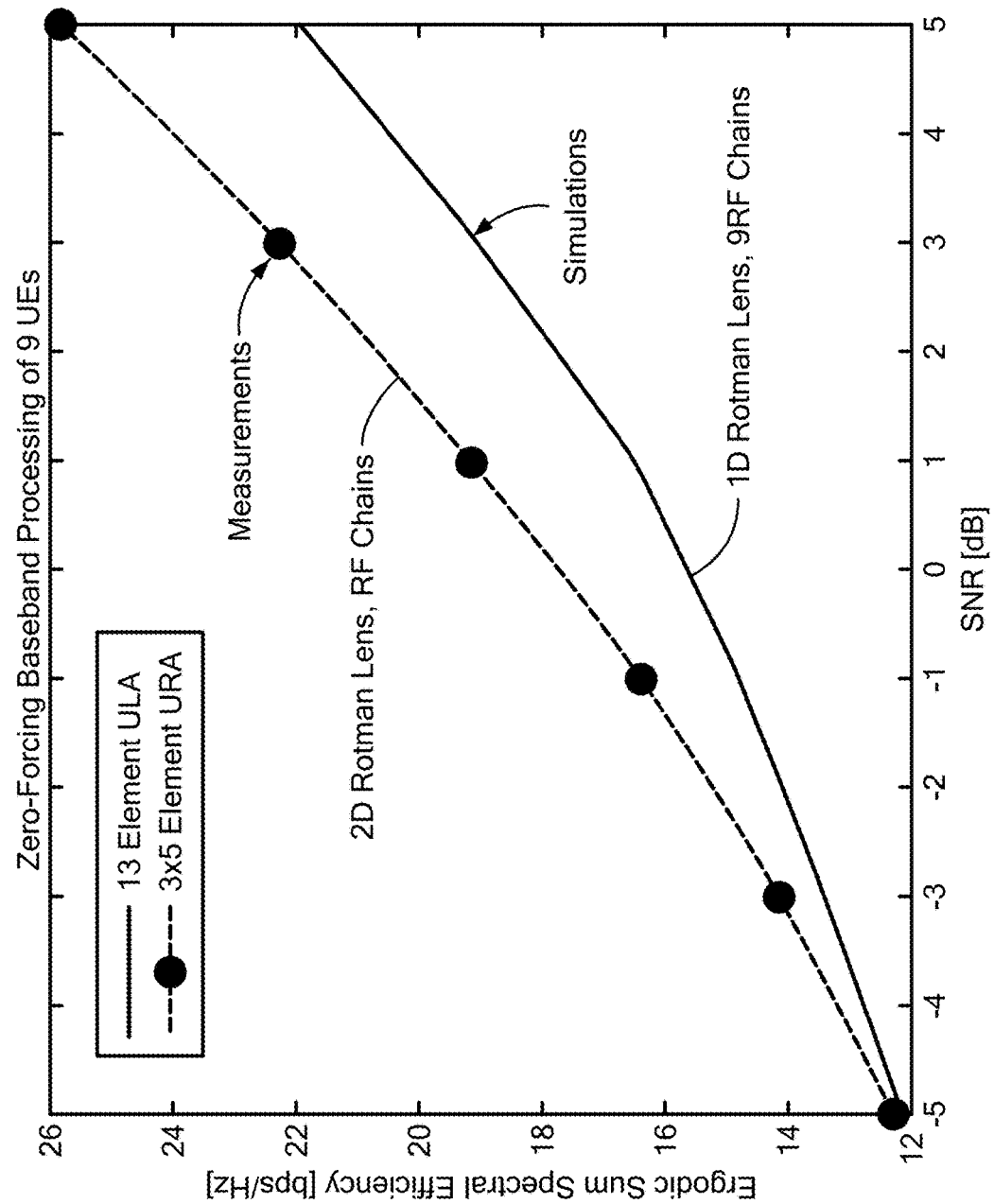

Multiple Rotman lenses may be combined, as shown in the left portion of FIG. 3, to form a two-stage stacked two-dimensional (X-Y) beamforming network that feeds a uniform rectangular array (URA) of antennas. The center portion of FIG. 3 ("FIG. 3 Continued") shows radiation patterns that can be generated by the beamformer. The right portion of FIG. 3 ("FIG. 3 Continued") provides a comparison of the two-stage stacked arrangement with a single-stage Rotman lens-based beamformer.

However, each stage requires a three-dimensional (X-Y-Z) structure, which would be difficult or impossible to house in a 5G mobile telephone or automotive LiDAR unit. Although, arguendo, it may be possible to reconfigure the two-stage stacked beamformer of FIG. 3 on a single surface, such a reconfiguration would require signal lines to cross over each other, which is difficult to fabricate and would most likely cause unacceptable losses and/or noise.

A Butler matrix is another well-known device for beamforming. A Butler matrix, first described by Jesse Butler and Ralph Lowe in "Beam-Forming Matrix Simplifies Design of Electronically Scanned Antennas," Electronic Design, volume 9, pp. 170-173, Apr. 12, 1961, the entire contents of which are hereby incorporated by reference herein for all purposes, is a type of passive phasing network having N inputs and N outputs, usually a power of two. A Butler matrix, coupled between a set of antenna elements and a transmitter or a receiver, may be used for beamforming.

The N inputs of a Butler matrix are isolated from each other. Phases of the N outputs are linear, with respect to position, so the beams are evenly spaced. The phase increments, among the outputs, depend on which input is used. For example, a Butler matrix may be constructed such that when input port 1 is used, the four outputs are linearly phased in 45 degree increments; when input port 2 is used, the four outputs are linearly phased in 135 degree increments; when input port 3 is used, the four outputs are linearly phased in 225 degree increments; and when input port 4 is used, the four outputs are linearly phased in 315 degree increments. Thus, depending on which of the N inputs is accessed, the antenna beam is steered in a specific direction in one plane. Thus, the beam steering is in one dimension. Two Butler matrices can be combined to facilitate two-dimensional steering. However, such a combination, like the two-stage stacked Rotman lens configuration of FIG. 3, is too bulky for use in a 5G mobile telephone or automotive LiDAR unit.

A significant feature of a Rotman lens is that it operates by adjusting total distance traveled by EM radiation inside the device, such that all paths taken by the EM radiation from (to) a particular direction (port) are equal in effective length. This property allows the device to operate over a wide range of wavelengths (has broad bandwidth) and is, therefore, referred to as a "true time delay" (TTD) device. Unlike a Rotman lens, a Butler matrix only equalizes phase, i.e., path length, modulo the wavelength. Butler matrices are, therefore, intrinsically narrowband devices.'

A device is said to have true time delay if the time delay through the device is independent of the frequency of the EM signal. TTD is an important characteristic of lossless and low-loss, dispersion free, transmission lines. TTD allows for a wide instantaneous signal bandwidth with virtually no signal distortion, such as pulse broadening, during pulsed operation.

Two-Dimensional Planar and Crossover-Free Beamforming Network Architecture

Figure 4:
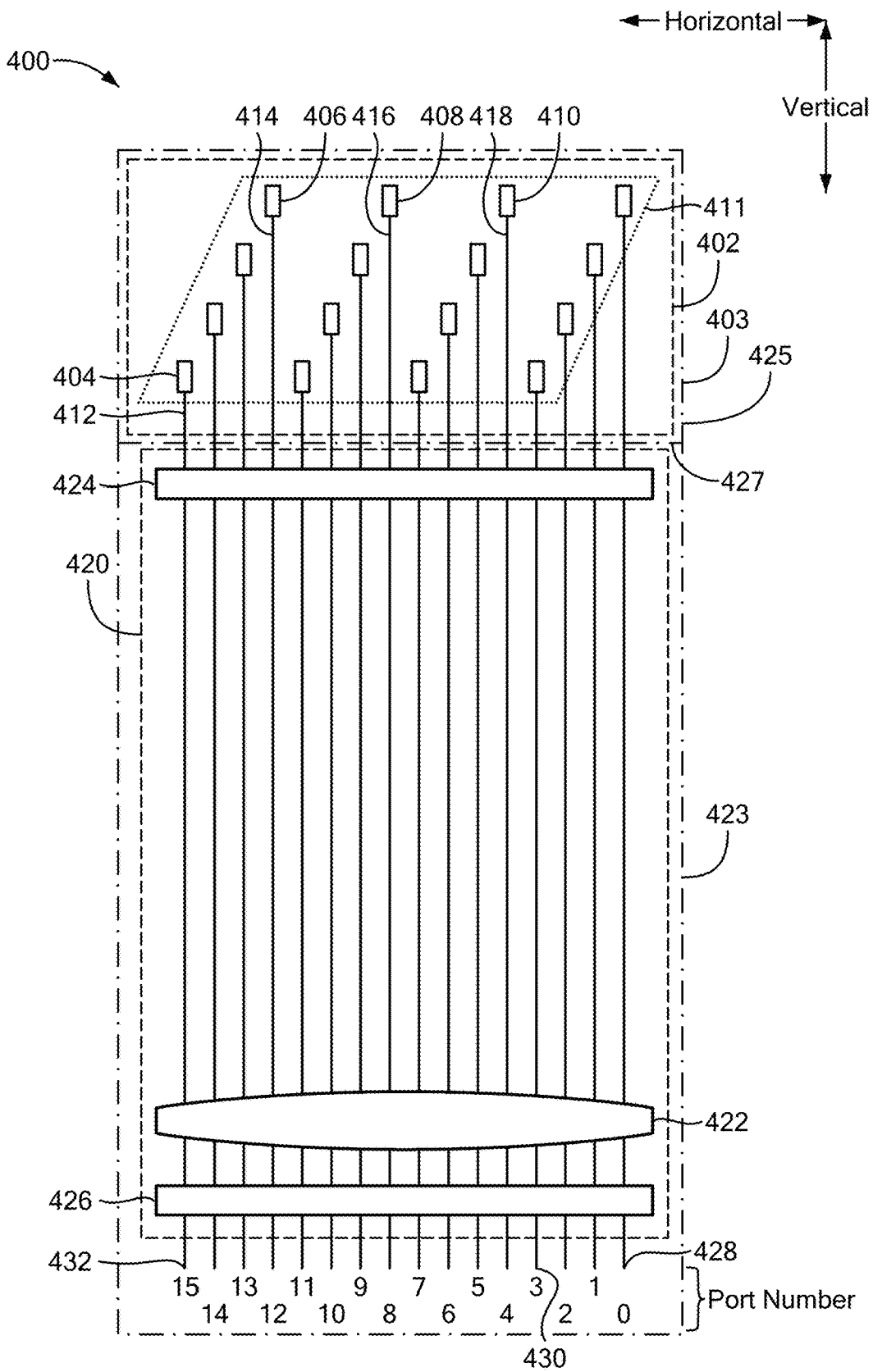
FIG. 4 is a partially schematic, top view diagram of a crossover-free antenna system capable of two-dimensional beamforming, according to an embodiment of the present invention.

FIG. 4 is a diagram of a crossover-free antenna system 400 capable of two-dimensional beamforming, according to an embodiment of the present invention. The antenna system 400 includes an array 402 of antennas (outlined in dashed line). However, unlike the prior art, the antenna system 400 can be implemented on a single surface 403. "Two-dimensional" in this context means the array of antennas 402 has a two-dimensional field of view and can differentiate points within the field of view with two degrees of freedom, for example elevation and azimuth. A diagram of the field of view 500 is described herein, with reference to FIG. 5. In the embodiment shown in FIG. 4, the two-dimensional field of view is out of the plane of the diagram, i.e., generally toward the reader. As used herein, "surface" means a piecewise smooth surface, i.e., a continuous surface that may include an assembly of smaller smooth surfaces, where interfaces between adjacent smaller smooth surfaces may form sharp edges. A three dimensional component, such as a lens, that is mounted on a surface such that only a thin or planar or nearly planar slice of the component is used for purposes described herein nevertheless meets the requirements of being disposed on the surface, since portions of the component above and/or below the surface are superfluous, at least with respect to the beamforming network described herein. A surface can, but need not necessarily, be planar. "Crossover-free" means no feedline crosses another feedline. Cross-coupling within a Rotman lens or other Fourier transformer is not considered a crossover, within the context of the present application.

The array of antennas 402 includes a plurality of individual antennas, exemplified by antennas 404, 406, 408 and 410. Although the embodiment shown in FIG. 4 includes 16 antennas 404-410, other embodiments can include fewer or more antennas. Importantly, the antennas 404-410 are disposed in a predetermined non-linear pattern. For example, in the embodiment shown in FIG. 4, the antennas 404-410 are disposed in a parallelogram array, as indicated by dotted line 411. Antenna 404-410 arrangement is discussed in more detail herein. In some embodiments, the antennas 404-410 are disposed in a planar array. A planar array is referred to herein as being disposed on a planar surface, although the surface may be merely conceptual, not necessarily physical. In some embodiments, the antennas 404-410 are disposed in a curved array. A curved array is referred to herein as being disposed on a curved surface, such as a portion of a sphere, although the surface may be merely conceptual, not necessarily physical.

If the antenna system 400 is to be used at radio frequencies, the antennas 404-410 may, for example, be electrically conductive dipole or patch antenna elements of appropriate lengths/sizes, based on a design wavelength λ of the antenna system 400. On the other hand, if the antenna system 400 is to be used at optical wavelengths, the antennas 404-410 may, for example, be mirrors or optical gratings having appropriate groove spacings, based on the design wavelength λ of the antenna system 400, to optically couple a feedline to a medium, such as air, oil or vacuum beyond the mirror or optical grating (for simplicity of explanation, collectively referred to herein as "free space"), with a coupling efficiency of at least about 25%. In embodiments where optical waveguides extend perpendicular to a desired direction of free space propagation, an optical coupler should facilitate this change of direction. Examples of optical couplers include compact gratings, prisms fabricated in waveguides and facets etched in wafers and used as mirrors. Optical antennas are described by Palash Bharadwaj, et al., "Optical Antennas," Advances in Optics and Photonics 1.3 (2009), pp. 438-483, U.S. Pat. Publ. 2014/0192394 to Jie Sun, et al., "Optical Phased Arrays" (2014), and U.S. Pat. Publ. No. 2018/0175961 to Steven J. Spector, et al., "Integrated MEMS Switches for Selectively Coupling Light In and Out of a Waveguide" (2018), the entire contents of each of which are hereby incorporated by reference herein, for all purposes. In some embodiments, the antennas 404-410 are fabricated on an electronic or photonic integrated circuit.

An antenna or antenna element is fed by a "feedline," also referred to herein as a transmission line. Examples of feedlines include coaxial cables, striplines, hollow microwave waveguides and other waveguides, such as sufficiently optically transparent materials bounded by other materials having suitable indexes of refraction to contain EM waves in the optically transparent materials by means of total internal reflection, for example optical fibers and optical waveguides fabricated on optical integrated circuits. Of course, suitability of a feedline depends on wavelength and power of a signal to be carried by the feedline.

Each antenna 404-410 is coupled to a respective feedline, exemplified by feedlines 412, 414, 416 and 418, appropriate for the design wavelength $\lambda$, power, etc. Suitable feedlines 412-418 include coaxial cables, strip lines, optical fibers, sufficiently optically transparent materials bounded by other suitable materials, or other waveguides based, of course, on the design wavelength $\lambda$ and power. In some embodiments, the feedlines 412-418 are fabricated on an electronic or photonic integrated circuit. Additional information about possible feedlines, including path lengths of the respective feedlines 412-418, is provided herein. In any case, the antennas 404-410 are suitable for emitting electromagnetic waves, at the design wavelength $\lambda$, from their respective feedlines 412-418 into the medium, such as free space, and/or receiving electromagnetic waves from the medium into their respective feedlines 412-418.

The antenna system 400 also includes a two-dimensional beamforming network 420. "Two-dimensional" in this context means the beamforming network 420 enables the array of antennas 402 to form a beam directed into the two-dimensional field of view, with two degrees of freedom of directionality of the beam, for example horizontal and vertical, as indicated by respective arrows in FIG. 4. In the embodiment shown in FIG. 4, the beamforming network 420 includes a single Rotman lens 422. In other embodiments, the beamforming network 420 includes a suitable Butler matrix (not shown) or any suitable Fourier transformer (not shown). In yet other embodiments, the beamforming network 420 includes additional components, as described herein.

In some embodiments, the feedlines 412-418 provide equal (within manufacturing tolerances) effective path lengths between the respective antennas 404-410 and the beamforming network 420 and/or the Rotman lens 422. In some embodiments, the antenna system 400 is a true time delay device. "Effective path length" (in optics, commonly referred to as optical path length (OPL)) takes into consideration physical length of a path and velocity factor (index) of media in the feedlines 412-418, through which the EM signals propagate. "Equal effective path length" means EM signals at the design wavelength $\lambda$, or within the design bandwidth, take essentially equal amounts of time to propagate through the respective feedlines 412-418. Differences in the effective path lengths are sufficiently small that signals received or transmitted by respective single antennas 404-410 do not involve phase differences in the antennas' feedlines 412-418 that would cause beam forming direction errors greater than a design angular resolution of the antenna system 400. In other words, for an antenna system 400 designed to resolve X and Y direction of received and/or transmitted signals with a given angular resolution, the effective path lengths of the feedlines 412-418 are sufficiently close to each other not to introduce phase differences that would cause beam forming direction errors greater than the design angular resolution of the antenna system 400. For simplicity, FIG. 4 does not show these equal effective path lengths. Embodiments of the feedlines 412-418 are described in more detail herein.

In some embodiments, the beamforming network 420 is disposed entirely on a single first surface 423. In some embodiments, the beamforming network 420 is fabricated on an electronic or photonic integrated circuit. In some embodiments, the predetermined non-linear pattern of the antennas 404-410 defines a second surface 425 that extends continuously from an edge of the first surface 423. A boundary 427 between the first 423 and second 425 surfaces may be arbitrary. For example, the first and second surfaces 423 and 425 may be respective portions of a larger electronic or photonic integrated circuit or other planar or non-planar surface. In some embodiments, the beamforming network 420 is planar, i.e., the first surface 423 is planar. In some embodiments, the array of antennas 402 is co-planar with the beamforming network 420. A planar beamforming network 420 is referred to herein as being disposed on a planar surface, although the surface may be merely conceptual, not necessarily physical. In some embodiments, the beamforming network 420 is disposed on a non-planar surface, for example a curved or folded surface, although the surface may be merely conceptual, not necessarily physical. In any case, the beamforming network 420 is thin, preferably no thicker than an electronic or photonic integrated circuit. In some embodiments, the thickness of the beamforming network 420 may be even thinner than the free space design wavelength $\lambda$ of the antenna system 400. Design wavelength is typically defined as free space wavelength. By using high index materials, signals may be more tightly confined in the materials than in free space. Thus, in some embodiments, the electronic or photonic integrated circuit may be thinner than the free space design wavelength.

Several embodiments of the beamforming network 420 are described herein. However, in any embodiment, the beamforming network 420 has a one-dimensional array-side interface 424 disposed on the first surface 423 and a one-dimensional beam-side interface 426 disposed on the first surface 423. In some embodiments, such as the embodiment shown in FIG. 4, the one-dimensional beam-side interface 426 is segmented. "Segmented" in this context means the beam-side interface has individual ports, exemplified by ports 428, 430 and 432. However, in some embodiments, the one-dimensional beam-side interface 426 is continuous, i.e., lacking discrete ports. Nevertheless, portions of a continuous beam-side interface 426 may be referred to as segments of the beam-side interface 426. For example, a one-dimensional continuous beam-side interface 426 may be fed by a one-dimensional row of lasers, such as one laser per segment, or one or more lasers able to be moved or swept across the continuous interface, or a continuous beam-side interface 426 may feed a one-dimensional row of optical or RF sensors or a single movable sensor. A "one-dimensional" interface means a single, possibly curved, i.e., not necessarily linear, row interface, not multiple stacked rows, such as a four row by 16 port interface.

The antennas 404-410 of the array of antennas 402 are individually communicably coupled, via the feedlines 412-418, to the array-side interface 424. "Individually communicably coupled" means each antenna 404-410 is coupled by a distinct feedline 412-418 to the array-side interface 424. No antenna 404-410 couples to more than one feedline 412-418. Thus, for example, a series-fed microstrip patch antenna array that is steered by varying wavelength of a signal fed to the array via a single feedline is explicitly not an array of antennas, in which the antennas are individually communicably coupled. In the embodiment shown in FIG. 4, no single feedline 412-418 couples more than one of the antennas 404-410 to the array-side interface 424.

Each antenna 404-410 may, however, include multiple elements or multiple antennas (for clarity, referred to herein as elements), such as to increase signal capture/emission area of the antenna over that of a single element. Each element is configured to emit and/or receive EM waves. For example, individual antennas 404-410 may be made up of respective H-trees of elements. However, all the elements of a given antenna 404-410 are spaced sufficiently close together, such that a signal received or transmitted by the elements of a single antenna 404-410 does not involve phase differences in that antenna's feedline 412-418 that would cause beam forming direction errors greater than a design angular resolution of the antenna system 400. In other words, for an antenna system 400 designed to resolve X and Y direction of received and/or transmitted signals with a given angular resolution, antenna elements are spaced sufficiently close together not to introduce phase differences that would cause beam forming errors greater than the design angular resolution of the antenna system 400.

Figure 5:
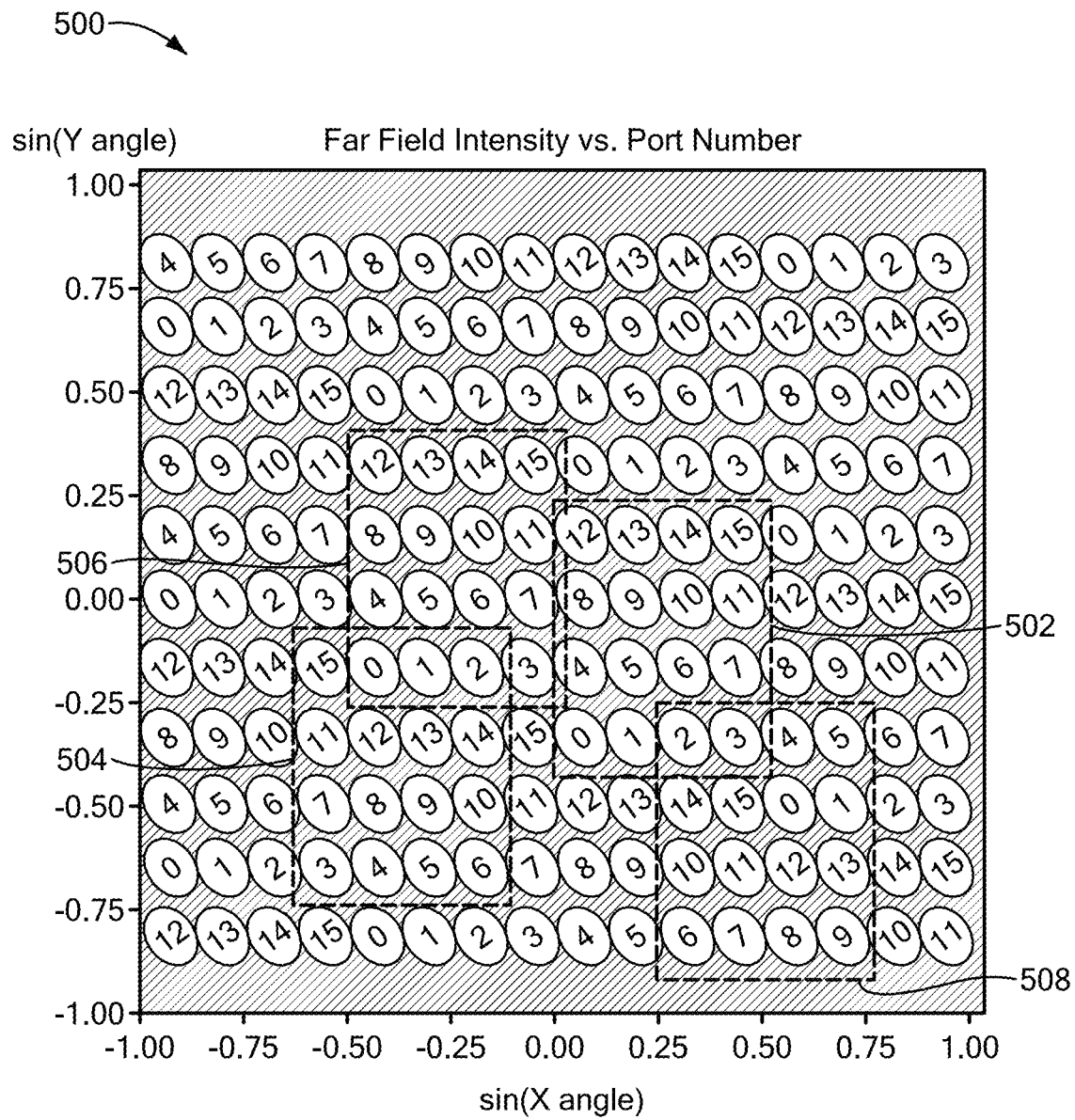
FIG. 5 is a diagram of an exemplary mapping of far field pixel-to-port number of a beam-side interface of a beamformer in the antenna system of FIG. 4, according to an embodiment of the present invention.

Segments, exemplified by beam ports 428, 430 and 432, of a segmented beam-side interface 426 map to respective pixels in the two-dimensional field of view. Similarly, respective portions (also referred to as "segments") of a continuous beam-side interface 426 map to corresponding regions in the two-dimensional field of view. FIG. 5 is a diagram of an exemplary mapping 500 of far field pixel intensity-to-port number 428-432 of the segmented beam-side interface 426. The mapping essentially describes a field 500 of view of the antenna system 400. X and Y axes are indicated in the mapping 500 as sin(X angle) and sin(Y angle). Individual pixels of the field of view are shown as respective ellipses. Each ellipse is numbered 0, 1, 2, 3, . . . , 15 to correspond to one of the ports 428-432 of the port-side interface 426 (FIG. 4). The number of pixels 0, 1, 2, 3, . . . , 15 is equal to the number of ports 428-432. It should be noted that many of the pixels 0, 1, 2, 3, . . . , 15 are duplicated, as grating lobes, when the antennas are spaced apart further than $\lambda/2$. Thus, a square area (subset) of the field of view 500, for example square area 502 shown in heavy dashed line, may be completely covered (mapped) by the entire set of beam ports 428-432 of the beam-side interface 426. Square area 504 is also covered (mapped) by the entire set of beam ports 428-432. Indeed, some subsets of the field of view, for example square area 506, overlap other subsets. Furthermore, a subset of the field of view, for example square area 508, need not necessarily begin with pixel 0 in a corner.

Thus, individual pixels of a two-dimensional field of view 500 may be accessed, for transmission and/or reception of EM waves, via the one-dimensional beam-side interface 426 (FIG. 4). Furthermore, the antenna array 402 and the beamformer 420 can each be disposed on a respective surface 425 and/or 423, or the same surface. Each surface 425 and/or 423, or the single surface, can be planar. In any case, the antenna array 402 and the beamformer 420 can be thin, in some embodiments as thin as an electronic or photonic integrated circuit, and in some embodiments thinner than the design free space wavelength $\lambda$.

In contrast, the two-stage stacked Rotman lens configuration of FIG. 3 requires several Rotman lenses to be stacked in its first stage, and several additional Rotman lenses to be stacked in its second stage. The two stages are disposed one behind the other (in the z direction), behind the uniform rectangular array of antennas. Even if, arguendo, each Rotman lens could be as thin as an electronic or photonic integrated circuit, each stack in FIG. 3 is considerably taller than the beamforming network 420 (FIG. 4) described herein. Thus, the two-stage stacked Rotman lens configuration of FIG. 3 is a three-dimensional structure, whereas the beamforming network 420 is a two-dimensional structure. In this context, "two-dimensional" means having length and width, but essentially no height greater than a single electronic or photonic circuit, and "three-dimensional" means having length, width and height at least 1/100 the lesser of the width or the height. Thus, the beamforming network 420 can be fitted inside a 5G mobile telephone or automobile LiDAR unit, whereas the two-stage stacked Rotman lens configuration of FIG. 3 cannot practically be used in such a mobile device.

Furthermore, embodiments of the beamforming network 420 can be made inexpensively, in large quantities, using conventional electronic or photonic integrated circuit fabrication techniques, such as photolithography, on appropriate substrates, such as silicon wafers, whereas the two-stage stacked Rotman lens configuration of FIG. 3 is not suitable for such fabrication alone. The two-stage stacked Rotman lens configuration of FIG. 3 requires forming two stacks, orienting the two stacks perpendicular to each other and interconnecting the two stacks together and to the uniform rectangular array of antennas. These steps cannot be performed using only conventional electronic or photonic integrated circuit fabrication techniques.

Antenna Array

Figure 6:
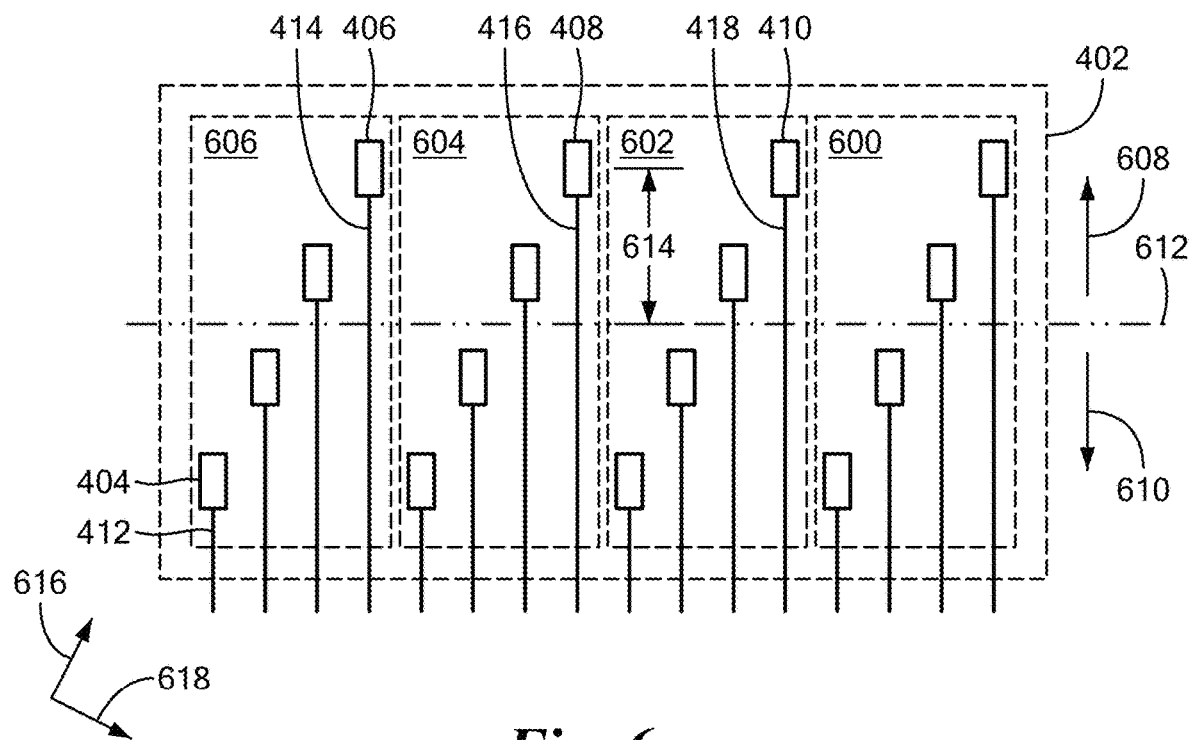
FIG. 6 is an enlarged view of portion, specifically an antenna array, of the antenna system of FIG. 4, according to an embodiment of the present invention.

As noted, the antennas 404-410 (FIG. 4) are disposed in a predetermined non-linear pattern. A conventional phased array of antennas that uses a single Rotman lens for phasing includes a linear array of antennas, as shown in FIG. 2. In contrast, in embodiments of the present invention, the array of antennas 402 includes a plurality of disjoint sets of antennas. Collectively, the disjoint sets of antennas are disposed in a predetermined non-linear pattern. FIG. 6 is an enlarged view of a portion of FIG. 4, in particular the array of antennas 402. In the embodiment shown in FIG. 6, the array of antennas 402 includes four disjoint sets of antennas, specifically sets 600, 602, 604 and 606, as indicated by dashed rectangles. "Disjoint set" means no antenna is in more than one set.

Each set 600-606 includes a plurality of antennas of the array of antennas 402. For example, set 606 includes four antennas, including antennas 404 and 406. Although the embodiment shown in FIG. 6 includes four sets 600-606 and four antennas per set, other embodiments can include fewer or more sets and/or fewer or more antennas per set. In some embodiments, the number of antennas in each set 600-606 equals the number of sets 600-606. In other embodiments, the number of antennas in each set 600-606 is not equal to the number of sets 600-606. In some embodiments, each set 600-606 contains the same number of antennas. However, in other embodiments, each set 600-606 need not necessarily contain the same number of antennas. Furthermore, some embodiments include sparse arrays of antennas. Although the embodiment shown in FIG. 4 has the antennas 404-410 disposed in a parallelogram 411, in other embodiments, the antennas 404-410 may be disposed in other shapes, such as squares, rectangles, or rotated versions thereof.

The predetermined non-linear pattern may define the second surface, although the second surface may be merely conceptual, not necessarily physical. For each disjoint set 600-606 of antennas, each antenna of at least a non-empty subset, for example antennas 404 and 406 of set 600, of the disjoint set of antennas may be perpendicularly displaced, as indicated by arrow 608 or arrow 610, a respective distance along the second surface from a longitudinal axis 612 of a hypothetical linear array of antennas (described below) disposed on the second surface. In other words, at least some of the antennas of each set 600-606 are perpendicularly displaced from the longitudinal axis 612. For example, antenna 408 is perpendicularly displaced a distance 614 from the longitudinal axis 612.

In another embodiment, for each disjoint set 600-606 of antennas, each antenna of at least a non-empty subset of the disjoint set of antennas is displaced a respective distance, measured along the second surface and parallel to one dimension 616 or 618 of the two-dimensional field of view, from a longitudinal axis 612 of a hypothetical linear array 700 (FIG. 7) of antennas disposed on the second surface.

Figure 7:
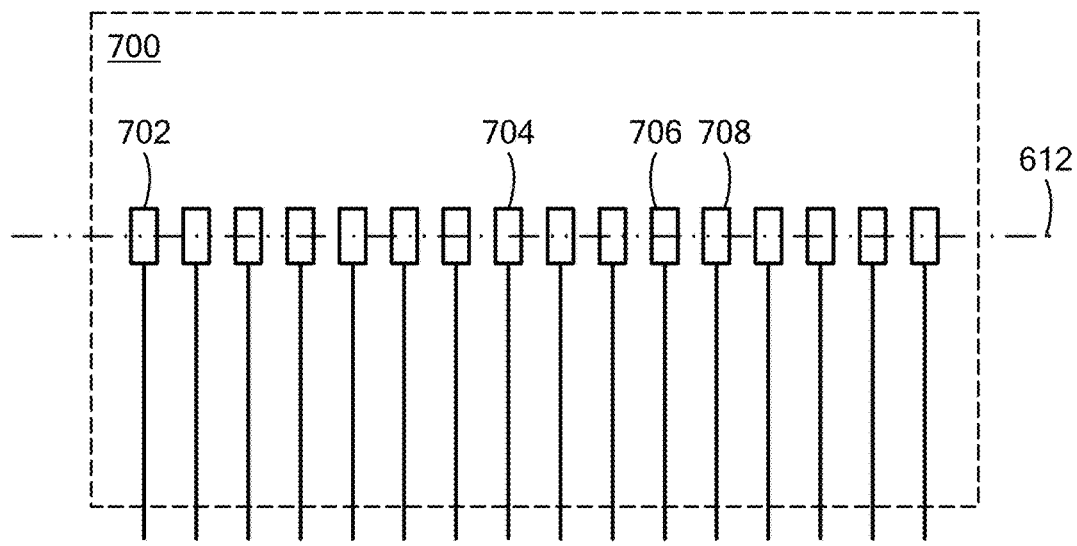
FIG. 7 is a diagram of a hypothetical linear array of antennas disposed on a surface, according to the prior art.

FIG. 7 shows a hypothetical linear array 700 of antennas, exemplified by antennas 702, 704, 706 and 708, disposed on the second surface and along the longitudinal axis 612. As shown in FIG. 2, the phase differences between the antennas 702-708 varies monotonically along the entire linear array 700 of antennas, and the phase differences depend on an angle θs (FIG. 2), at which a wave approaches, or is emitted by, the linear array of antennas 700.

In contrast, a wave approaching the non-linear pattern of FIG. 6 from a direction other than normal to the second surface causes generation of signals in the various feedlines 412-418 whose phases do not vary monotonically along the entire non-linear array of antennas 402. The structure of the antenna system 400, including the non-linear pattern of the antennas 404-410, causes phase differences within each set 600-606 of the antennas, and phase differences across the sets 600-606 of antennas, and these phase differences collectively give the antenna system 400 a two-dimensional field of view, whereas a linear array 700 (FIGS. 2 and 7) has only a one-dimensional field of view.

FIGS. 8-15 illustrate how progressively displacing the antennas 404-410 from the longitudinal axis 612 affects the mapping of the segments of the beam-side interface 426, specifically the beam ports 428-432, to respective portions (pixels 0, 1, 2, . . . , 15) of the field of view. The displacement is exemplified by arrows 900 and 902 in FIG. 9 and arrows 1000 and 1002 in FIG. 10. In each of FIGS. 8-15, the respective antenna pattern is shown on the left, and the resulting mapping of beam ports 428-432 to the portions (pixels) of the field of view is shown on the right.

Figure 8:
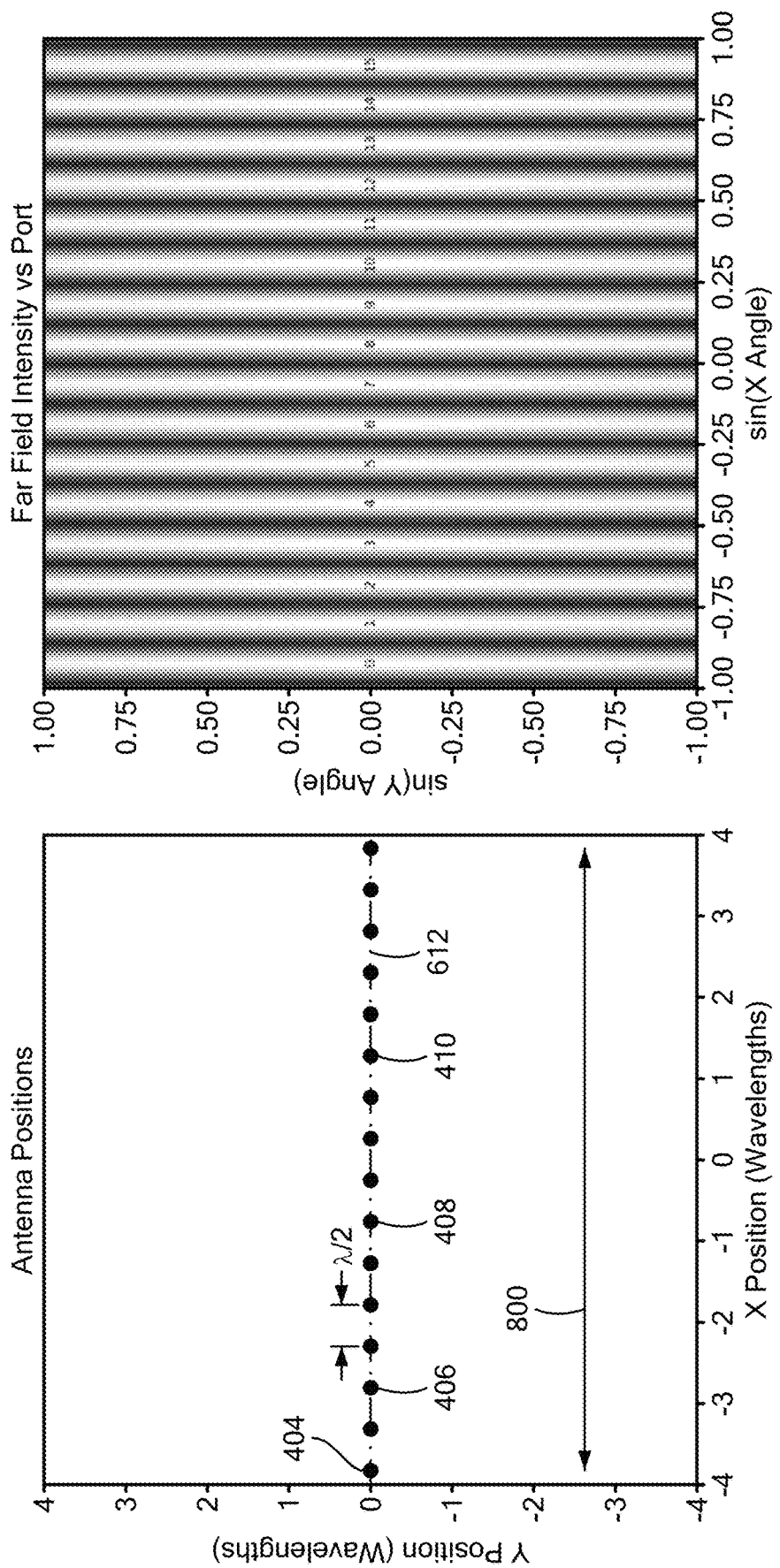
FIG. 8 illustrates a conventional linear phased array of antenna, such as the phased array of FIG. 1, 2 or 7, and its ability to form beams that are limited to bands in the antenna's field of view, according to the prior art.

In FIG. 8, the antennas 404-410 are arranged in a linear pattern, as the antennas are arranged in FIGS. 1, 2 and 7, i.e., in the prior art. The antennas 404-410 may be spaced apart by λ/2, where Δ is a design wavelength of the antenna array. As a result, each beam port 428-432 is mapped to a band that extends the entire height (Y axis direction) of the field of view. In other words, a linear pattern phased array has resolution in only a dimension parallel to the linear array of antennas. Thus, as noted, a linear phased array is limited to beamforming in a single dimension, i.e., along the X axis (FIG. 2), which corresponds to the X axis in FIGS. 8-15.

Figure 9:
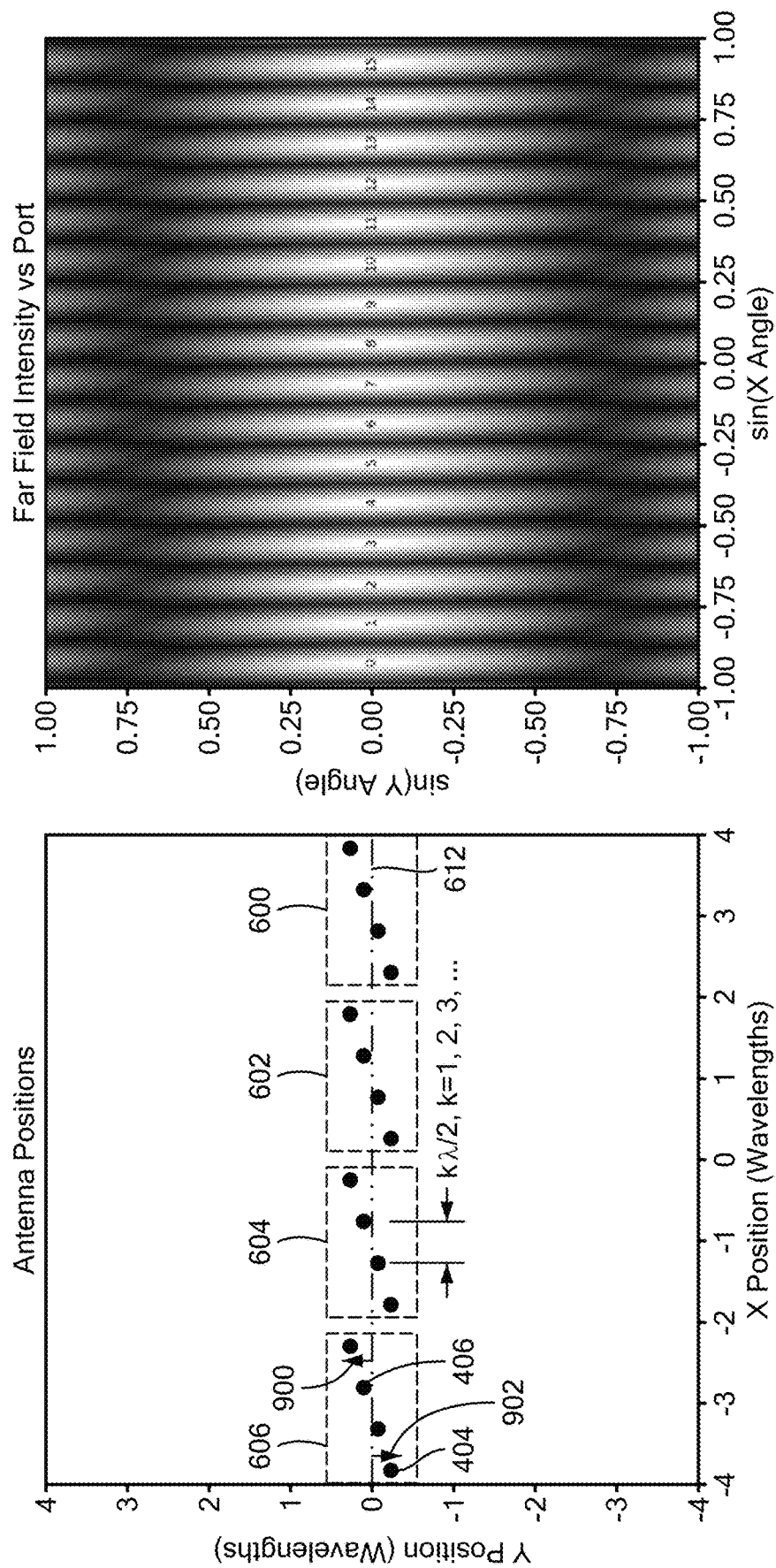
FIGS. 9-15 illustrate how displacing the antennas of the antenna system of FIG. 4 from a longitudinal axis (for example, the linear array of FIG. 7) affects the mapping of the ports of the beam-side interface to respective portions (pixels) of the (two-dimensional) field of view, according to an embodiment of the present invention.
Figure 10:
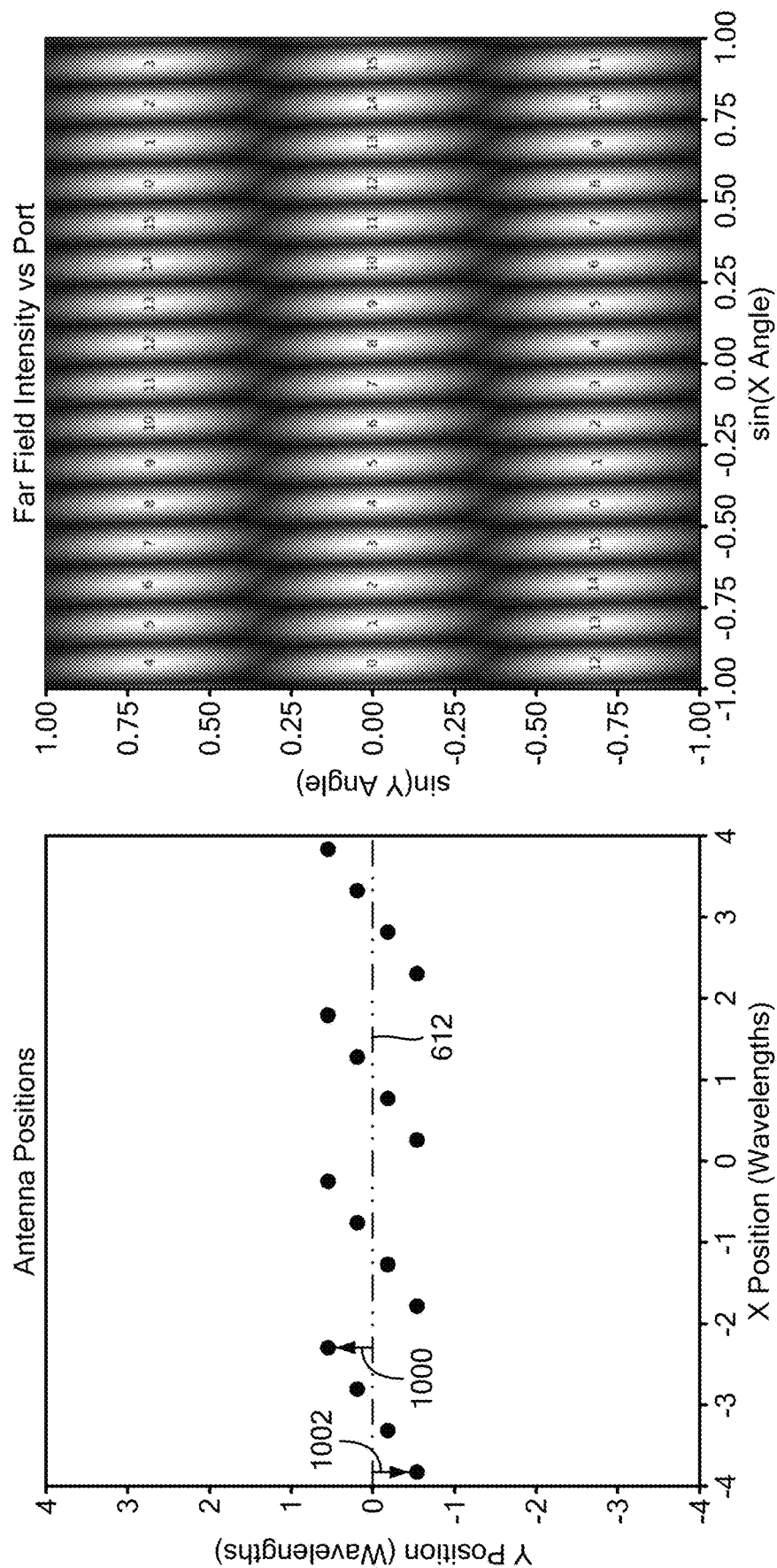
Figure 11:
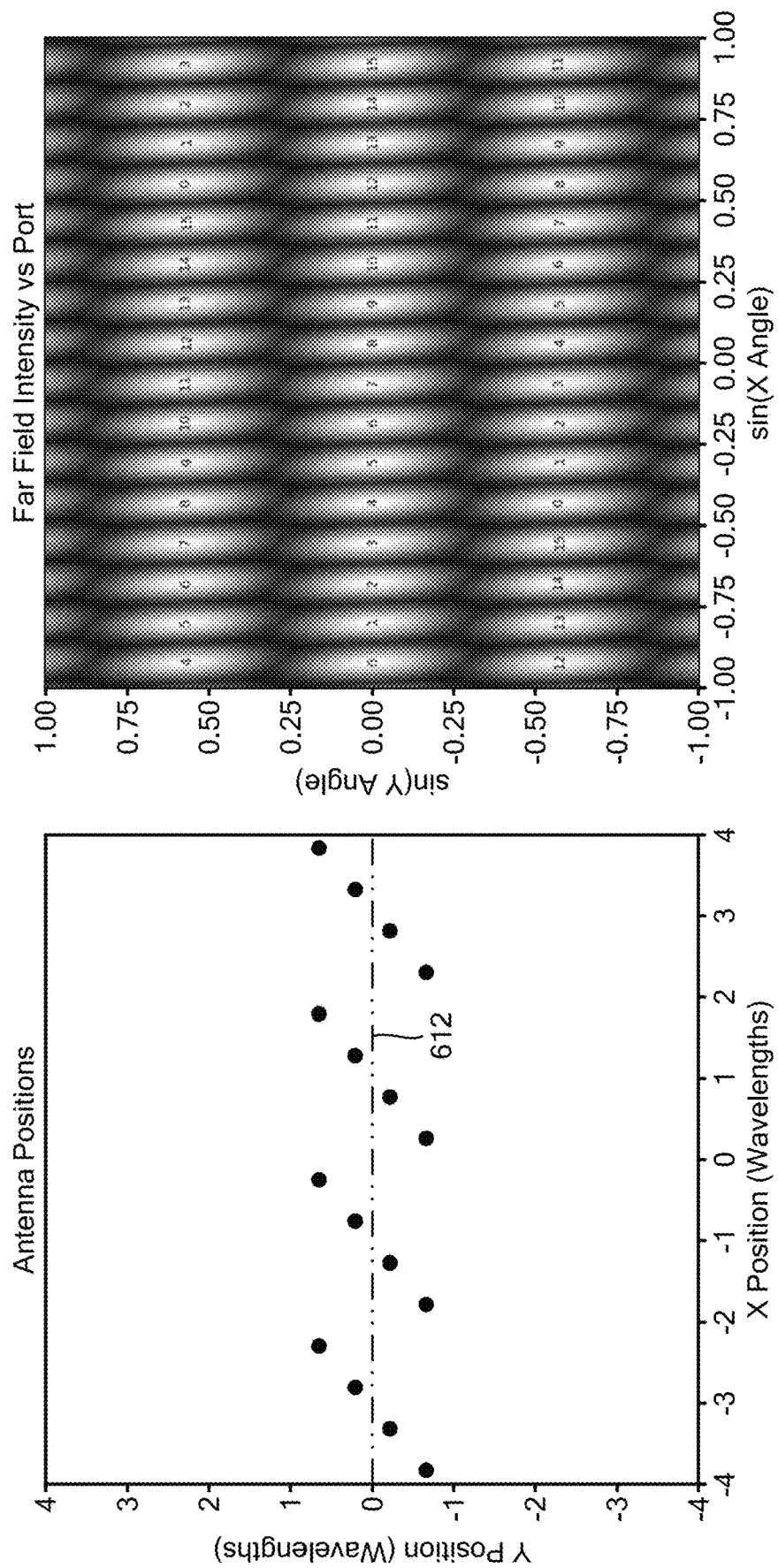
Figure 12:
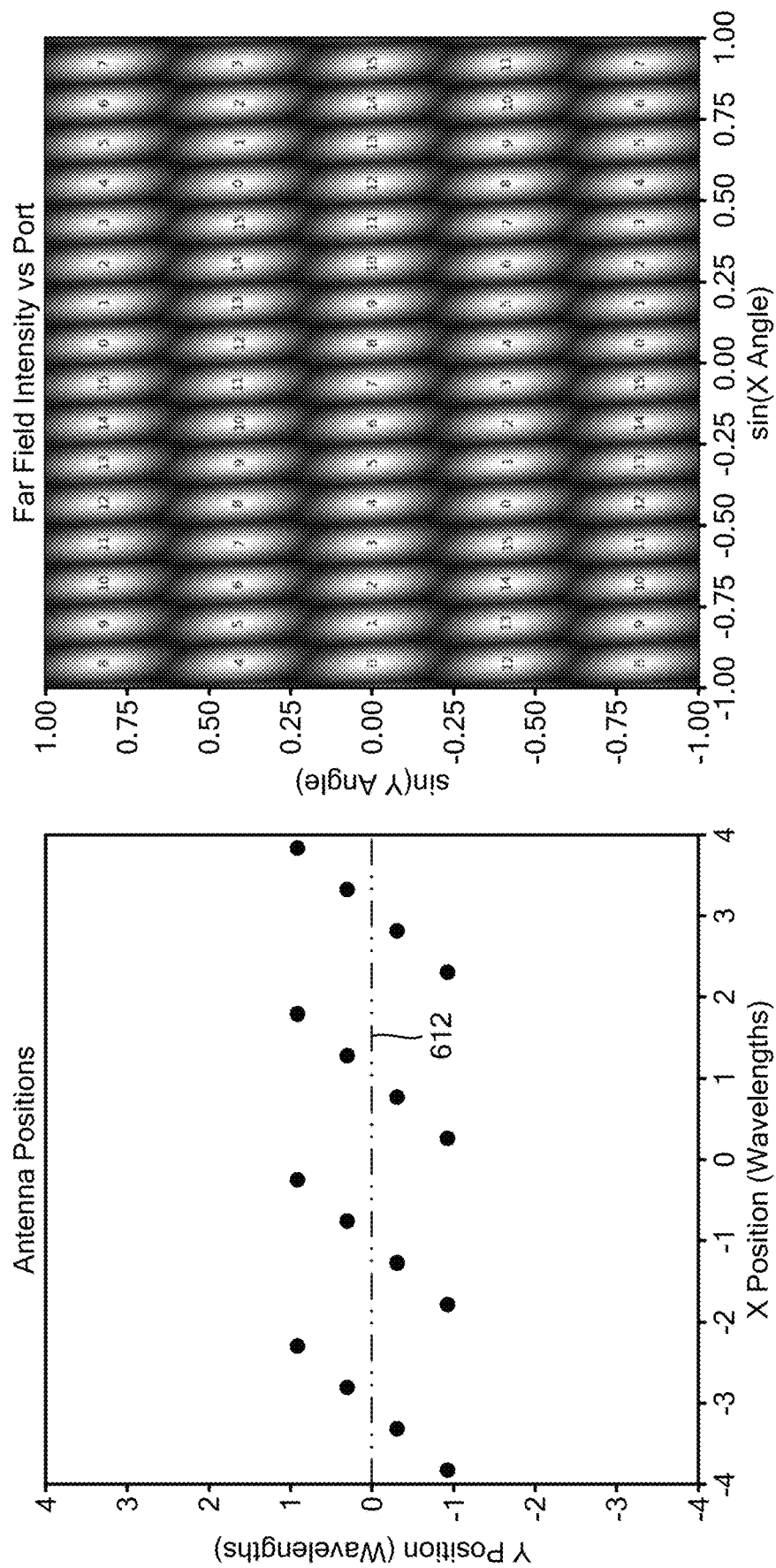
Figure 13:
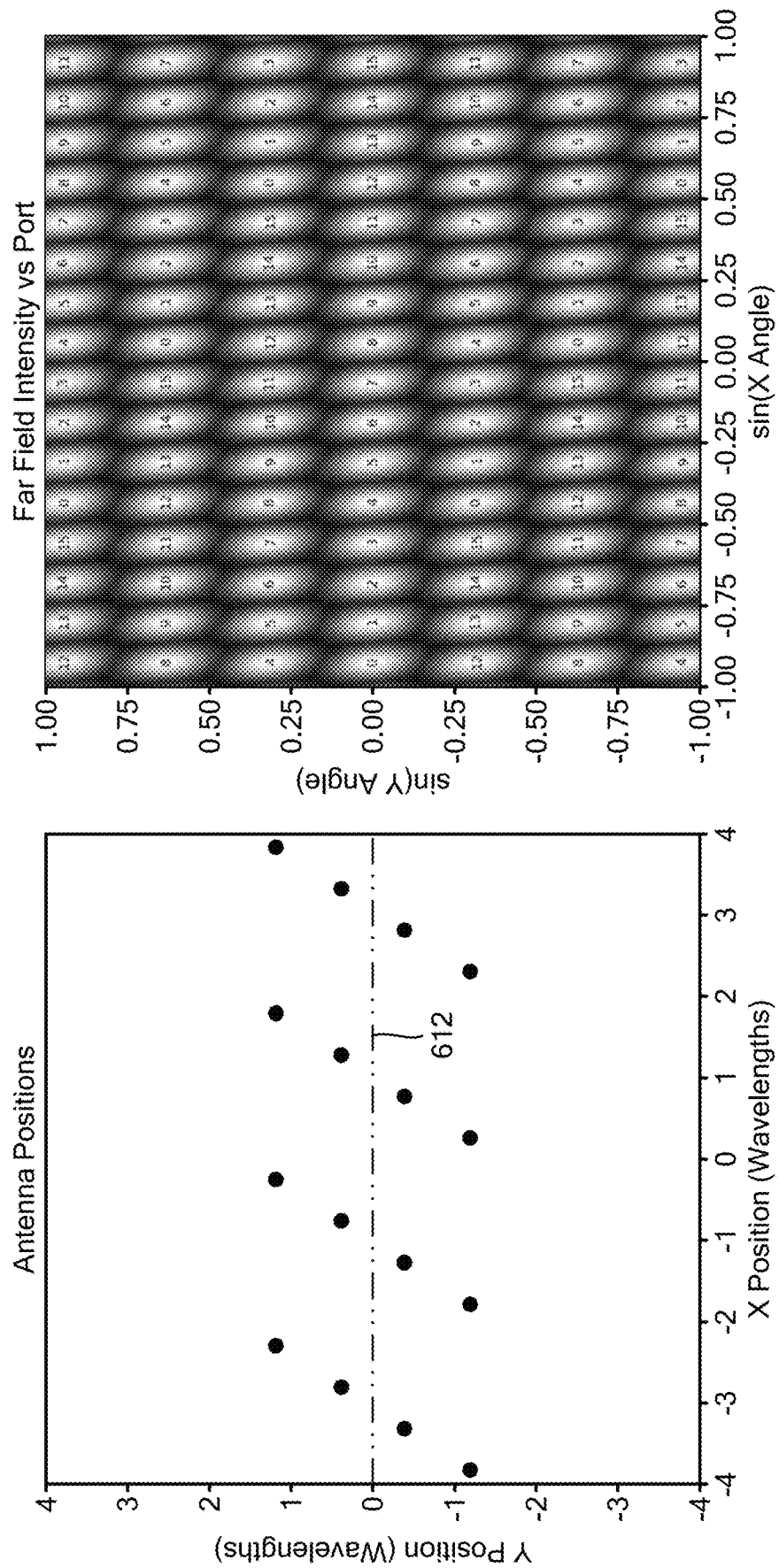
Figure 14:
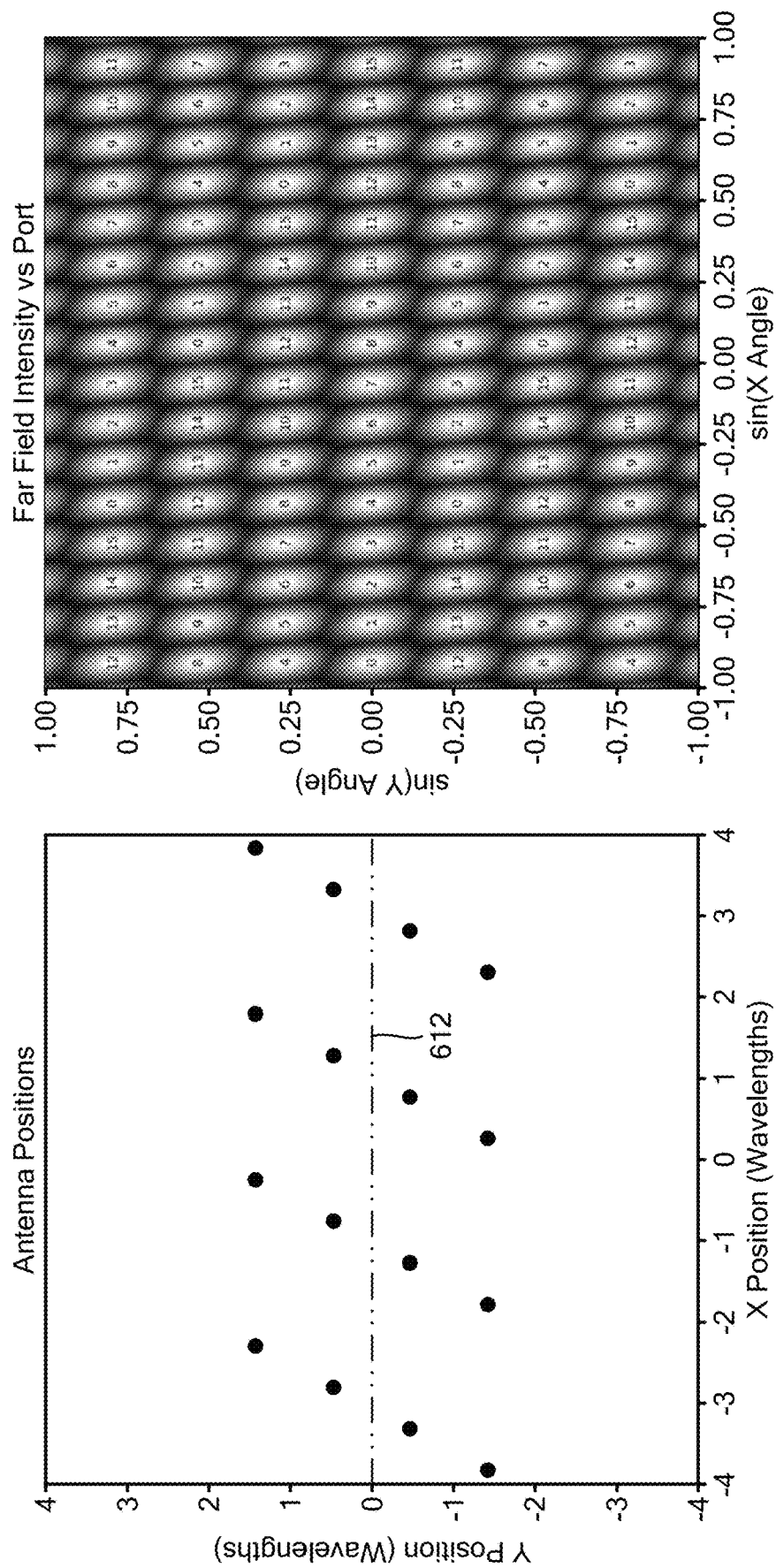

In each of FIGS. 9-15, the antennas 404-410 are displaced progressively further from the longitudinal axis 612. FIG. 9 shows at least a non-empty subset of the antennas of each disjoint set 600-606 displaced perpendicularly a relatively small distance, exemplified by displacements 900 and 902, along the second surface from the longitudinal axis 612. For example, antenna 404 and three other antennas of subset 606 are perpendicularly displaced from the longitudinal axis 612. Similarly, antennas of the other subsets 604-600 are also displaced. The antennas 404-410 may be spaced apart along the longitudinal axis 612 (i.e., parallel to the X axis in FIGS. 9-15) an integral multiple of about one-half the design wavelength λ. As can be seen in the right portion of FIG. 9, with a relatively small amount of displacement 900 and 902 from the longitudinal axis 612 (i.e., parallel to the y axis in FIGS. 9-15), each pixel becomes an elongated ellipse, which no longer extends the entire height of the field of view. As shown in FIG. 10, with further displacement 1000 and 1002, the ellipse of each pixel shortens, and each pixel becomes replicated in the field of view. That is, each beam port 428-432 maps to multiple portions of the field of view. This progression continues in FIGS. 11-15, until each ellipse becomes nearly circular in FIG. 15.

A beam produced by the antenna system 400 has a cross-sectional size, which corresponds to a size of a portion of the field of view illuminated by the beam, i.e., a size of (angle subtended by) the pixel in the two-dimensional field of view. The cross-sectional size of (angle subtended by) the beam in a given direction depends on the largest distance between antennas 404-410 in that direction, i.e., the longest baseline in that direction. In FIG. 8, the X direction baseline 800 is apx. 8 wavelengths, and the Y direction baseline is zero. Progressing through FIGS. 9-15, the X direction baseline remains unchanged, whereas the Y direction baseline progressively increases, up to about 6 wavelengths 1502 in FIG. 15. Thus, the pixel size in the Y direction varies from about infinity times the size of the pixel in the X direction in FIG. 8, to about 8/6 times the size of the pixel in the X direction in FIG. 15.

Figure 15:
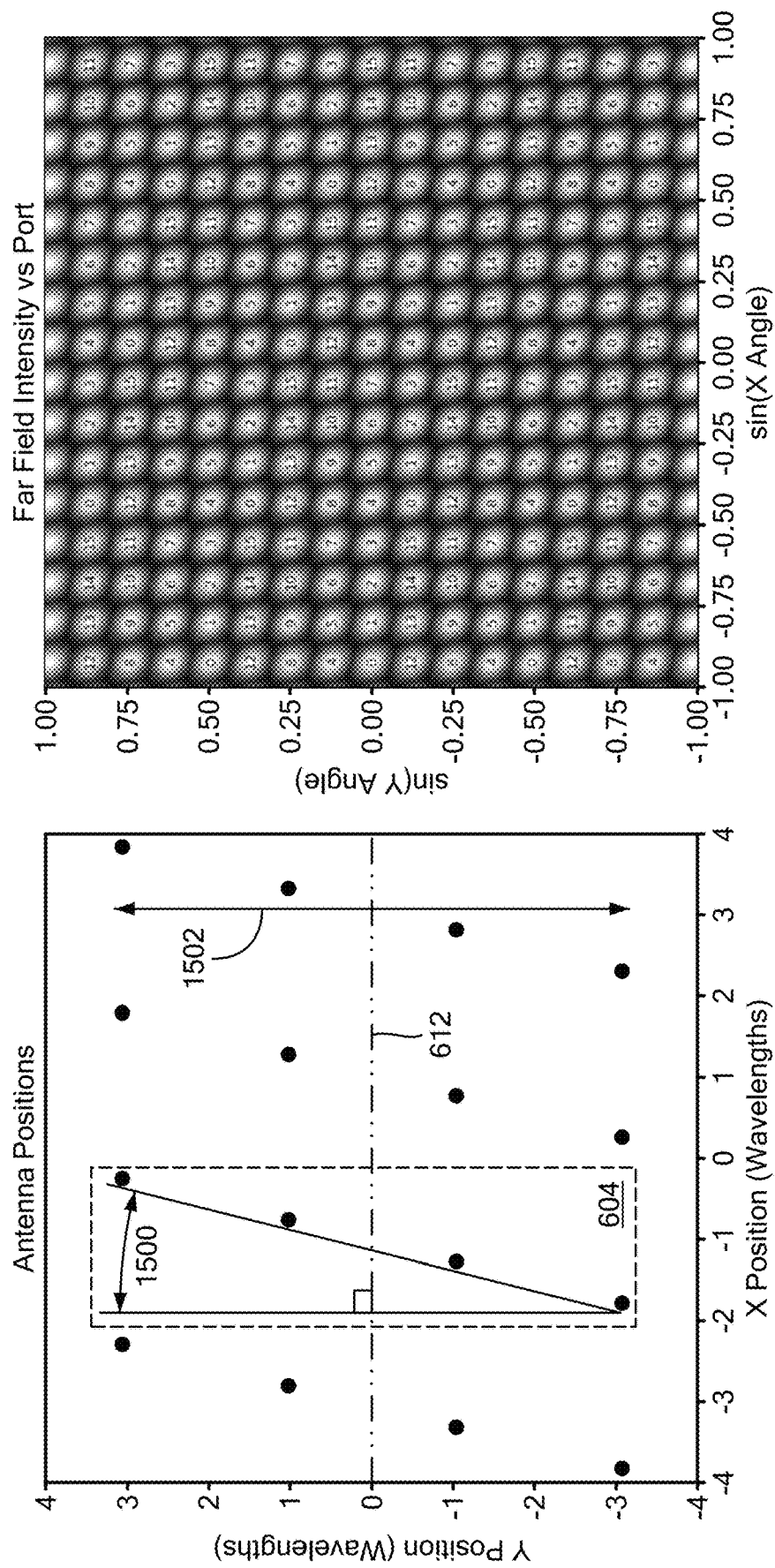
Figure 28:
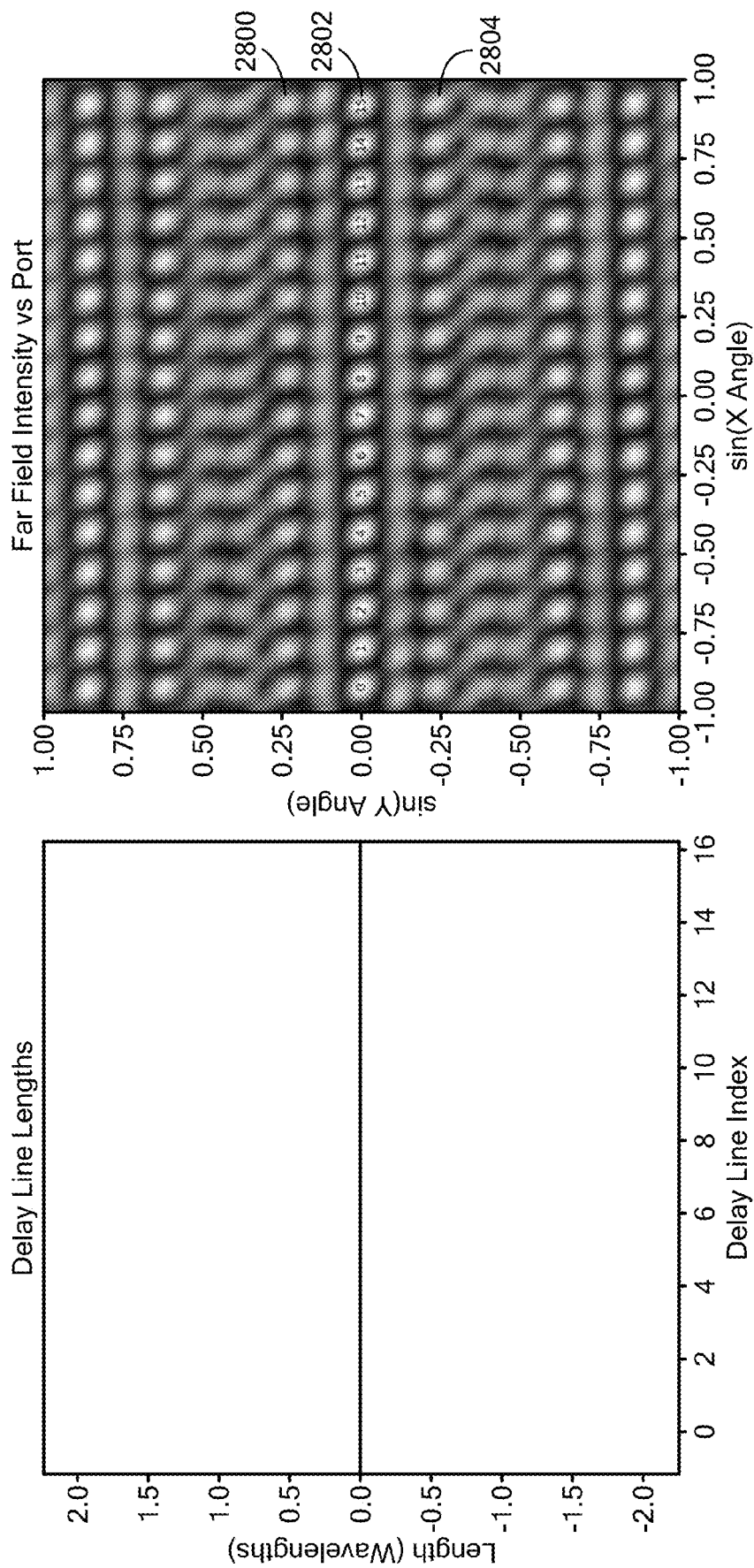
FIGS. 28-34 illustrate how progressively increasing relative delays in the feedlines progressively shifts the pixels from a one-dimensional beamforming arrangement to a two-dimensional beamforming arrangement, according to an embodiment of the present invention operating in broadband.

Displacing 900, 902, 1000, 1002 the antennas 404-410 from the longitudinal axis 612 by more than about λ/4 creates grating lobes in the far field of the Rotman lens 422. These grating lobes form grids from the signals from the antennas 404-410 at points in the field of view with the same relative distances to the antennas as the main lobe, modulo the wavelength λ. At different wavelengths, the grating lobes appear at slightly different locations in the field of view. FIG. 15 shows the main lobes and grating lobes at the center wavelength only, causing them to appear indistinguishable. FIG. 28 shows the same far field pattern, but at three different wavelengths, represented in red, green, and blue. The main lobes appear white as all three wavelengths are collocated, while the grating lobes appear in different places for each wavelength.

Figure 16:
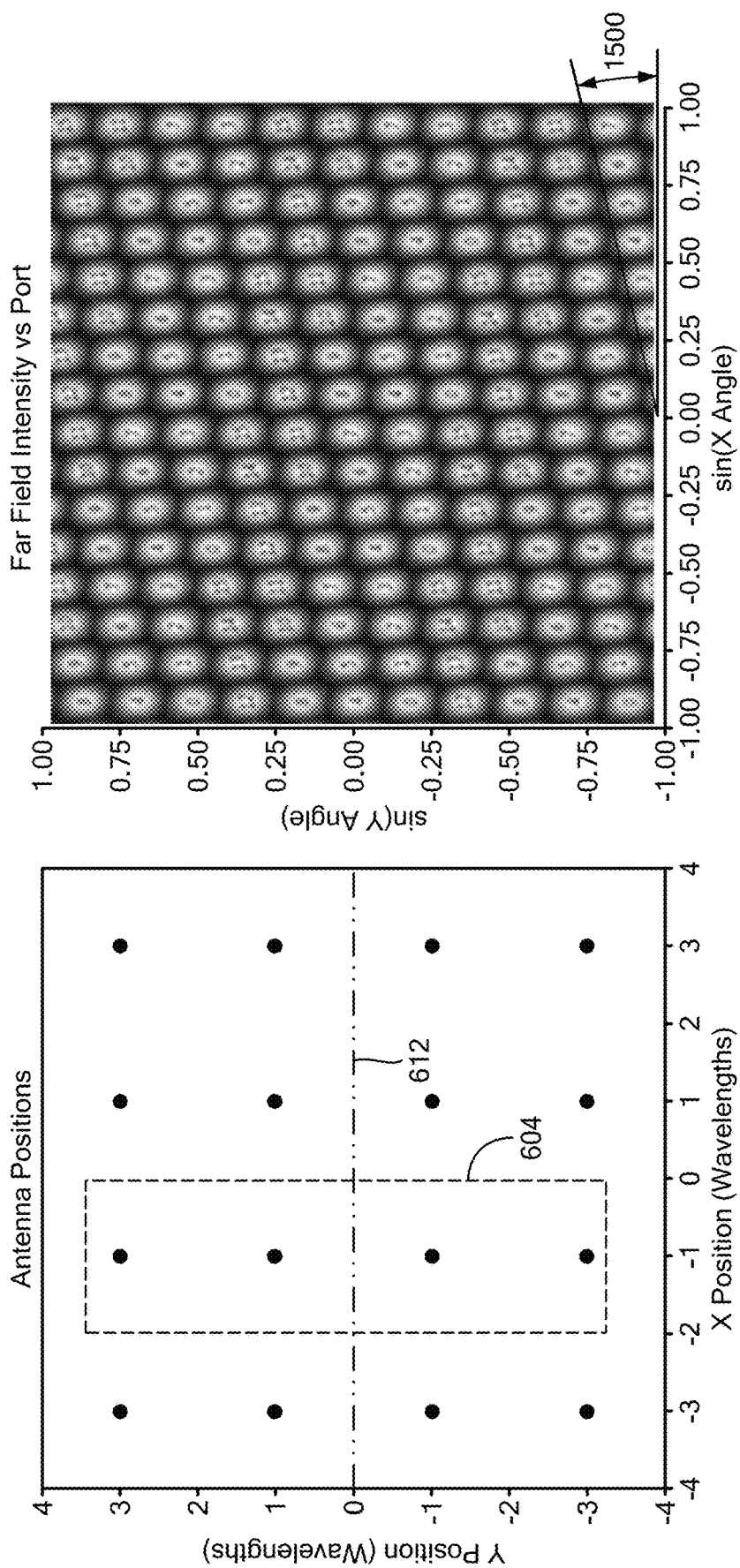
FIG. 16 illustrates how changing tilt of the antennas of the antenna system of FIGS. 4 and 9-15 impacts tilt of the pixels of the field of view, according to an embodiment of the present invention.

As indicated in FIG. 15, each set, exemplified by set 604, of the antennas 404-410 is tilted at an angle 1500, relative to the pixels in the far field. Equivalently, if the sets 600-606 of the antennas 404-410 of FIG. 15 are not tilted, as shown in FIG. 16, the pixels are tilted at the angle 1500. It should be noted that in both FIGS. 15 and 16, only one axis is tilted. In other words, the antenna array 402 or the pixel array is a parallelogram, in some cases an equilateral or a nearly equilateral parallelogram. For an antenna system 400 that includes N (N>1) sets 600-606 of antennas, the slope of the angle 1500 is about 1/N.

In practical applications, it may be simpler to fabricate the antennas 404-410 in a rectangular array, i.e., without the tilt 1500, as shown in FIG. 16. In any case, the tilt 1500 should not pose a problem, because in practical applications, software or hardware that controls drive of the antenna system 400 can compensate for the tilt 1500. Furthermore, since the tilt varies with the inverse of N, i.e., 1/N, in practical applications with relatively large numbers N of sets 600-606, the tilt is relatively small.

Compact Path-Matching Network

As noted, in some embodiments, the feedlines 412-418 (FIG. 4) provide equal effective path lengths between the respective antennas 404-410 and the beamforming network 420 and/or the Rotman lens 422. In such embodiments, because some of the antennas 404-410 are physically closer to the beamforming network 420 or the Rotman lens 422 than other of the antennas 404-410, some of the feedlines 412-418 may meander (not shown in FIG. 4), while other of the feedlines 412-418 follow straighter paths, in order to equalize their respective effective path lengths between the respective antennas 404-410 and the beamforming network 420 and/or the Rotman lens 422. In some embodiments, physical lengths of the respective paths are equal, in order to achieve equal effective path lengths. In other embodiments, optionally or alternatively, physical properties, such as indexes, of the paths may vary, from path to path, to achieve equal effective path lengths. Here, we focus on meandering as a mechanism to create equal physical path lengths.

A set of feedlines that establishes equal effective path lengths between the antennas 404-410 and the beamforming network 420 or the Rotman lens 422 is referred to herein as a "path-matching network." A path-matching network typically includes the entire length of each of the feedlines 412-418. However, a path-matching network can be thought of as including only a portion of the length of each feedline 412-418. In this sense, the path-matching network can be thought of as being communicably coupled between: (a) ends of the portions of the feedlines 412-418 extending to the respective antennas 404-410 and (10) the beamforming network 420 or the Rotman lens 422.

Various meandering arrangements of feedlines may be used to achieve equal effective path lengths. Disclosed herein is a compact path-matching network. Each such compact path-matching network includes variations of a meandering arrangement 1700 shown in solid line in FIG. 17. For example, the meandering arrangement 1700 may be repeated, with suitable adjustments of lengths of individual feedlines, and possibly left-to-right and/or top-to-bottom mirroring, for each set 600-606 of antennas. Although ends of the meandering arrangement 1700 are labeled in FIG. 17 as "To beamformer" and "To antennas," respectively, the two ends can be interchanged. The meandering arrangement 1700 includes four exemplary feedlines, representing portions of the feedlines 412-414 that feed one set 606 (FIG. 6) of antennas 404-406. However, a meandering arrangement 1700 can include other numbers of feedlines, equal to the number of antennas in respective sets of antennas or a subset of a set of the antennas. A portion 1702 of a possible adjacent meandering arrangement is shown in dashed line in FIG. 17 for reference.

The path-matching network is referred to as "compact," because adjacent pairs of the feedlines 412-414 are spaced apart from each other a minimum distance, represented by distances 1704, 1706, 1708 and 1710, based on the design wavelength 2 of the antenna system 400, taking into consideration a desired maximum amount of crosstalk between adjacent feedlines 412-414, possibly also including a safety margin, and materials and fabrication techniques used to make the feedlines 412-414 and a substrate on which the feedlines 412-414 are made or disposed. That is, the feedlines 412-414 are as close together as possible, without incurring undue cross talk between the feedlines 412-414. In some embodiments, the spacing 1704-1710 is as little as a few wavelengths λ.

Width 1712 of the meandering arrangement 1700 means lateral space required for the feedlines 412-414, including space 1710 between the meandering arrangement 1700 and the adjacent meandering arrangement 1702 on one side. ("Lateral" in this context means perpendicular to a feedline 412-414 at any given point along the feedline, or perpendicular to a general direction of a feedline 412-414.) In other embodiments, a path-matching network may include the meandering arrangement described herein, although with wider than minimum spacings 1704-1710.

Figure 17:
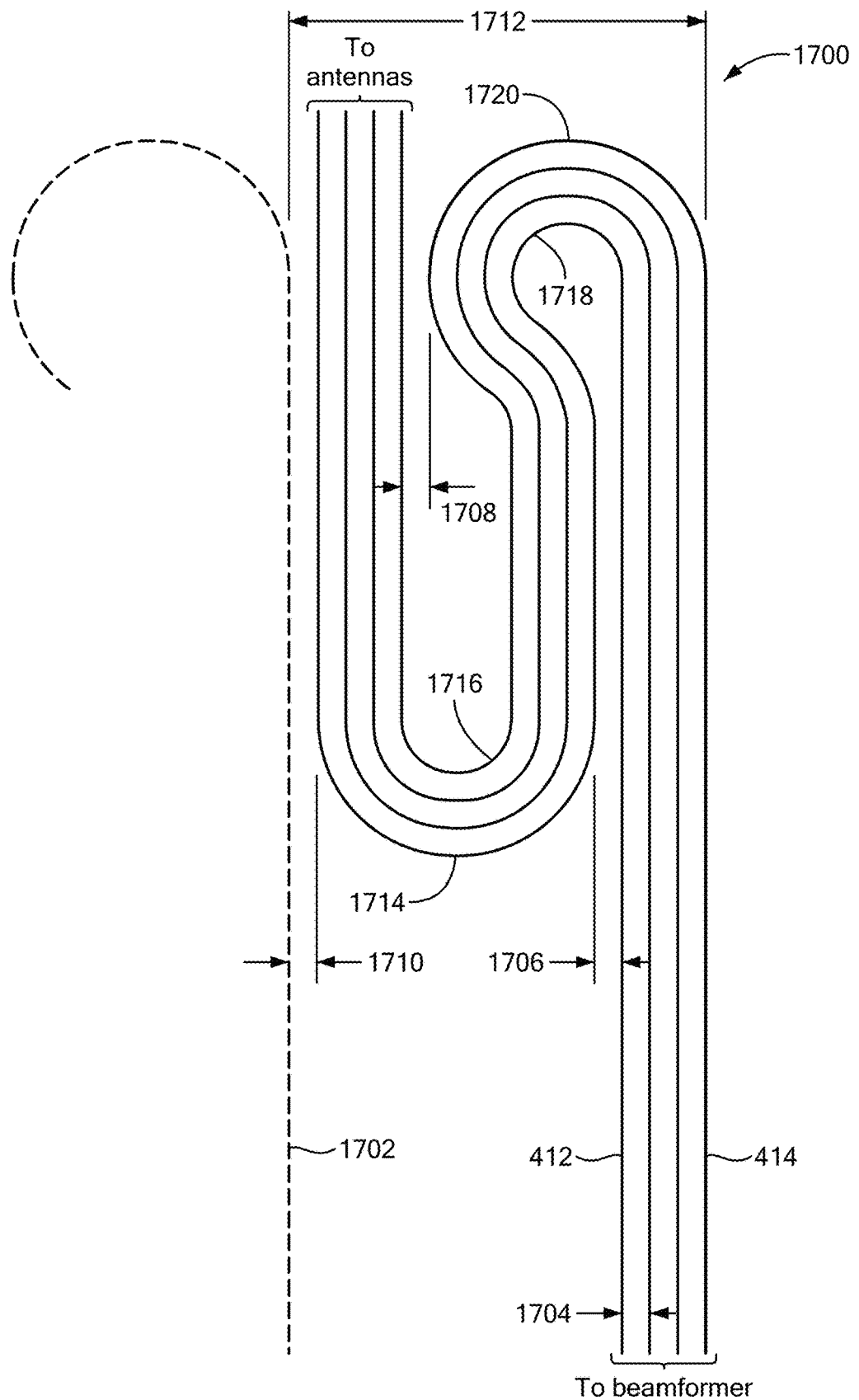
FIG. 17 illustrates a path meandering arrangement for a compact path-matching network, according to an embodiment of the present invention.

In the meandering arrangement 1700 shown in FIG. 17, each feedline 412-414 includes two bends, exemplified by first bends 1714 and 1716 in feedlines 412 and 414, respectively, and second bends, exemplified by bends 1718 and 1720, in feedlines 412 and 414, respectively. In other meandering arrangements (not shown), each feedline may include more than two bends. A reverse curve includes two bends in opposite directions.

Among the feedlines 412-414, the first bends 1714-1716 vary in radius, and the second bends 1718-1720 vary in radius. For example, in feedline 412, the first bend 1714 has a larger radius than the first bend 1716 in feedline 414. Intermediate feedlines have intermediate radii bends. Tighter bends tend to induce more waveguide losses than wider bends. Therefore, to an extent practical, each feedline 412-414 should have an integrated curvature approximately equal to the integrated curvature of each other feedline 412-414, to approximately equalize the losses in the feedlines 412-414. For example, in feedline 412, the first bend 1714 is relatively wide and the second bend 1718 is relatively tight, whereas in feedline 414 the first bend 1716 is relatively tight and the second bend 1720 is relatively wide, but the sum of the radii 1714 and 1718 at least approximately equal the sum of the radii 1716 and 1720. Similarly, the sum of the radii of each intermediate feedline at least approximately equals the sum of radii 1714 and 1718, and at least approximately equals the sum of radii 1716 and 1720.

All the feedlines 412-414 of the meandering arrangement 1700 shown in FIG. 17 have equal lengths and, therefore, equal effective path lengths, assuming substantially the same materials are used to fabricate each of the feedlines 412-414. However, as noted, some of the antennas of the set 606 (FIG. 6), such as antenna 404, are closer to the beamforming network 420 (FIG. 4) or the Rotman lens 422 than other of the antennas, such as antenna 406. Thus, some of the feedlines 412-414 in FIG. 17, such as the feedline 412, should be made longer than the other feedlines, such as feedline 414, to equalize the effective path lengths to the respective antennas 404-406.

Figure 18:
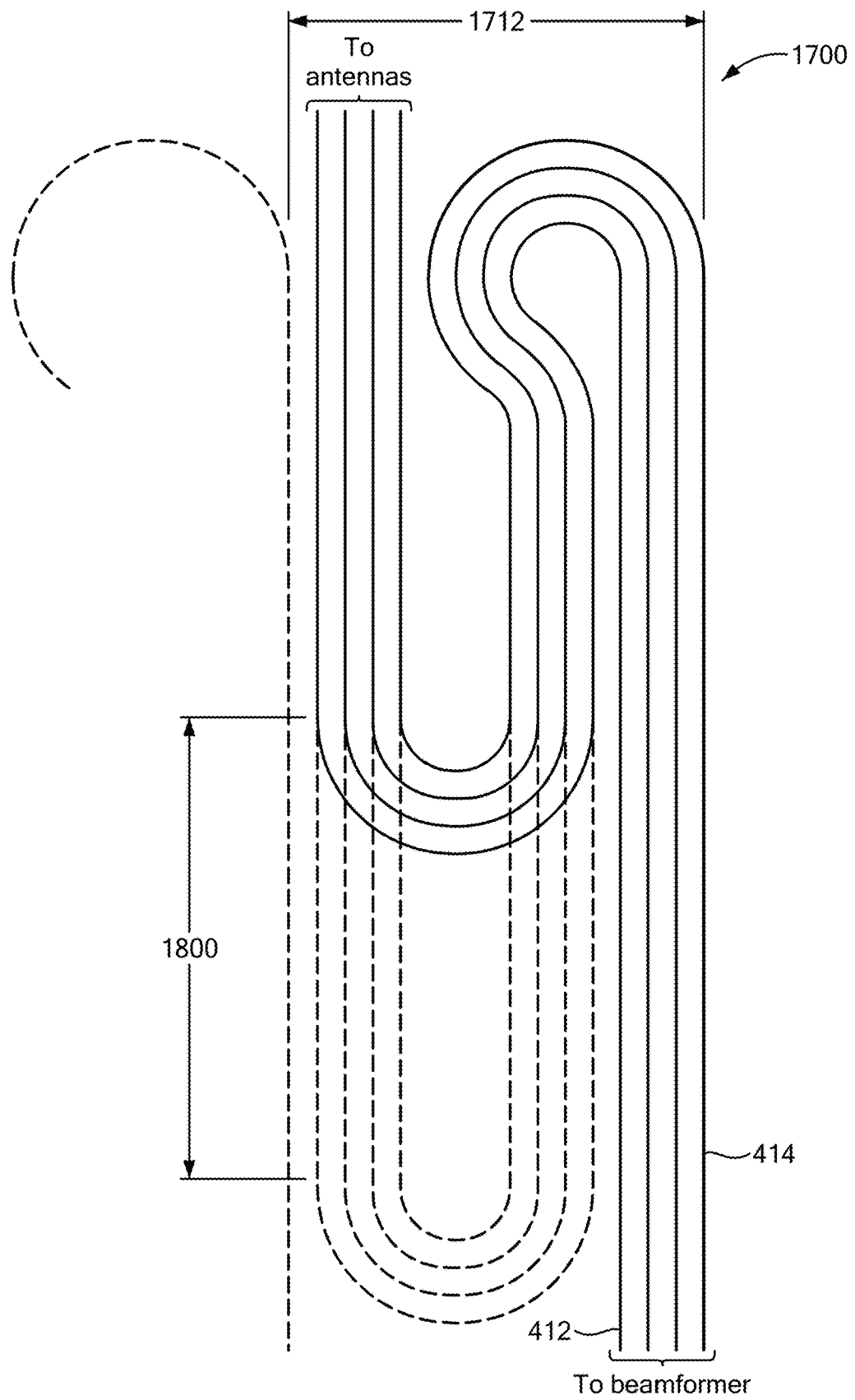
FIG. 18 illustrates how each feedline of FIG. 17 can be lengthened by an identical amount, without increasing width of the meandering arrangement, according to an embodiment of the present invention.

FIG. 18 shows, in dashed line, how each of the feedlines 412-414 of FIG. 17 can be lengthened, without increasing the width 1712 of the meandering arrangement 1700. Although all the feedlines 412-414 are lengthened by equal amounts (two times distance 1800) in FIG. 18, each feedline 412-414 can be lengthened a different amount, as needed, for example as indicated at 1900, 1902, 1904 and 1906 in FIG. 19.

Figure 19:
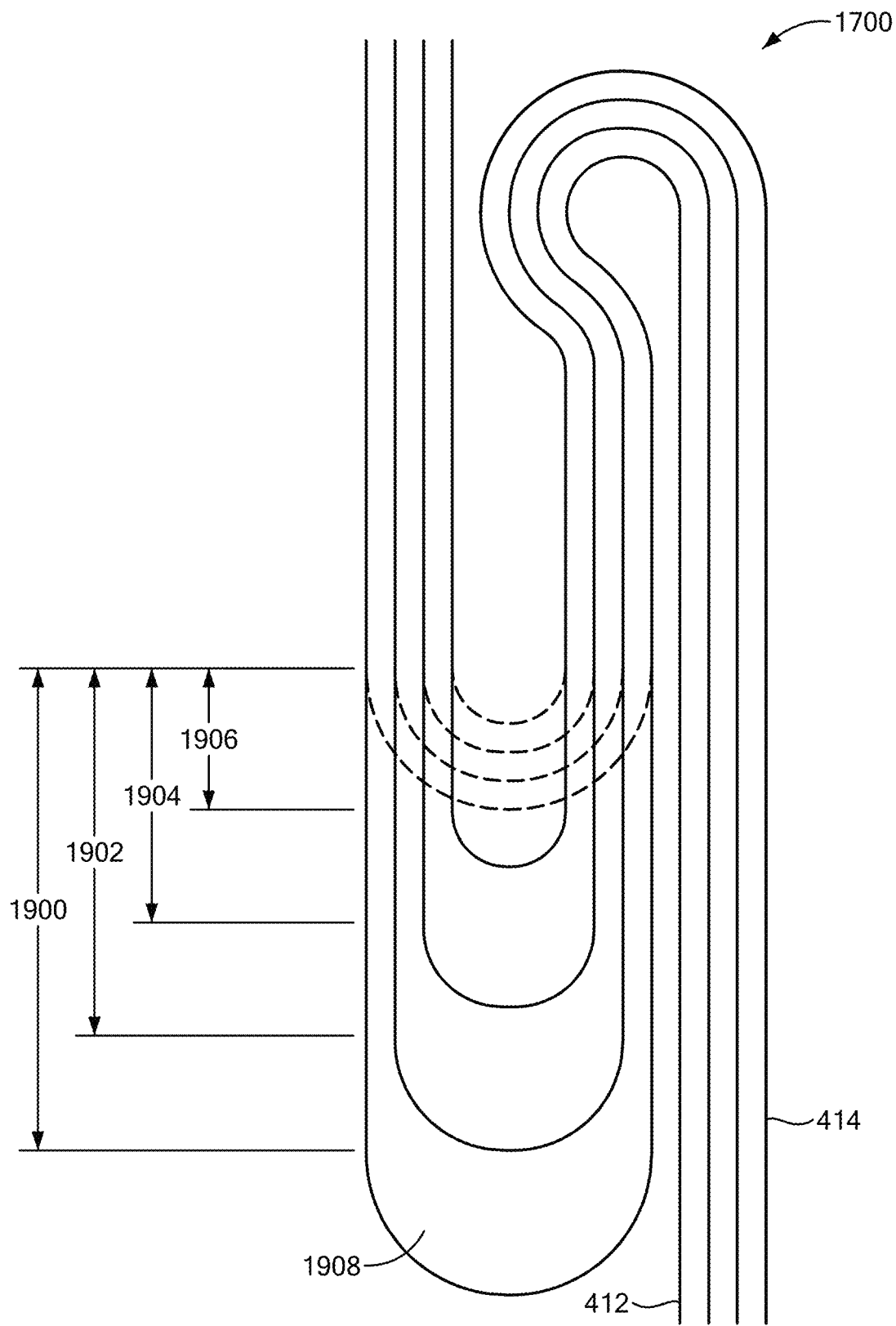
FIG. 19 is similar to FIG. 18, except each feedline is lengthened by a different amount, according to an embodiment of the present invention.
Figure 20:
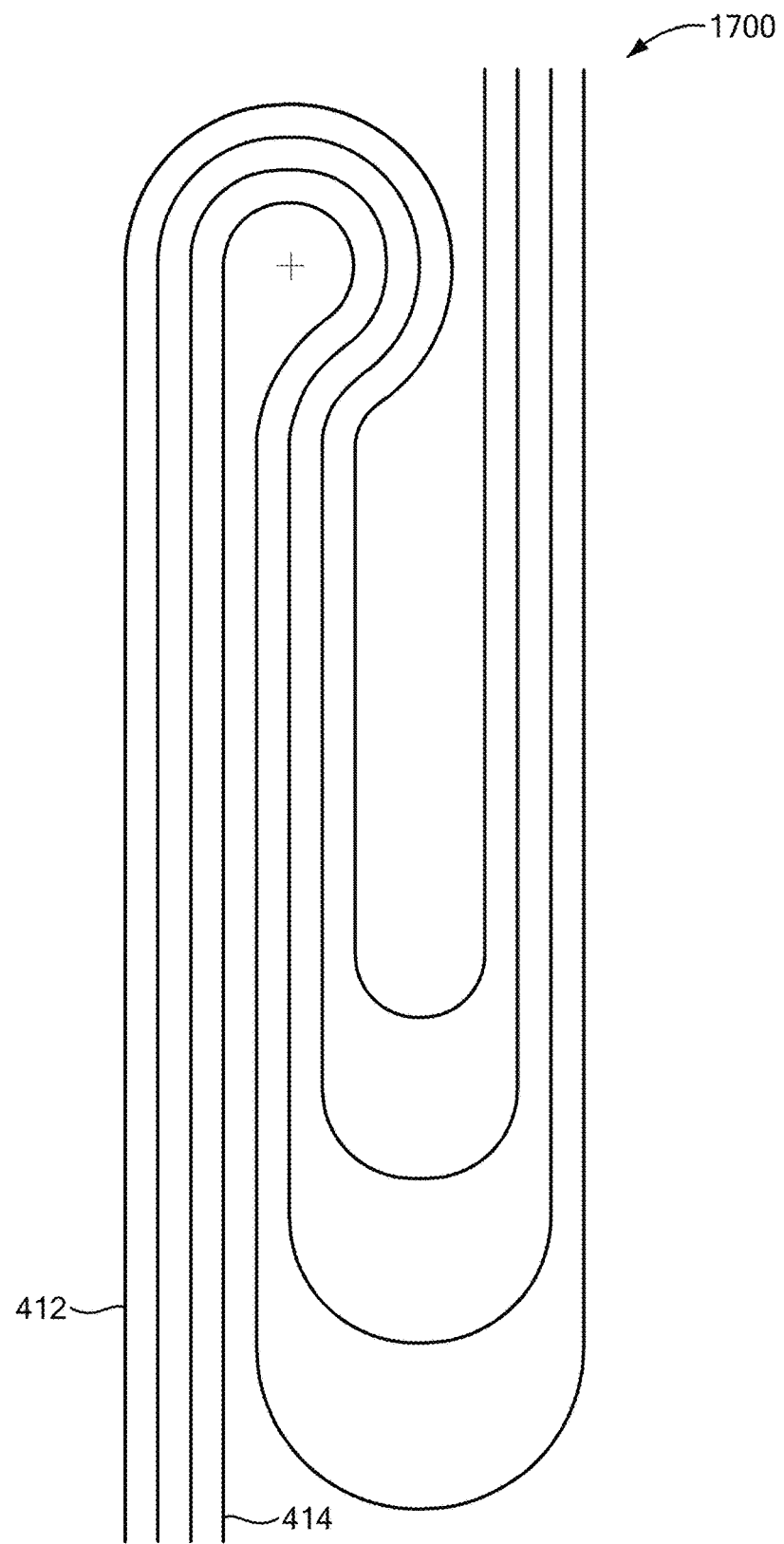
FIG. 20 illustrates a path meandering arrangement, similar to the path meandering arrangement of FIGS. 17-19, except mirrored left-to-right, according to an embodiment of the present invention.

With the meandering arrangement 1700 shown in FIGS. 17-19, each feedline 414, etc. can be lengthened no more than the feedline to its left. Thus, delays introduced by lengthening the feedlines 412-414 increase monotonically from the right-most feedline 414 to the left-most feedline 412. If, however, it is necessary to monotonically increase delays from left to right, the meandering arrangement 1700 can be mirrored left-to-right, as shown in FIG. 20.

Figure 21:
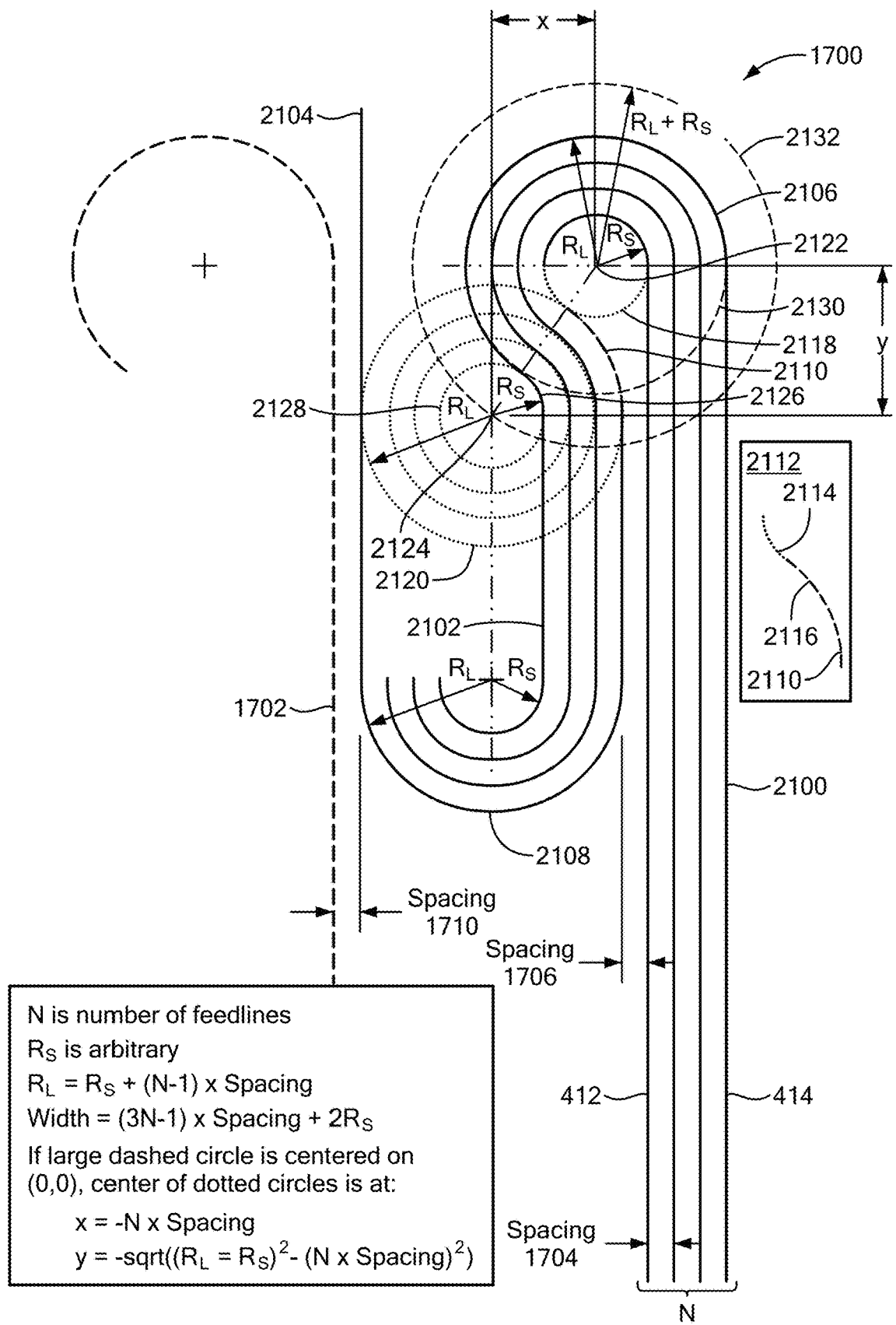
FIG. 21 illustrates dimensions, coordinates and mathematical relationships there among for designing the compact path-matching network of FIGS. 17-20, according to an embodiment of the present invention.

FIG. 21 illustrates dimensions, coordinates and mathematical relationships there among for designing a compact path-matching network of N feedlines 412-414, according to an embodiment of the present invention. Portions of some of the feedlines 412-414 are omitted from FIG. 21 for clarity.

As noted, the feedlines 412-414 are spaced apart by spacings 1704-1710. In general, the feedlines 412-414 are parallel to each other. However, inter-feedline spacing need not necessarily be equal along the entire lengths of a feedlines 412-414, particularly along portions of the feedlines 412-414 where the feedlines 412-414 are lengthened by different amounts, as discussed with respect to FIG. 19, for example in an area 1908.

A smallest radius $R_S$ of curvature of the feedlines 412-414 is arbitrary, in that $R_S$ does not depend on any of the other measurements shown in FIG. 21. The smallest radius $R_S$ of curvature may, for example, be selected based on a desired maximum bending loss (insertion loss) of the respective curved portions of the feedline 412-414. Other things being equal, bending loss generally increases with decreased bending radius. Bending loss can be calculated or estimated by well-known methods, for example based on bending radius, waveguide size, wavelength, waveguide materials used and fabrication method.

Considerations for selecting the inter-feedline spacing 1704-1710 are discussed herein, with reference to FIG. 17.

A largest radius $R_L$ of curvature of the feedlines 412-414 depends on $R_S$, the inter-feedline spacing 1704-1710 and the number N of feedlines 412-414, according to equation (1):

$$R_L = R_S + (N-1) \times \text{Spacing} \tag{1}$$

Each feedline 412-414 includes straight sections, exemplified by straight sections 2100, 2102 and 2104 (FIG. 21), and curved sections, exemplified by curved sections 2106 and 2108. Each curved section 2106 and 2108 is a portion of a circle. Curved section 2108 is a semicircle, and curved section 2106 includes a semicircle and an S-shaped (reverse curve) portion 2110. A reverse curve is a curve to the left or right followed immediately by a curve in the opposite direction. The S-shaped portion 2110 is also shown separately in an insert box 2112, for clarity. As can be seen most clearly in the insert box 2112, the S-shaped portion 2110 includes two opposite curves 2114 and 2116, indicated by dotted and dashed lines, respectively. Each of the two opposite curves 2114 and 2116 is part of a respective circle indicated by dotted lines 2118 and 2120, respectively. The two opposite curves 2114 and 2116 are joined, end-to-end, such that the two opposite curves 2114 and 2116 are tangent to each other.

The curved section 2106 and the corresponding curved sections of the other feedlines 414, etc., including dotted circle 2118, are all centered on a first common point 2122. FIG. 21 shows radii $R_S$ and $R_L$ extending from the first common point 2122.

The curved section 2110 and the corresponding curved sections of the other feedlines 414, etc., including dotted circle 2120, are all centered on a second common point 2124, distinct from the first common point 2122. Additional dotted circles are centered on the second common point 2124, and the corresponding curved sections of the other feedlines 414, etc., follow respective portions of the additional dotted circles.

If the first common point 2122 is thought of as being positioned at coordinates (0, 0), coordinates (x, y) of the second common point 2124 can be calculated as follows. A portion 2126 of the feedline 414 follows a dotted circle 2128, which has a radius $R_S$ and is centered at the second common point 2124. The dotted circle 2128 is tangent to dashed circle 2130, which is centered at the first common point 2122 and has radius $R_L$. Thus, the dotted circle 2128 must be centered on dashed circle 2132, centered at the first common point 2122 and having a radius $R_L + R_S$. The x coordinate of the second common point 2124 is calculated according to equation (2):

$$x = -N \times \text{Spacing} \tag{2}$$

Figure 22:
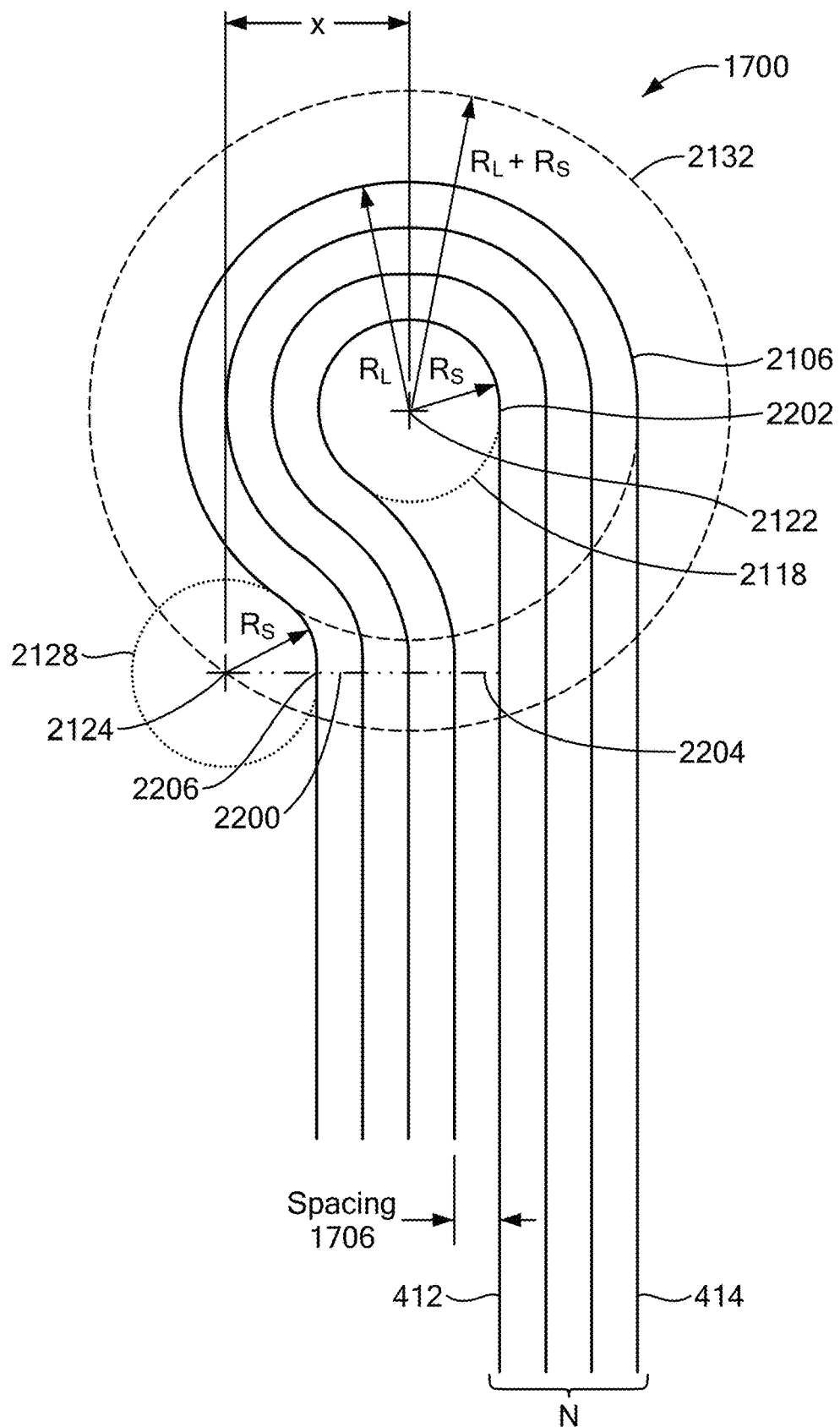
FIG. 22 shows an enlarged portion of FIG. 21.

Equation (2) is explained with reference to FIG. 22, which shows an enlarged portion of FIG. 21. Consider a horizontal line 2200 extending from the left-most feedline 412 to the second common point 2124. Since the first common point 2122 is at the origin (0, 0), and the smallest dotted circle 2118 has radius $R_S$, a point of tangency 2202 of the feedline 412 and the smallest dotted circle 2118 has an x coordinate equal to $R_S$. Thus, the x coordinate of point 2204, where the line 2200 intersects the (vertical) feedline 412 is also $R_S$. From the point 2204, the line 2200 extends left to the second common point 2124. The line 2200 intersects the smallest dotted circle 2128 at a point 2206. The distance between the points 2204 and 2206 is N times the spacing 1706. Thus, the x coordinate of the point 2206 is $R_S - (N \times \text{Spacing})$. Since the second common point 2124 is $R_S$ units to the left of the point 2206, the x coordinate of the second common point 2124 is $R_S - (N \times \text{Spacing}) - R_S = -(N \times \text{Spacing})$, as shown in equation (2).

As noted, the dashed circle 2132 is centered on coordinates (0, 0). The equation for the dashed circle 2132 is:

$$x^2 + y^2 = (R_L + R_S)^2 \tag{3}$$

Solving equation (3) for y negative:

$$y = -\sqrt{(R_L + R_S)^2 - x^2} \tag{4}$$

Substituting x from equation (2) into equation (4):

$$y = -\sqrt{(R_L + R_S)^2 - (N \times \text{Spacing})^2} \tag{5}$$

Thus, equations (2) and (5) give the (x, y) coordinates of the second common point 2124, relative to the first common point 2122.

Figure 45:
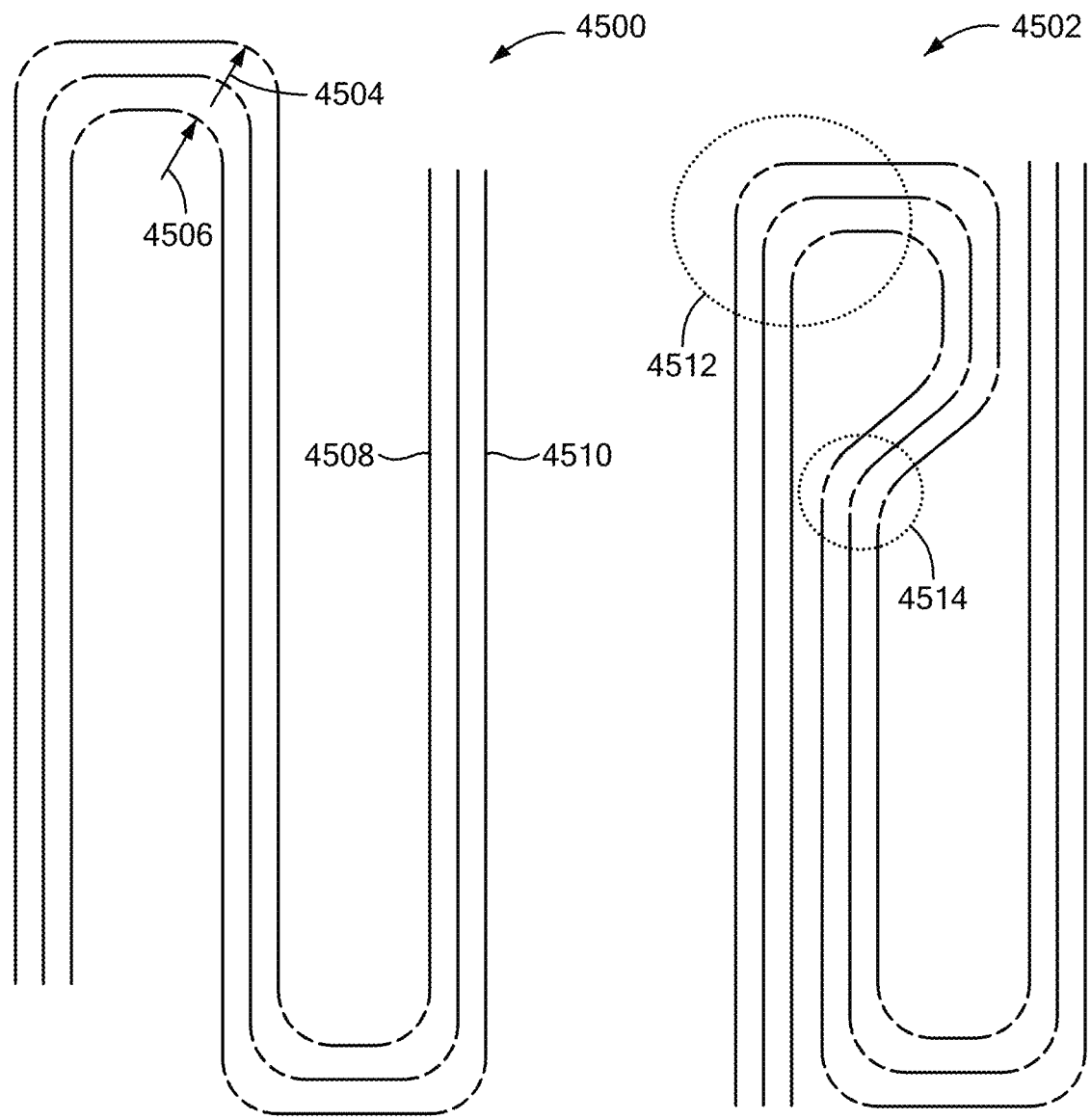
FIG. 45 illustrates two variations of the meandering arrangement of FIG. 17, according to respective embodiments of the present invention.

Although the path lengths in FIG. 17 are equal, more tightly curved paths incur more signal losses than less tightly curved paths. Thus, for example, although they are of equal length, feedline 412 may suffer more signal loss than feedline 414, other things being equal. FIG. 45 illustrates two variations 4500 and 4502 of the meandering arrangement 1700 of FIG. 17 that solve this problem. In the meandering arrangement 4500 shown in FIG. 45, each curve (shown in dashed line) is identical, including having an identical radius, exemplified by radii 4504 and 4506. Thus, feedlines 4508 and 4510 are of equal length and incur equal signal losses due to having identical curves.

A meandering arrangement can include more than one type (size and/or shape) curve. For example, meandering arrangement 4502 includes two types of curves, i.e., quarter circles in region 4512, and 1/8 circles in region 4514. However, within each region 4512-4514, respective curves are identical.

The curves shown in FIG. 45 are portions of circles. However, the curves need not necessarily be portions of circles. Other shaped curves (not shown) may be used, as long as they are identical, within manufacturing tolerances, within respective regions.

Narrowband Two-Dimensional Planar and Crossover-Free Beamforming Network Architecture Returning to FIG. 4, assuming a suitable path-matching network, as described with reference to FIGS. 17-22 and 45, is included, and the antennas 404-410 are suitably spaced apart horizontally and vertically, the antenna system 400 has a two-dimensional field of view, as discussed with reference to FIGS. 5 and 9-16, yet can be implemented on a surface, such as on an electronic or photonic integrated circuit, with no waveguide crossing. As described thus far, the antenna system 400 has a relatively narrow usable bandwidth outside of a central broadband row of pixels, in that the direction of the beam changes with wavelength, causing bandwidth spreading, which worsens with distance from the central row. For example, for an N×N device, a p % change in wavelength of a signal fed to a given beam-side interface port 428-432 causes a change in direction of the beam equal to about Nxp % of the beam size (effective pixel size) per row away from the center. Consequently, the spectrum of each pixel of a broadband signal is somewhat "smeared" in the field of view, similarly to white light through a prism.

Resolution in a given dimension is inversely proportional to maximum separation of antennas in that dimension. If the maximum separation of antennas is too small, there will be insufficient resolution to differentiate along that dimension, causing the antenna array to effectively have a one-dimensional field of view. In addition, the size of the grating-lobe-free field of view (the size of box 502 in FIG. 5, or the areas with only white spots in FIGS. 38-41) in a given dimension is inversely proportional to the minimum separation of antennas in that dimension. Therefore, spreading the antennas out in a given dimension shrinks the field of view and increases the number of grating lobes (i.e., replicated ellipses), which could be useful in some cases and problematic in others, depending on design objectives of the antenna system.

Figure 23:
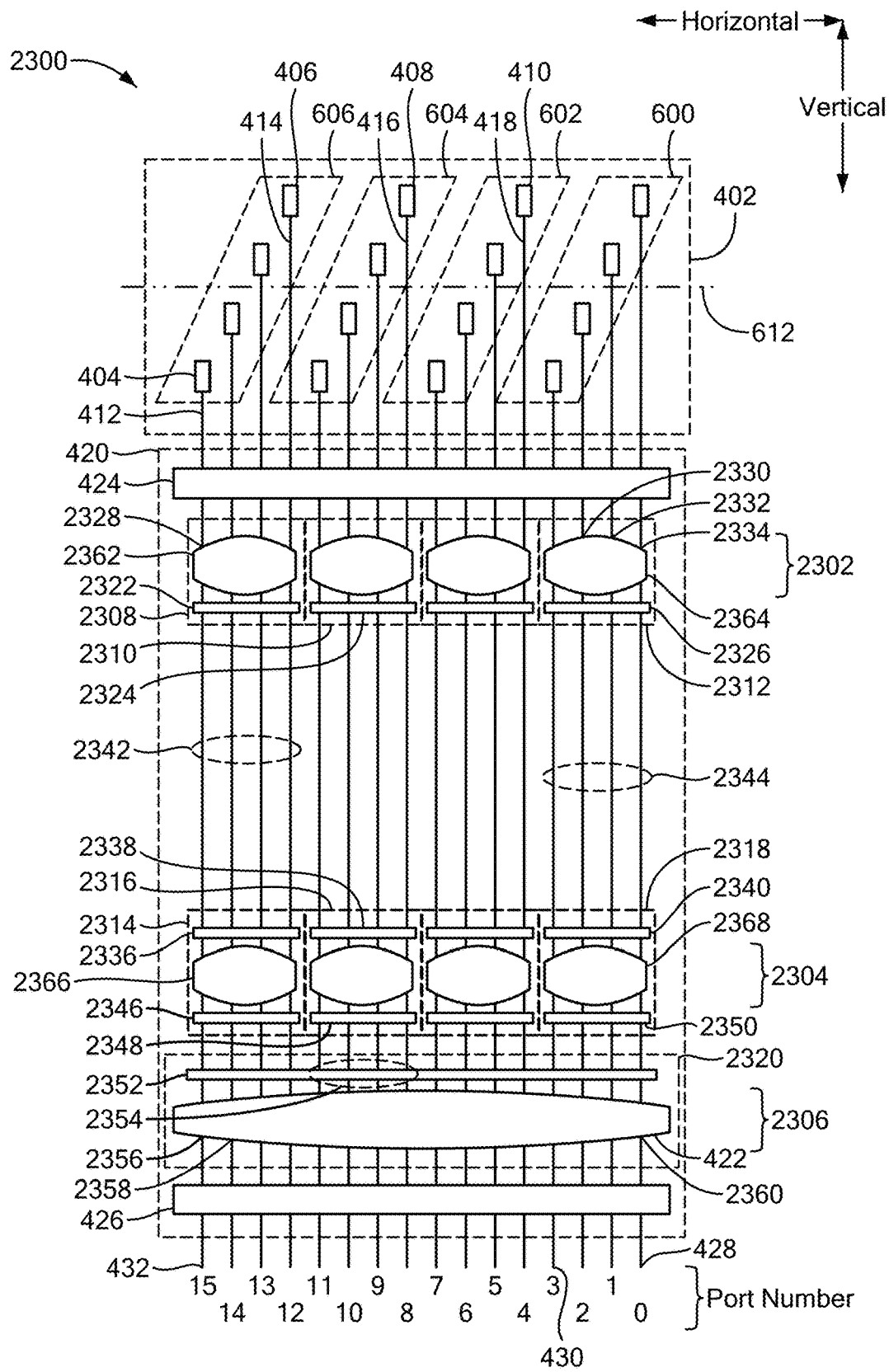
FIG. 23 is a partially schematic diagram of a crossover-free antenna system capable of two-dimensional beamforming, according to an embodiment of the present invention.

The antenna system 400 of FIG. 4 can be made usable over a wide bandwidth by modifying the two-dimensional beamforming network 420, for example as shown in FIG. 23. FIG. 23 is a diagram of a crossover-free antenna system 2300, similar to the antenna system 400 of FIG. 4. However, the two-dimensional beamforming network 420 includes three stages 2302, 2304 and 2306 of beamforming networks. The first stage 2302 includes N first beamforming networks, exemplified by first beamforming networks 2308, 2310 and 2312. The second stage 2304 includes N second beamforming networks, exemplified by second beamforming networks 2314, 2316 and 2318. The third stage 2306 includes a third beamforming network 2320.

Each first beamforming network 2308-2312 is associated with a distinct set of the antennas 404-410. For example, in the embodiment shown in FIG. 23, continuing with the example antenna sets 600-606 of FIG. 6, first beamforming network 2308 is associated with set 606 of the antennas 404-410, and first beamforming network 2310 is associated with set 604 of the antennas 404-410. Each first beamforming network 2308-2312 has a beam-side interface, exemplified by beam-side interfaces 2322, 2324 and 2326.

Each first beamforming network 2308-2312 also has a plurality of array-side ports. For example, first beamforming network 2308 has array-side port 2328, and first beamforming network 2312 has array-side ports 2330, 2332 and 2334. The array-side ports 2328-2334 of each first beamforming network 2308-2312 are individually communicably coupled to respective antennas 404-410 of the associated set 600-606 of the antennas 404-410. For example, the array-side port 2328 is individually communicably coupled to antenna 404 via feedline 412. (The earlier discussion, with reference to FIG. 4, of individually communicably coupled antennas 404-410 also applies to the embodiment shown in FIG. 23.) The array-side ports 2328-2334 of the N first beamforming networks 2308-2312 thereby collectively form the one-dimensional array-side interface 424 of the two-dimensional beamforming network 420.

Each second beamforming network 2314-2318 is associated with a distinct first beamforming network 2308-2312. For example, second beamforming network 2314 is associated with first beamforming network 2308, and second beamforming network 2316 is associated with first beamforming network 2310.

Each second beamforming network 2314-2318 has a beam-side interface, exemplified by beam-side interfaces 2336, 2338 and 2340. Each beam-side interface 2336-2340 of each second beamforming network 2314-2318 is communicably coupled to the beam-side interface 2322-2326 of its associated first beamforming network 2308-2312. For example, beam-side interface 2336 of second beamforming network 2314 is communicably coupled to beam-side interface 2322 of first beamforming network 2308. In some embodiments, each beam-side interface 2336-2340 of each second beamforming networks 2314-2318 is communicably coupled to the associated beam-side interface 2322-2326 of the associated first beamforming network 2308-2312 via a respective group of feedlines, exemplified by feedline groups 2342 and 2344. However, in some embodiments, described herein, a bulk medium, rather than individual feedlines, communicably couples each beam-side interface 2336-2350 to the associated beam-side interface 2322-2326 of the associated first beamforming network 2308-2312.

Each second beamforming network 2314-2318 has an array-side interface, exemplified by array-side interfaces 2346, 2348 and 2350. The third beamforming network 2320 has an array-side interface 2352. The array-side interface 2346-2350 of each second beamforming network 2314-2318 is communicably coupled to a respective distinct portion of the array-side interface 2352 of the third beamforming network 2320. For example, array-side interface 2348 of second beamforming network 2316 is communicably coupled to a portion 2354 of the array-side interface 2352 of the third beamforming network 2320.

The third beamforming network 2320 has a plurality of beam-side ports, exemplified by beam-side ports 2356, 2358 and 2360. The plurality of beam-side ports 2356-2360 of the third beamforming network 2320 collectively forms the segmented one-dimensional beam-side interface 426 of the two-dimensional beamforming network 420.

Each first beamforming network 2308-2312 may consist essentially of a respective one-dimensional beamforming network. The first beamforming networks 2308-2312 may all be disposed on a common surface. In the embodiment shown in FIG. 23, each first beamforming network 2308-2312 includes a single respective Rotman lens, represented by Rotman lenses 2362 and 2364. Each second beamforming network 2314-2318 may consist essentially of a respective one-dimensional beamforming network, distinct from the first beamforming networks 2308-2312. The second beamforming network 2314-2318 may all be disposed on a common surface, which can, but need not, be the same surface on which the first beamforming networks 2308-2312 are disposed. In the embodiment shown in FIG. 23, each second beamforming network 2314-2318 includes a single respective Rotman lens, represented by Rotman lenses 2366 and 2368. The third beamforming network 2320 may consist essentially of a distinct one-dimensional beamforming network, distinct from the first and second beamforming networks 2308-23 12 and 2314-2318. The third beamforming network 2320 may, but need not, be disposed on the same surface as the first and second beamforming networks 2308-2312 and 2314-2318. In the embodiment shown in FIG. 23, the third beamforming network 2320 includes the single Rotman lens 422.

In another embodiment (not shown), the Rotman lenses of the first beamforming network 2308-2312 are reused for the second beamforming networks 2314-2318 by essentially folding the device in half across the middle to overlap the Rotman lenses. A 180 degree turn (fold) can be implemented with a mirror. The path delays between the first and second layers (of the broadband Fourier lens) then become longer or shorter paths to the mirrors. A Rotman lens used both forwards and backwards, combined with monotonically increasing paths with mirrors on the ends, is known as a Rotman-lens spectrum decomposer (RLSD), an example of which is described in FIG. 11 of X. Wang, et al., "Flexible-Resolution, Arbitrary-Input, and Tunable Rotman Lens Spectrum Decomposer," IEEE Transactions on Antennas and Propagation, vol. 66, no. 8, pp. 3936-3947, Aug. 2018, doi: 10.1109/TAP.2018.2839896 ("Wang"), the entire contents of which are hereby incorporated by reference herein, for all purposes. The array side interfaces of a combined/folded Rotman lens correspond to the ports on the left side of Wang's FIG. 11, and the beam side interfaces, i.e., where the device is folded, are on the right side of Wang's FIG. 11. An RLSD-based embodiment may not necessarily be manufacturable on a single flat surface without crossovers or extra assembly steps. However, RLSDs implemented on multi-layer photonic chips may be used.

Returning to the embodiment shown in FIG. 23, two additional Rotman lenses, for example Rotman lenses 2362 and 2366, are interposed between each set 600-606 of antennas and the "primary" Rotman lens 422. Inserting this pair of Rotman lenses 2362 and 2366 effectively reverses the longitudinal order of the feedlines at 2352, relative to their ordering at 424, within each set 600-606 of antennas, because a Fourier transform of a Fourier transform is effectively an order reversal. "Longitudinal" in this context means in a direction parallel to the longitudinal axis 612.

Figure 24:
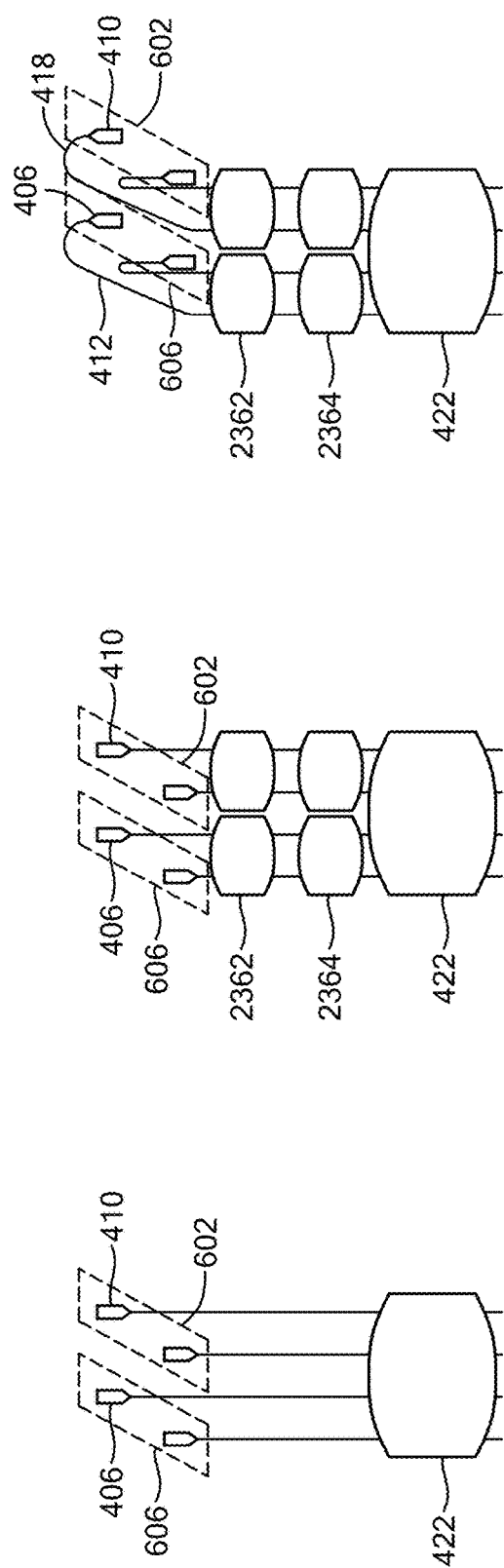
FIG. 24 illustrates a column-wise longitudinal reversal of antenna order and resulting change in pixel arrangement of the crossover-free antenna system of FIGS. 4, 6 and 23, according to an embodiment of the present invention.
Figure 24:
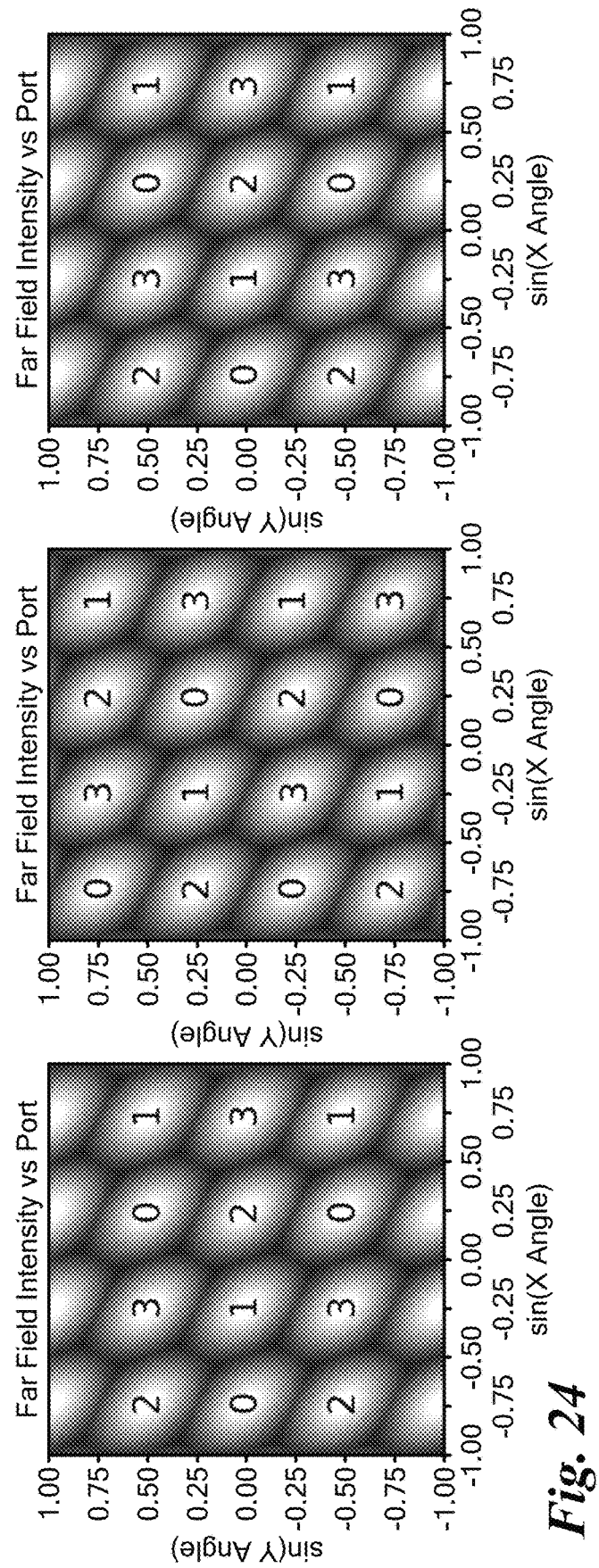

Reversing the longitudinal order of the feedlines changes the order of the pixels in the field of view of the antenna system 2300, as illustrated in FIG. 24. A simplified version of the antenna system 400 is shown on the top-left portion of FIG. 24, along with its far field pixel mapping in the bottom-left portion of the figure. For simplicity of explanation, FIG. 24 shows only two groups 602 and 606 of antennas, and only two antennas, exemplified by antennas 410 and 406, in each group. Like reference numerals in FIGS. 4, 23 and 24 refer to like items.

A simplified version of the antenna system 2300 is shown in the middle (left to right) of FIG. 24, along with its far field pixel mapping. As shown on the right in FIG. 24, reversing the order of the feedlines in each set 600-606 of antennas counteracts the reversal due to the pair of Rotman lenses 2362 and 2366. Note that the far field pixel mapping on the right in FIG. 24 is the same as the far field pixel mapping on the left in FIG. 24, whereas the pixel mapping in the center in FIG. 24 is different from that shown in the left and right in FIG. 24. Thus, applying this feedline reversal scheme to the antenna system 2300 of FIG. 23, the array-side ports 2328-2334 of the first beamforming network 2302, 2308-23 12 would be transversely ordered in a first order. The antennas 404-410 of the associated set of the antennas would be transversely ordered in a second order, and the antennas of the associated set of the antennas would be individually communicably coupled to the respective array-side ports 2328-2334 such that the first order is opposite the second order.

Figure 25:
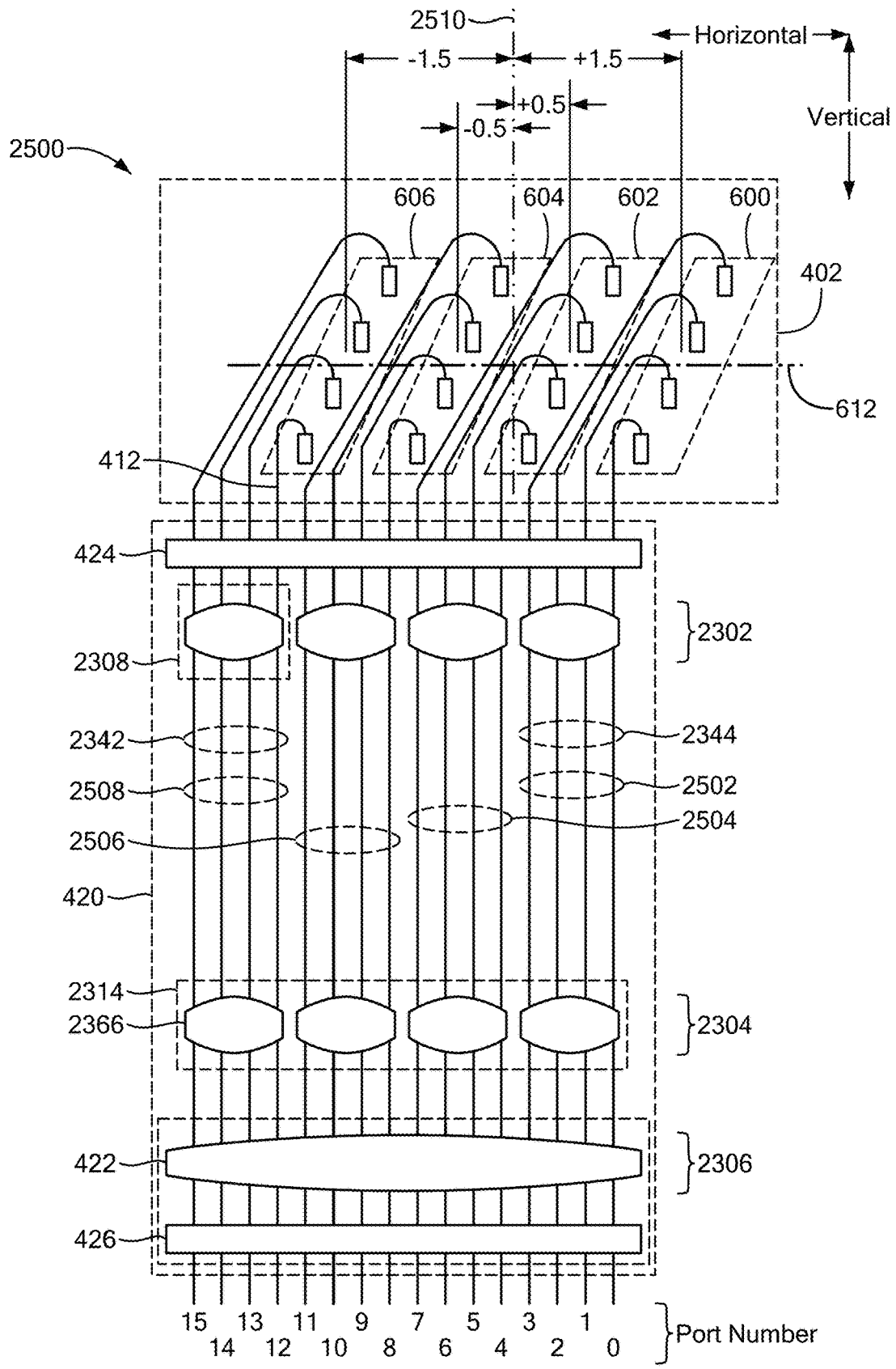
FIG. 25 is a partially schematic diagram of a crossover-free antenna system capable of two-dimensional beamforming, according to an embodiment of the present invention.

FIG. 25 is a diagram of a crossover-free antenna system 2500, similar to the antenna system 2300 of FIG. 23, however in FIG. 25, the feedlines in each set 600-606 of antennas are longitudinally reversed, as discussed with respect to FIG. 24. Differences in the lengths of the feedlines 412-418, as a result of reversing their order, can be compensated with the path-matching network described with reference to FIGS. 17-22. Assuming a suitable path-matching network is included, and the antennas 404-410 are suitably spaced apart horizontally and vertically, the antenna system 2500 has a two-dimensional field of view, as discussed with reference to FIGS. 5 and 9-16, yet can be implemented on a surface, such as on an electronic or photonic integrated circuit. The antenna system 2500 has a relatively narrow useable bandwidth, as discussed with respect to the antenna system 400 of FIG. 4. The right portion of FIG. 24 is repeated in the left portion of FIG. 26, except in FIG. 26 the far field pixel mapping is plotted in broadband, rather than narrowband, as it is in FIG. 24. A color/hash code 2600 is used in FIG. 26 to show the spectral smearing of some of the pixels.

Main lobes from the two-dimensional beamformer 420 appear white, while side lobes smear out into rainbows. As can be seen in the left portion of FIG. 26, central pixels 0, 1, 2 and 3 are not spectrally smeared, i.e., these pixels are broadband pixels. However, these central pixels 0-3 provide directivity and differentiation of signals in only one dimension, i.e., along the X axis.

Figure 26:
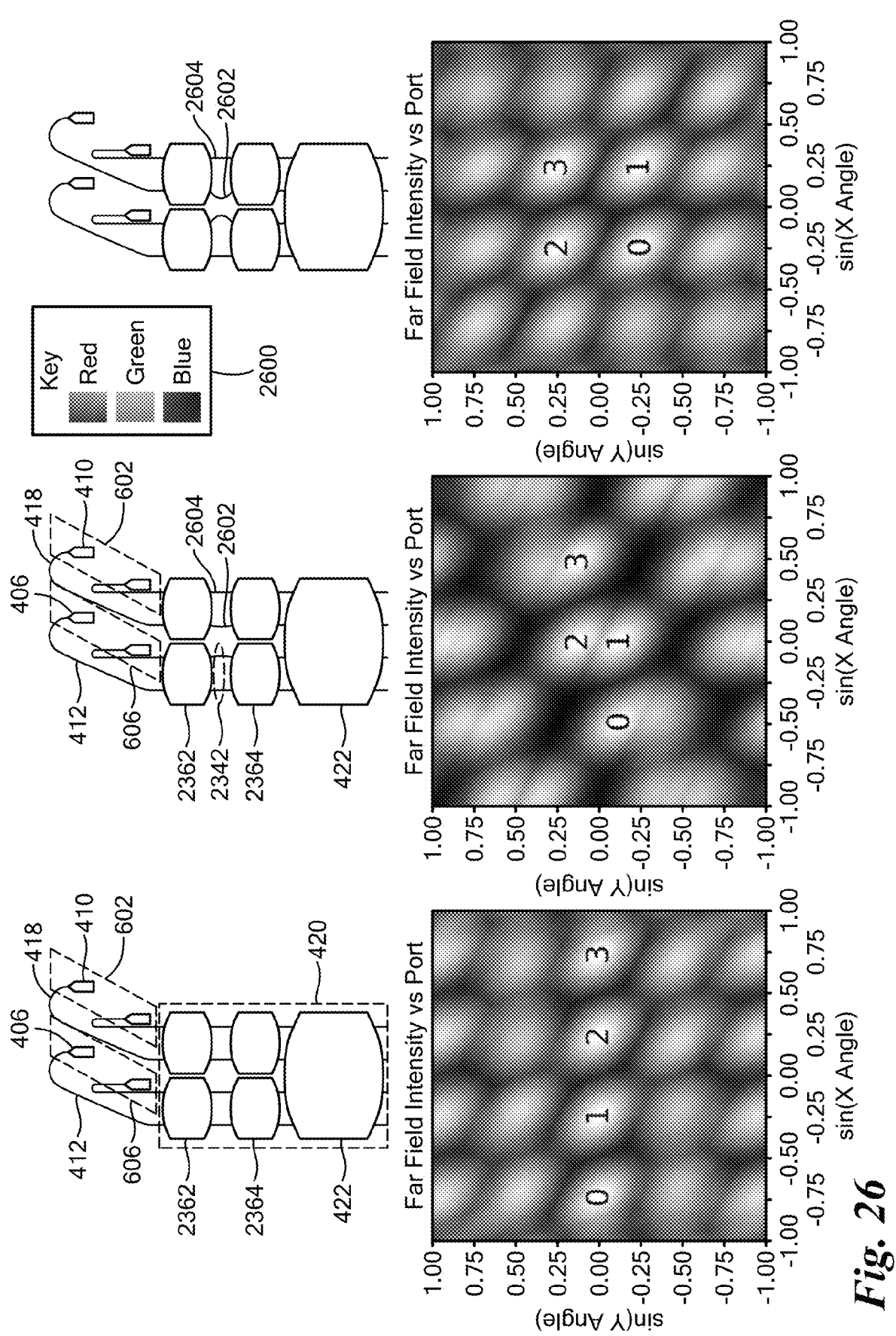
FIG. 26 illustrates imposing delays between stages of the crossover-free antenna system and resulting effect on broadband pixels, according to an embodiment of the present invention.

Broadband Two-Dimensional Planar and Crossover-Free Beamforming Network Architecture As shown in the center and right portions of FIG. 26, as contrasted with the left portion of FIG. 26, embodiments of the present invention rearrange the pixels in the far field pixel mapping to provide two-dimensional broadband beamforming by introducing particular delay relationships among the feedlines 2342, etc., as represented by feedline 2602 being longer (incurring more delay) than feedline 2604. Although the feedline 2604 is the same length (incurs the same delay) in the right and center portions of FIG. 26, the feedline 2602 is longer (incurs more delay) in the right portion of FIG. 26 than in the center portion of FIG. 26. Thus, the difference between the delays incurred by the feedlines 2602 and 2604 is greater in the right portion of FIG. 26 than in the center portion of FIG. 26. Note that the broadband pixels 0, 1, 2 and 3 are arranged in a square grid array in the right portion of FIG. 26, whereas these pixels 0, 1, 2 and 3 are arranged in approximately a parallelogram grid array in the center portion of FIG. 26.

As noted, the delay relationships involve particular differences in delays in the various feedlines within each set 600-606 of antennas and across the sets 600-606 of antennas. However, as can be seen by comparing the center and right portions of FIG. 26, increasing, to appropriate values, differences between the least delayed and most delayed individual feedlines for each set 600-606 of antennas, and differences between the least and most delayed sets 600-606, as well as appropriately adjusting the delays in intermediate feedlines and sets (none shown in FIG. 26), results in a two-dimensional broadband array of pixels in the center of the field of view. These delays shift the main lobes into the grid, enabling broadband imaging in the center of the far field.

Referring back to FIG. 25, each group of feedlines 2342-2344 can be considered a respective column 2502, 2504, 2506 and 2508 of feedlines, even if the individual feedlines are not straight. The delays are introduced within each column 2502-2508 and across the columns 2502-2508.

Each column 2502-2508 corresponds to a respective group of antennas 600-606. Each group of antennas 600-606 is disposed a respective lateral distance from a center line 2510. In FIG. 25, the groups of antennas 600-606 are assumed to be laterally equally spaced apart. However, in some embodiments, the groups of antennas 600-606 are unequally laterally spaced apart. That is, lateral spacings between adjacent groups of antennas 600-606 need not necessarily all be equal to each other. In some cases, entire groups of antennas or the antennas within the groups may be shifted, when coupled with appropriate changes to the delay lines lengths, or they may be omitted entirely. The number of groups of antennas does not necessarily need to be even. For example, in embodiments with odd numbers of groups of antennas 600-606, a center group of the antennas 404-410 may be disposed a zero lateral distance from the center line 2510.

We now discuss an exemplary case of evenly spaced columns without shifts or omissions. If the two-dimensional beamforming network 420 contains an odd number of columns 2502-2508 (odd number of groups of antennas 600-606), the columns 2502-2508 can be monotonically laterally numbered with unique integers (j) according to equation (6):

$$j \in \mathbb{Z}: -\left\lfloor \frac{N}{2} \right\rfloor \le j \le +\left\lfloor \frac{N}{2} \right\rfloor \tag{6}$$

where N is the number of groups of antennas 600-606 (equal to the number of columns 2502-2508). For example, if N=7, the columns 2502-2508 would be numbered, in order: −3, −2, −1, 0, +1, +2 and +3. Essentially, for any given column 2502-2508, j equals the number of columns the corresponding group of antennas 600-606 is laterally disposed from the center line 2510.

On the other hand, if the two-dimensional beamforming network 420 contains an even number of columns 2502-2508 (even number of groups of antennas 600-606), the columns 2502-2508 can be monotonically laterally numbered with unique rational numbers (j), spaced apart by 1, according to equation (7):

$$j \in \mathbb{Q}: -\left\lfloor \frac{N}{2} \right\rfloor + \frac{1}{2} \le j \le +\left\lfloor \frac{N}{2} \right\rfloor - \frac{1}{2} \tag{7}$$

For example, if N=4, the columns 2502-2508 would be numbered, in order: −1.5, −0.5, +0.5 and +1.5.

Alternatively, the columns 2502-2508 can be monotonically laterally numbered with unique rational numbers (j), spaced apart by 1, according to equation (8):

$$j \in \mathbb{Q}: -\left\lfloor \frac{(N-1)}{2} \right\rfloor \le j \le +\left\lfloor \frac{(N-1)}{2} \right\rfloor \tag{8}$$

Alternatively, the columns 2502-2508 can be monotonically laterally numbered with integers 0 to (N−1), then subtract (N−1)/2 from each number.

Assuming the array of antennas 402 is an N×N array, each column contains N feedlines, and the feedlines in each column can be numbered using the same scheme. Thus, for example, if N=4, the feedlines in each column are numbered, in order: −1.5, −0.5, +0.5 and +1.5. Essentially, for any given column 2502-2508, j equals the number of columns the corresponding group of antennas 600-606 is laterally displaced (displaced) from the center line 2510, as shown in FIG. 25. Note that if N is even, no set of antennas 606-606 is disposed on the center line 2510, so each set of antennas 600-606 is laterally disposed an odd integral multiple of ½ columns from the center line 2510.

In one embodiment, the maximum difference in delay (referred to herein as a "scaling factor") in the two-dimensional beamforming network 420, i.e., the delays between the first stage 2302 and the second stage 2304 of the two-dimensional beamforming network 420, not including internal delays of the Rotman lenses 2362-2368, is calculated according to equation (9):

$$\text{Scaling factor} = 2 \times \left(\frac{N-1}{2}\right)^2 \tag{9}$$

assuming the array of antennas 402 is an N×N array. That is, the feedline having the least delay and the feedline having the greatest delay differ in delay amount by the scaling factor. Using the 4×4 array of antennas 402 shown in FIG. 25 as an example (N−4), the scaling factor is 4.5. The scaling factor is in units of design wavelengths λ.

More generally, for an M×N rhombus array, we have:

$$\text{Scaling factor} = 2 \times \left(\frac{N-1}{2}\right) \times \left(\frac{M-1}{2}\right) \tag{10}$$

To convert this into a square device, i.e., to make both the antenna and the far field pixel arrays rectangular, multiply the delay lengths by a correction factor of $(1+1/N^2)$, where N is the number of rows/number of ports on the smaller Rotman lenses.

Thus, a more general equation for the scaling factor for an N×M device (N rows, M columns) is:

$$\text{Scaling factor} = 2 \times \left(\frac{N-1}{2}\right) \times \left(\frac{M-1}{2}\right) \times \left(1 + \frac{1}{N^2}\right) \tag{11}$$

Thus, for example, a 4×5 square device (4 rows and 5 columns) has a maximum delay difference of 6.375.

For each column j 2502-2508, relative delays among the feedlines of the column vary from:

$$-\left(\frac{N-1}{2}\right)j\lambda \tag{12}$$

to:

$$+\left(\frac{N-1}{2}\right)j\lambda. \tag{13}$$

For example, using the 4×4 antenna array 402 shown in FIG. 25, the relative delays among the feedlines in the first column (column number −1.5) of feedlines vary from −2.25 to +2.25, i.e., a maximum difference of 4.5, which is consistent with the above-calculated scaling factor.

Continuing with the 4×4 array of antennas 402 of in FIG. 25, Table 1 lists a relative amount of delay in each feedline between the respective first and second stages 2302 and 2304 (first beamforming networks 2308-2312 (FIG. 25) and second beamforming networks 2314-2318), with positive numbers corresponding to effectively longer paths than negative numbers. Columns of Table 1 correspond to columns 2502-2508 (ex., Column number −1.5, Column number −0.5, etc.) of feedlines in the two-dimensional beamforming network 420, and rows of Table 1 correspond to individual feedlines (ex., Feedline number −1.5, Feedline number −0.5, etc.) of a given column 2502-2508.

TABLE 1

Relative Path Delays Between First and Second Stage BFNs

|  | Column −1.5 | Column −0.5 | Column +0.5 | Column +1.5 |
|---|---|---|---|---|
| Feedline −1.5 | −2.25 | −0.75 | +0.75 | +2.25 |
| Feedline −0.5 | −0.75 | −0.25 | +0.25 | +0.75 |
| Feedline +0.5 | +0.75 | +0.25 | −0.25 | −0.75 |
| Feedline +1.5 | +2.25 | +0.75 | −0.75 | −2.25 |

Corner values in Table 1 may be calculated according to equations (12) and (13). Intermediate values in the top and bottom rows, and in the left and right columns, are evenly distributed between the values in the ends of the row or column, assuming the antennas 404-410, of the array of antennas 402, are regularly spaced apart. Each central sub-square of Table 1 can be similarly calculated, as though the sub-square represents a smaller M×M array. For example, the sub-square that consists of four central cells (−0.5 to +0.5 × −0.5 to +0.5) can be treated as though it represents a 2×2 array.

In one embodiment, if N is odd, and the central set 600-606 of antennas 404-410 is centered on the center line 2510 (FIG. 25), the center row of Table 1 and the center column of Table 1 contain all zeros.

Corners of Table 1 may also be calculated using the scale factor, since opposite ends of the top and bottom rows, and opposite ends of the left and right columns have differences equal to the scale factor.

Figure 27:
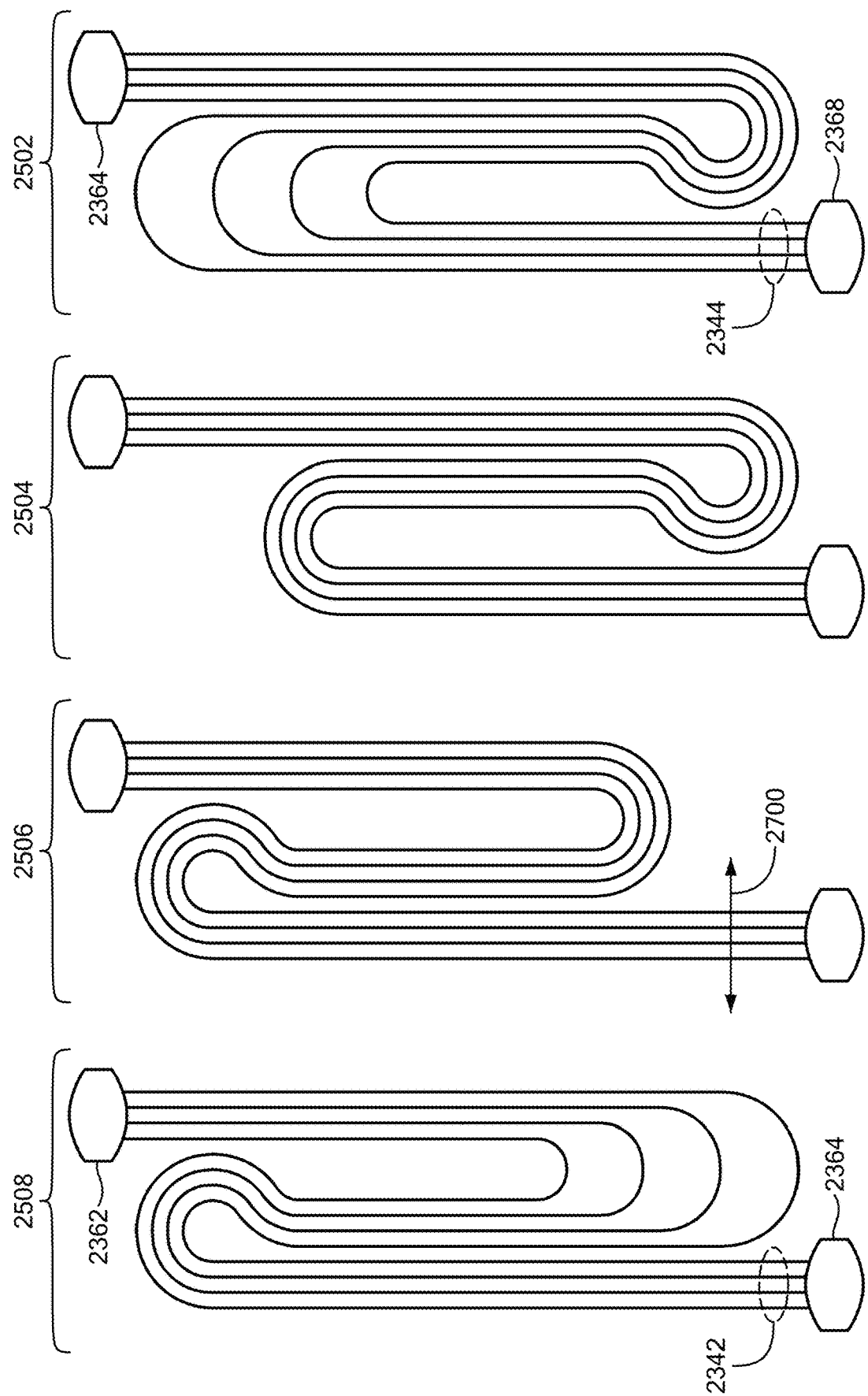
FIG. 27 illustrates an exemplary meandering arrangement of feedlines for implementing the delays of FIG. 26, according to an embodiment of the present invention.

Note that cells in Table 1 contain relative delay amounts, among the feedlines between the respective first and second stages 2302 and 2304. Clearly, negative absolute delay amounts are physically impossible to implement. However, using the meandering arrangement 1700 described herein with reference to FIGS. 17-20, any desired monotonically increasing relative delays can be implemented laterally across each column 2502-2508 of feedlines, for example as shown in FIG. 27. In this context, "laterally" means across one of the columns 2502-2508 or across the entire set of columns 2502-2508, left-to-right or right-to-left (as the case may be), for example as indicated by double-headed arrow 2700. "Monotonically" has its ordinary mathematical meaning.

Feedlines with the smallest path delays (for example, −2.25 in Table 1) are shortest, and feedlines with greater path delays (for example, Feedline+1.5 in Column+0.5, with a relative delay of −0.75) are made suitably longer, so as to impose more delay, such that the relative delays in the feedlines are as prescribed above. Thus, the relative delay amounts shown in Table 1 may be implemented with a meandering arrangement 1700, along the lines shown in FIG. 27.

As an additional example, FIG. 43 contains Table 2 of relative path delays between first and second stage beam-forming networks for an exemplary broadband 7×7 antenna array (not shown).

Thus, in an antenna system with a design wavelength λ, the beam-side interface (2336-2340) of each second beam-forming network (2304, 2314-2318) may be communicably coupled to the beam-side interface (2322-2326) of the associated first beamforming network (2302, 2308-2312) by a respective associated first coupling (2342-2344, 2502-2508), thereby collectively defining a plurality of first couplings. Each non-central first coupling (2342-2344, 2502-2508) is configured to delay signals of wavelength λ propagating therethrough by a respective relative delay amount. The delay amount varies monotonically transversely across the non-central first coupling (2342-2344, 2502-2508).

FIGS. 28-34 illustrate how progressively increasing the relative delays in the feedlines of the columns 2502-2508 progressively shifts the pixels from a one-dimensional beamforming arrangement (when operating in broadband), as discussed with respect to the left portion of FIG. 26, to a two-dimensional beamforming arrangement. In each of FIGS. 28-34, relative delays in respective feedlines are represented by heights of bars in a bar graph on the left, and a resulting pixel mapping is shown on the right. The color/hash code 2600 of FIG. 26 also applies to the right portions of FIGS. 28-34. FIGS. 28-34 were generated based on red (644 nm), green (560 nm) and blue (476 nm) signals, with green representing the design wavelength, and red and blue representing the design wavelength+15% and −15%, respectively.

As noted, for an N×N device, a p % change in wavelength of a signal fed to a given beam-side interface port 428-432 (FIG. 4) causes a change in direction of the beam equal to about N×p % of the beam size (effective pixel size) per row moved away from the center. Consequently, the spectrum of each pixel of a broadband signal is somewhat "smeared" in the field of view. For example, for a 5% bandwidth, the smearing is 5% per row moved away from the central broadband row. For example, in FIG. 28, the row 2800 of pixels located two rows above the central row 2802, and the row 2804 located two rows below the central row 2802, i.e., +0.0.25 along the sin(Y Angle) axis, have 10% bandwidth smearing. The percentage is a ratio of the size of the grating lobe-free field of view (size of box 502 in FIG. 5), which means the smearing is about N times the spot size. The rows also shift left by one field-of-view per row moved upwards, and one field-of-view right per row downwards. Following a given pixel, as we move up a row, the movement of the pixel is mostly leftwards, offset by angle 1500 (FIG. 15). This direction is also the direction of the smearing, as can be seen in the spots at (−0.25, 0.5) and (−0.75, 0.5) in the left-most image of FIG. 26.

Pixels that move in to fill in gaps caused by the leftward shifting rows as we move up from the central row act a bit differently, as can be seen in the spots at (0.25, 0.5) and (0.75, 0.5) in the left-most image of FIG. 26, but the amount of smearing is similar and in a different direction.

Figure 29:
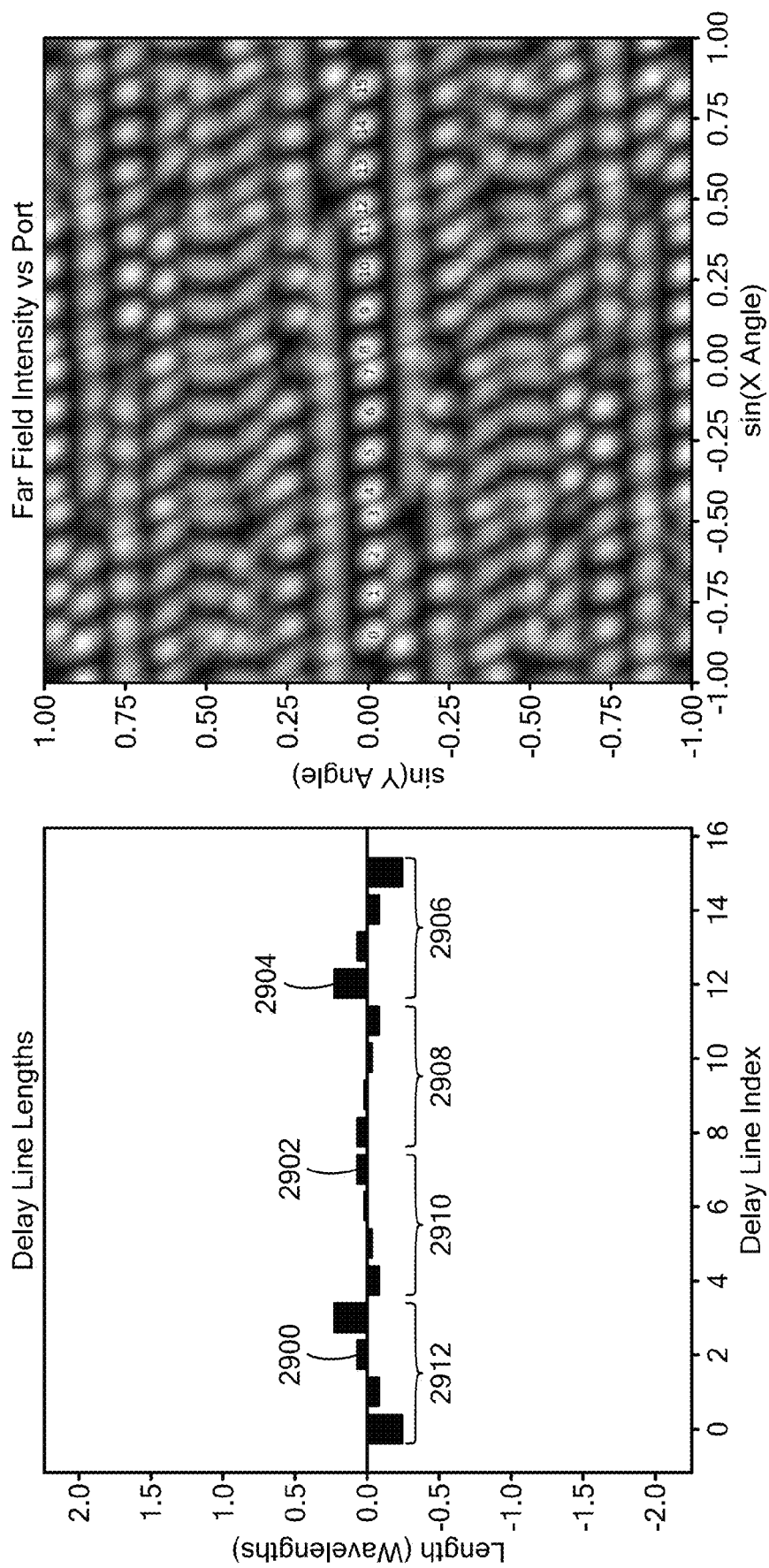
Figure 30:
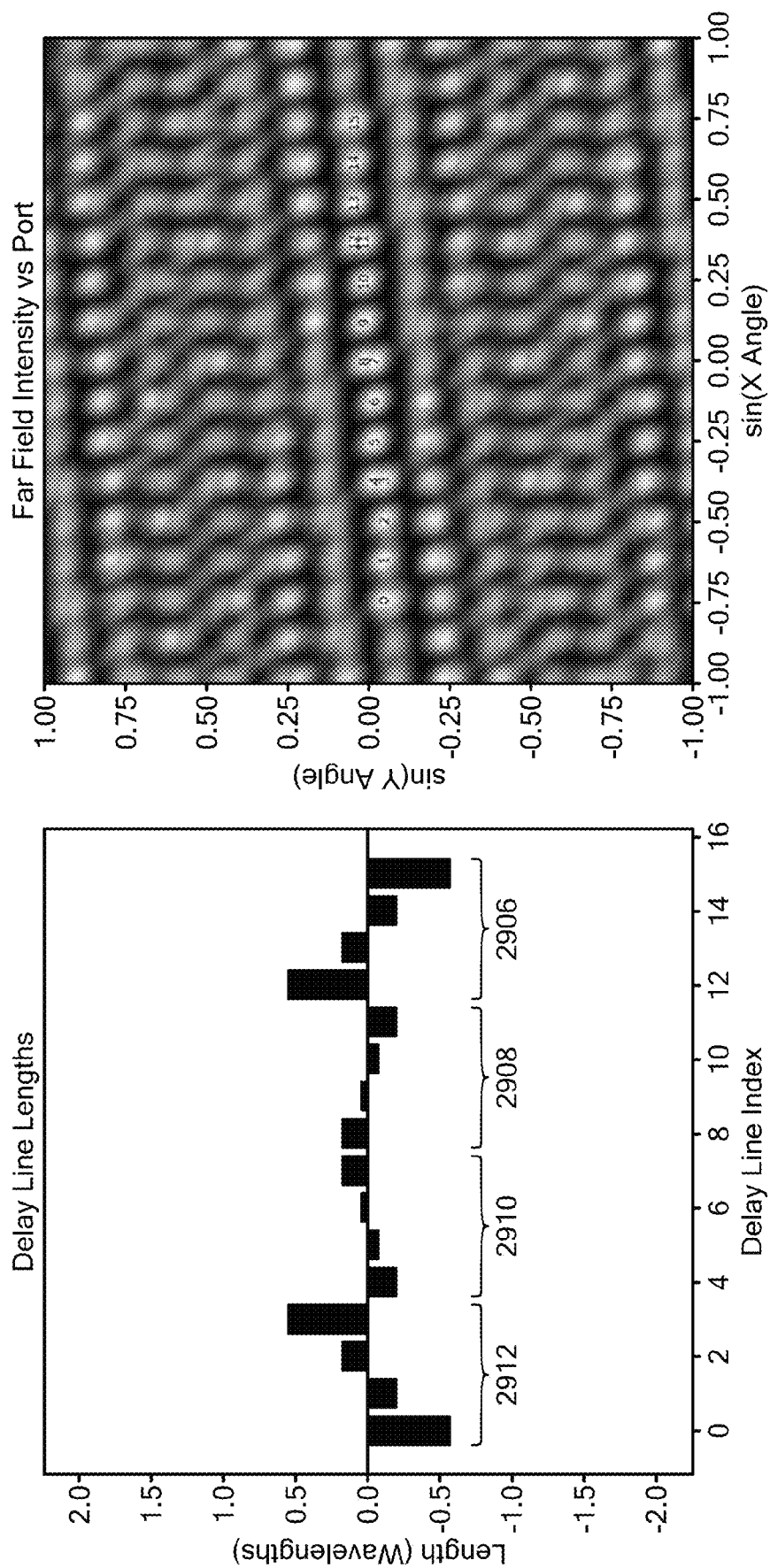
Figure 31:
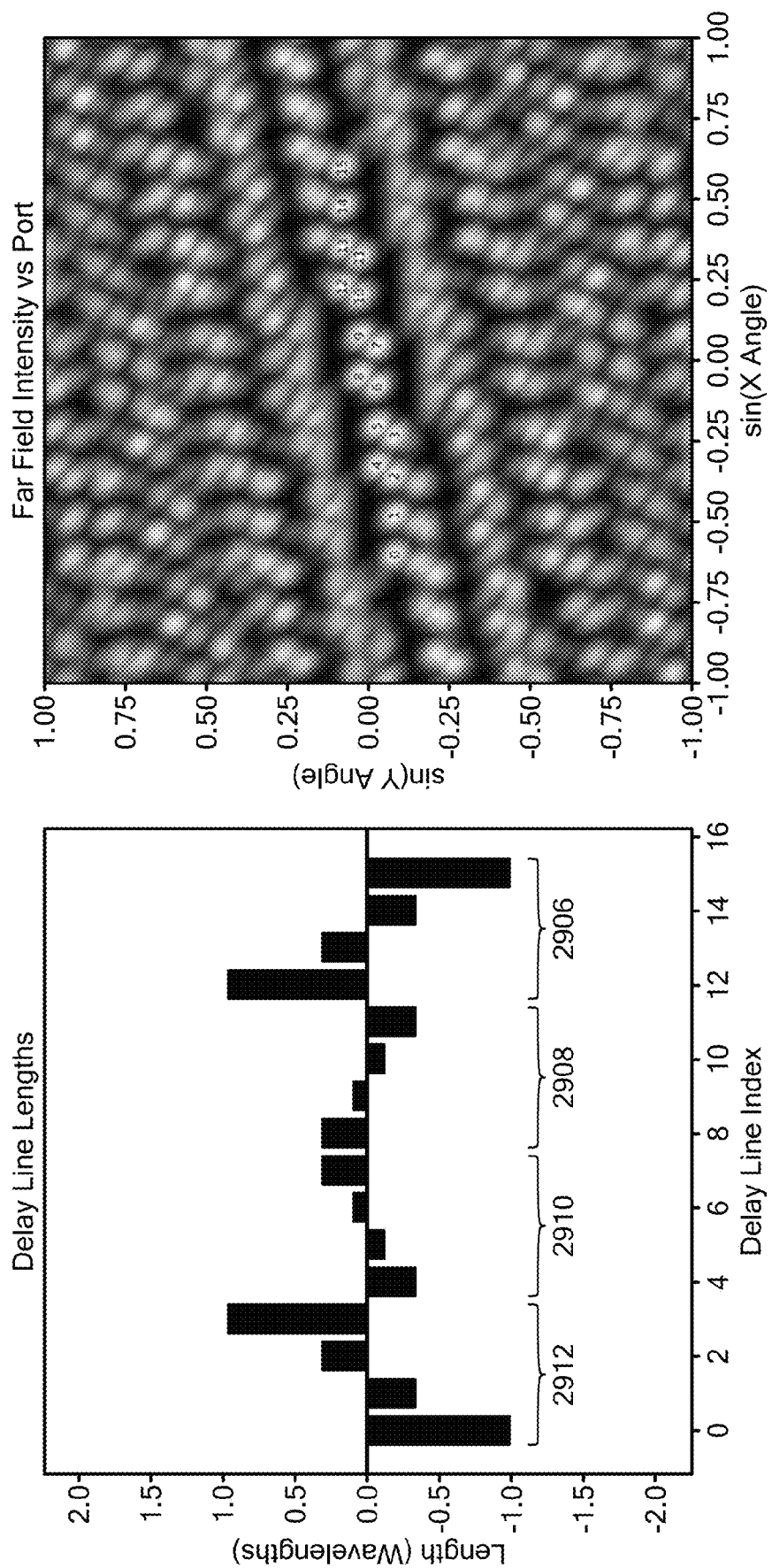
Figure 32:
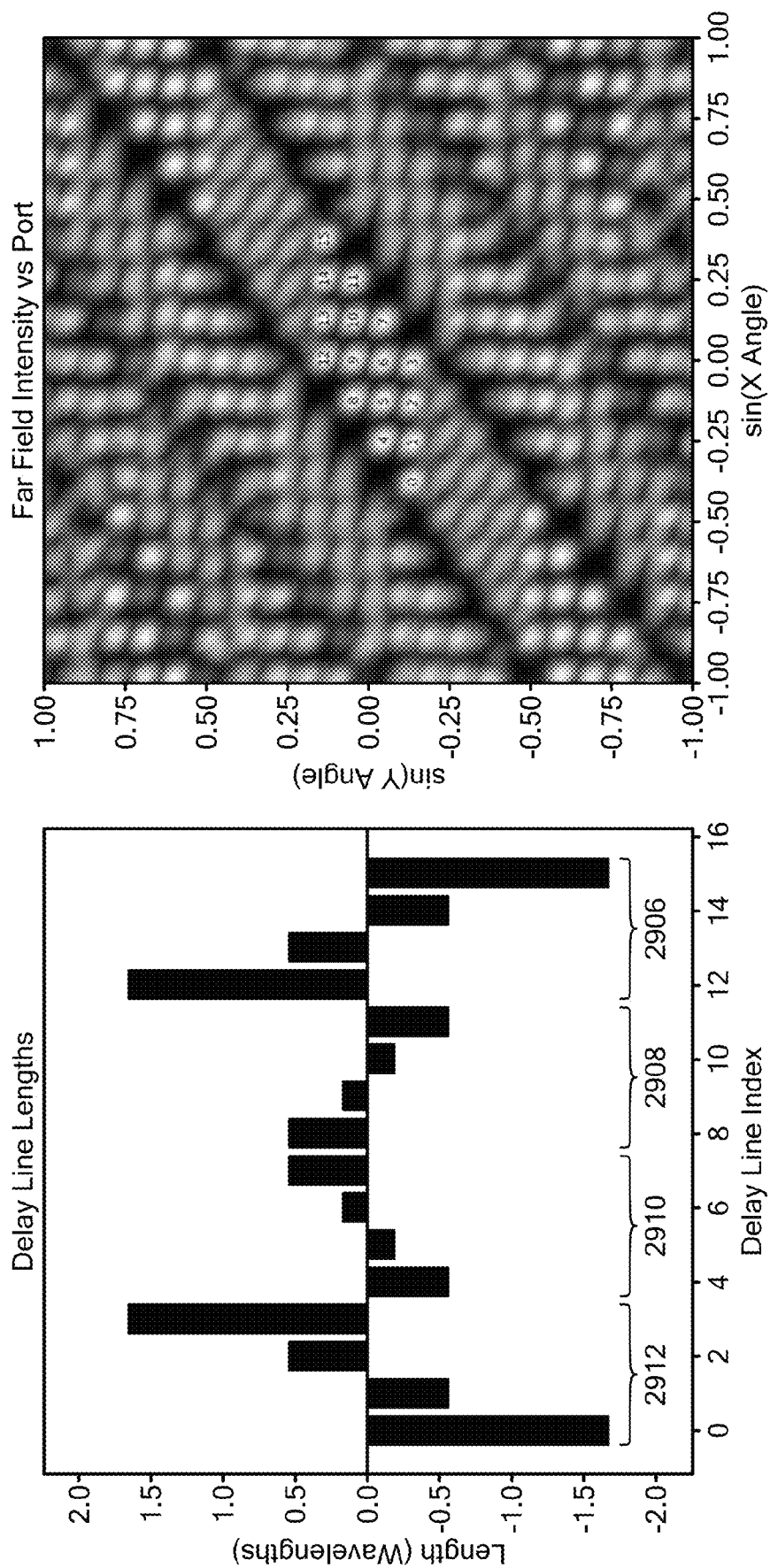
Figure 33:
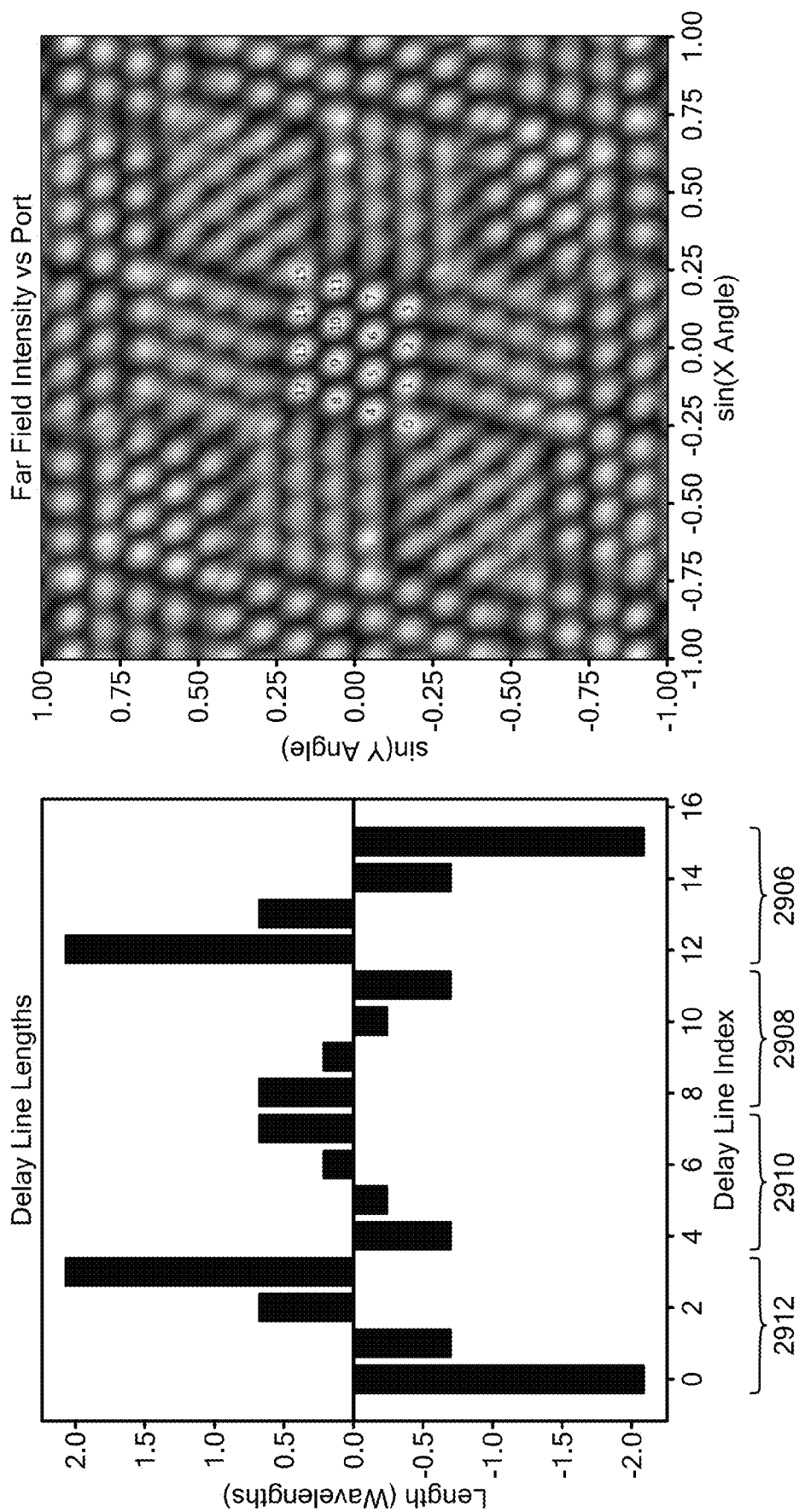
Figure 34:
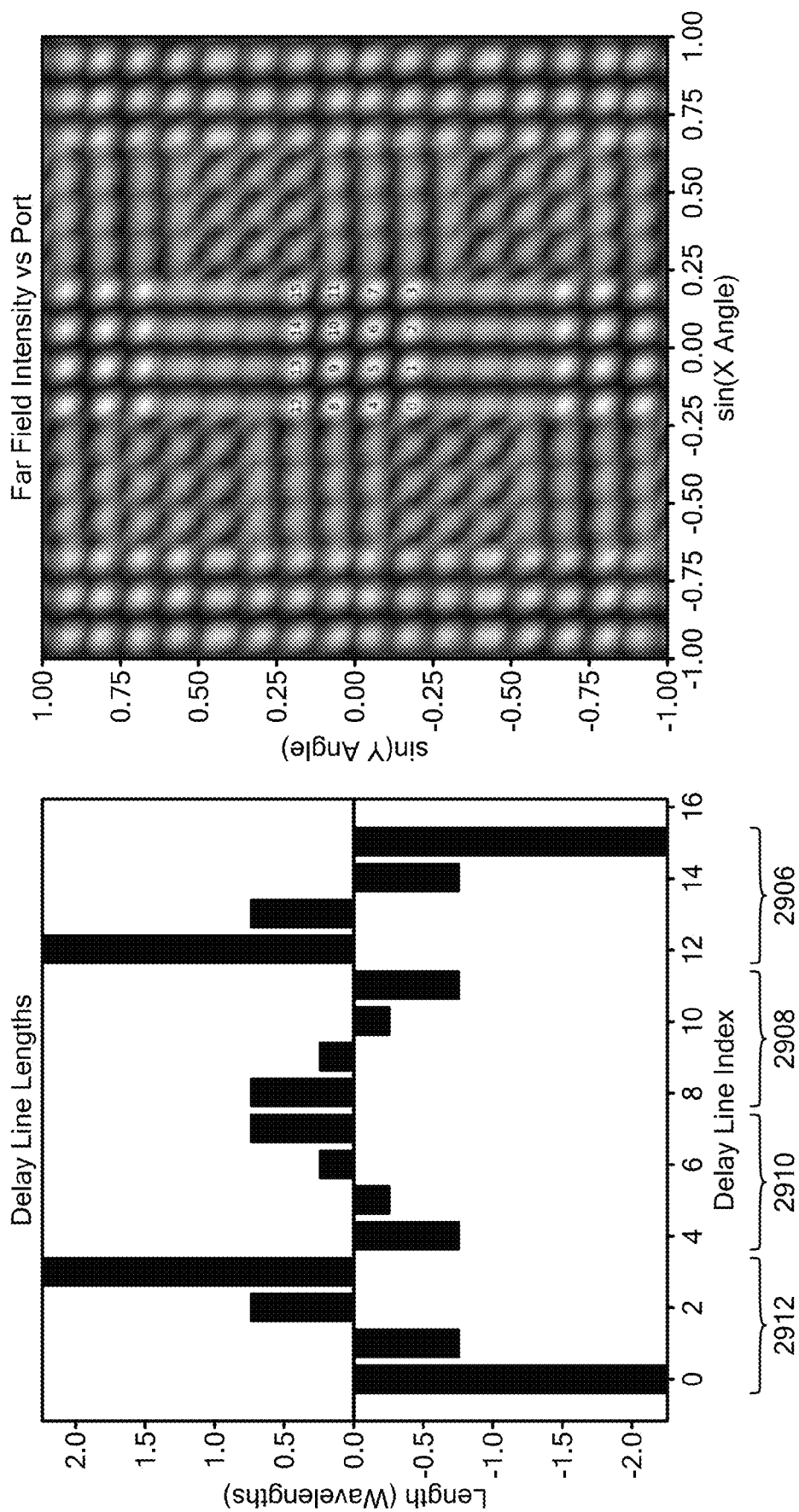

In FIG. 28, all the feedlines have identical delays, i.e., zero relative delay across all the feedlines in the feedline groups 2342-2344. In FIG. 29, bars, represented by bars 2900, 2902 and 2904, represent respective relative delays in the feedlines. Each group 2906, 2908, 2910 and 2912 of bars 2900-2904 corresponds to a respective column 2502-2508 of feedlines (FIG. 27). Bars 2900-2904 extending up from the horizontal axis represent positive relative delays, and bars 2900-2904 extending down from the horizontal axis represent negative relative delays. As noted, since negative real delays are impossible to implement, all the feedlines can be made appropriately longer, so as to introduce the relative delays shown. As can be seen, for example in FIGS. 32-34, with appropriate delays, as calculated according to equations (7) to (13), a square pixel grid can be achieved.

Operation of the antenna system 400 may be described as follows. Each Rotman lens 2362-2364 (FIG. 23) in the first stage 2302 selects a particular delay line in its respective group of feedlines 2342-2344, based on an angle of incidence at which a plane wave impinges on the array of antennas 402, along the column (vertical) direction. All signal from a particular column goes through that delay line and incurs a corresponding delay. Each Rotman lens 2366-2368 in the second stage 2304 separates the signal from that delay line back out and spreads the signal over its set of waveguides. The lengths of the delay lines differ for each column, such that a phase slope is imposed between columns. The Rotman lens 422 in the third stage 2306 takes all of the inputs and focuses them to a port, based on the total slope.

Parallelogram Antenna Array and/or Pixel Array

Figure 35:
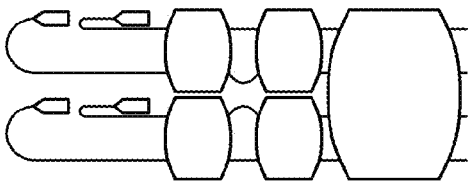
FIG. 35 illustrates a tilting of antennas and resulting tilt in pixels of the crossover-free antenna system of FIGS. 4, 6 and 23, according to an embodiment of the present invention.
Figure 35:
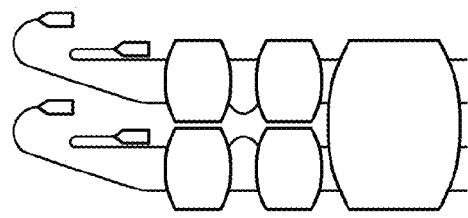
Figure 35:
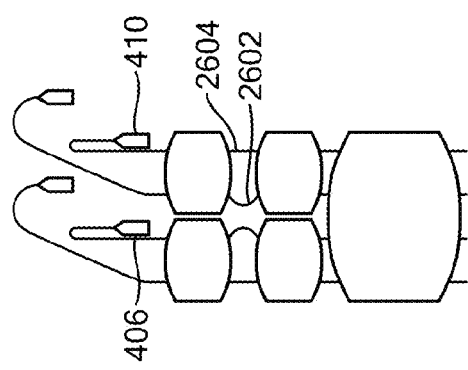
Figure 35:
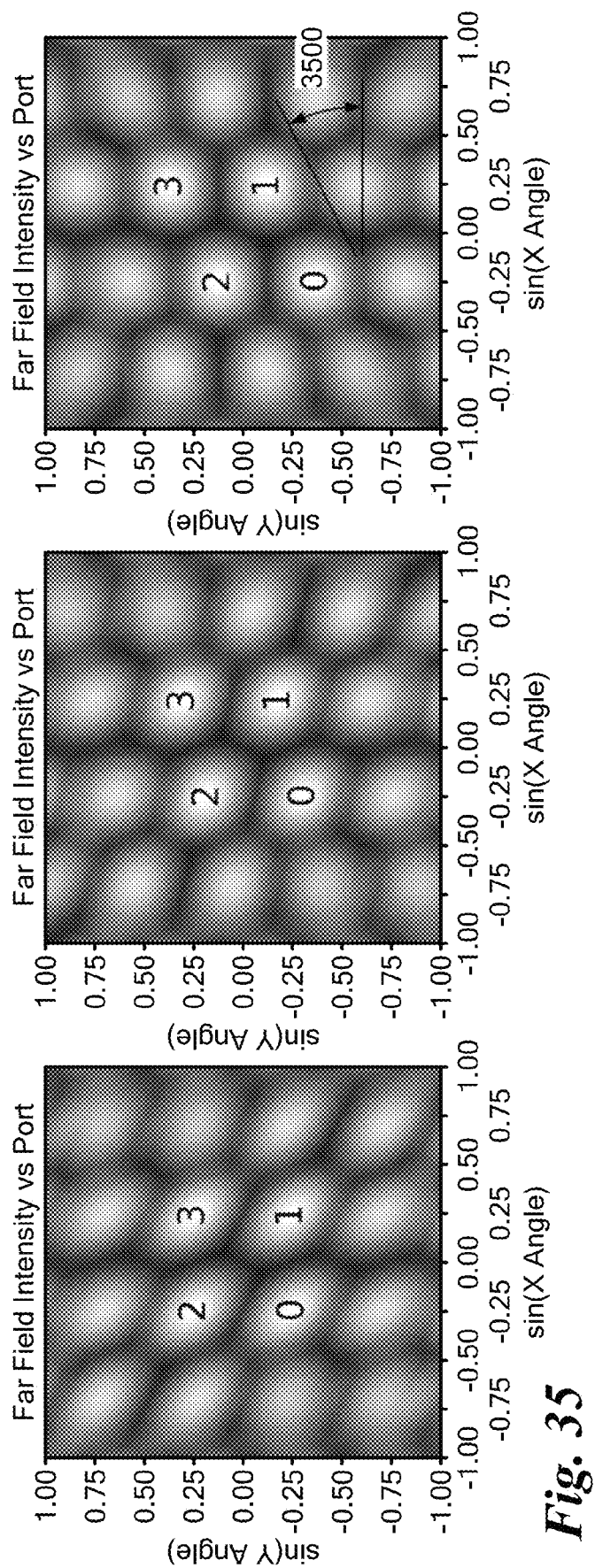

As noted, a parallelogram layout of antennas can pose manufacturing challenges. The left portion of FIG. 35 illustrates a simplified version of the antenna system 400 and its corresponding pixel map, similar to the right portion of FIG. 24, except the antenna system in FIG. 35 includes the relative path delays described herein in the feedlines 2602-2604. Consequently, the antenna system of FIG. 35 operates in broadband. The color/hash code 2600 of FIG. 26 also applies to FIG. 35.

The left portion of FIG. 35 illustrates a parallelogram layout of antennas, which may pose challenges. For example, if a lens array (not shown) is disposed between the antennas 406-410 and the far field, a custom lens array may be required. As noted, the antennas 406-410 can be shifted to form a square grid, as shown in the right portion of FIG. 35. The center portion of FIG. 35 shows an intermediate shift of the antennas 406-410. Although a square grid of antennas 406-410 allows use of a more conventional lens array, the square antenna grid distorts the beam pattern into a parallelogram by tilting the horizontal dimension to a slope of about 1/N.

Figure 36:
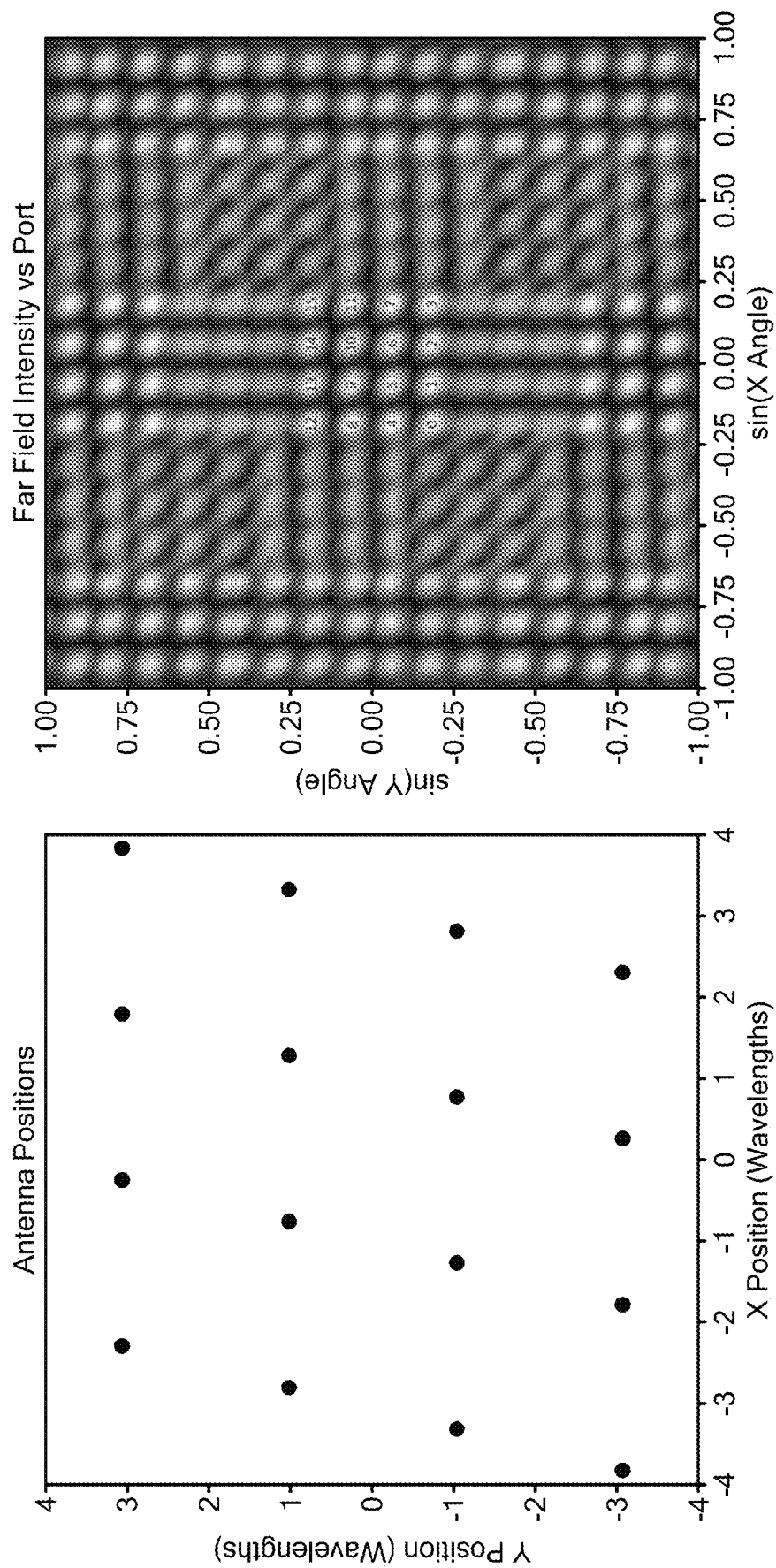
FIGS. 36-37 illustrate a similar relationship between tilting antennas and tilt in pixels, for a larger array of antennas than in FIG. 35, according to an embodiment of the present invention.
Figure 37:
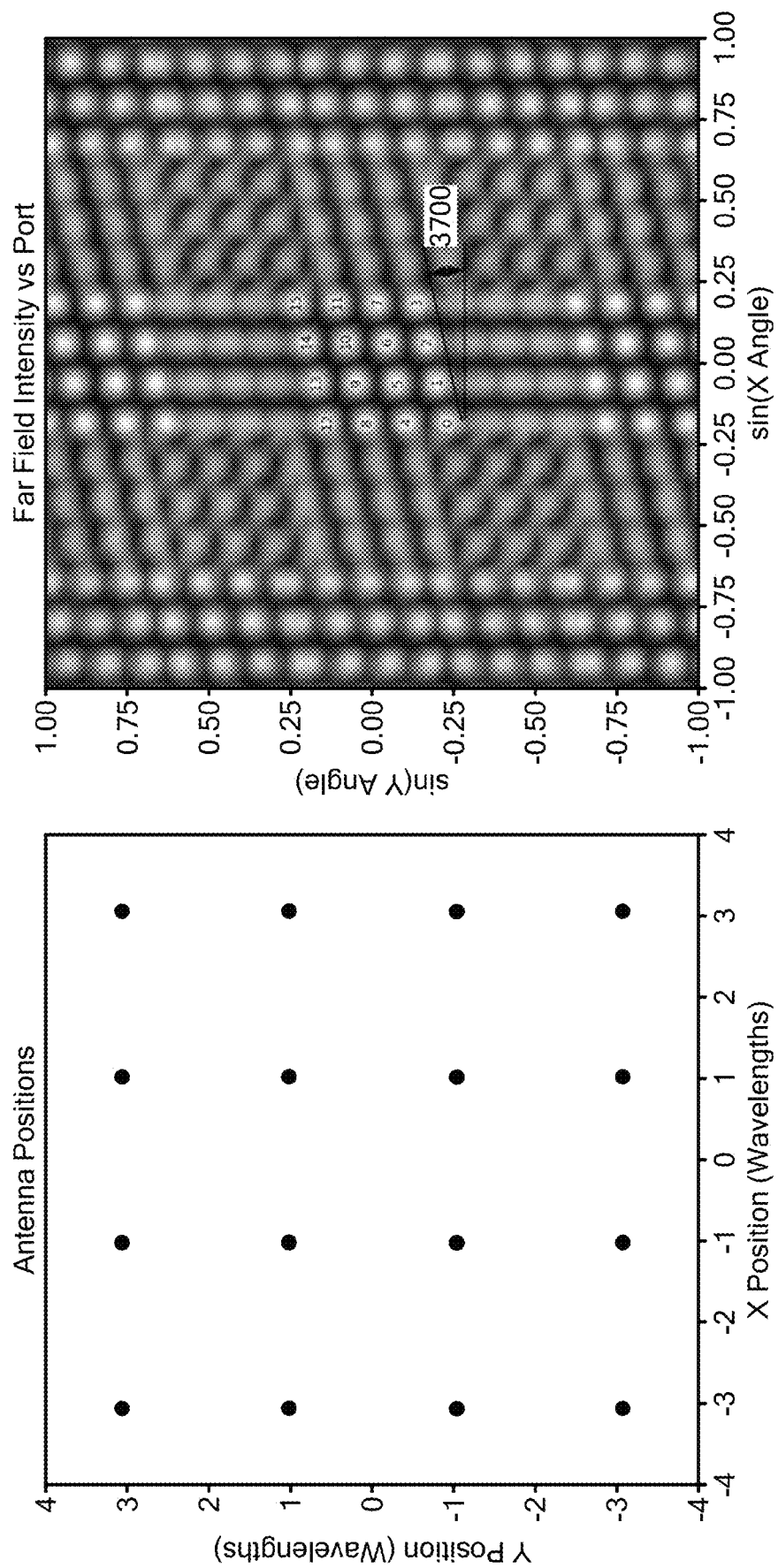

However, as noted, larger values of N cause less slope, as illustrated by comparing FIG. 35 and FIGS. 36-37. FIG. 36 is similar to FIG. 15, and FIG. 37 is similar to FIG. 16, except that the antenna system 400 represented in FIGS. 36 and 37 includes the relative path delays described herein in the feedlines 2602-2604. The color/hash code 2600 of FIG. 26 also applies to FIGS. 36-37. The value of N in FIGS. 36 and 37 is greater than the value of N in FIG. 35. Consequently, the slope 3700 (FIG. 37) is less than the slope 3500 (FIG. 35).

Antenna Spacing and Pixel Size

Figure 38:
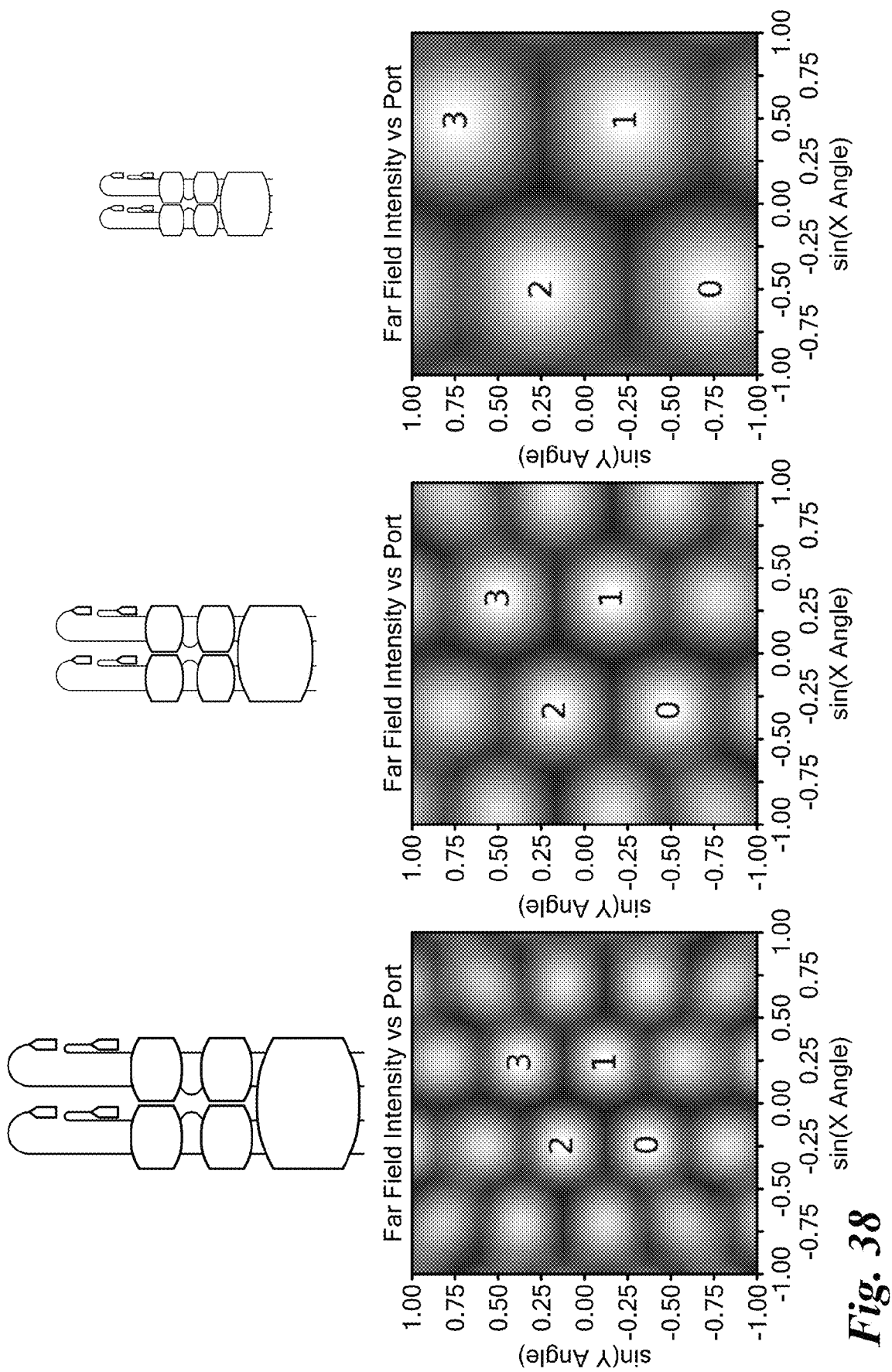
FIG. 38 illustrates an inverse relationship between antenna spacing and pixel size, according to an embodiment of the present invention.

Spacings between the antennas of the antenna system 400 affect the sizes of the pixels, as illustrated in FIG. 38. The left portion of FIG. 38 is similar to the right portion of FIG. 35, and the color/hash code 2600 of FIG. 26 applies to FIG. 38. The antennas of the antenna system 400 are progressively closer together in the center and right portions of FIG. 38. As can be seen, the sizes of the pixels are progressively larger in the center and right portions of FIG. 38.

Figure 39:
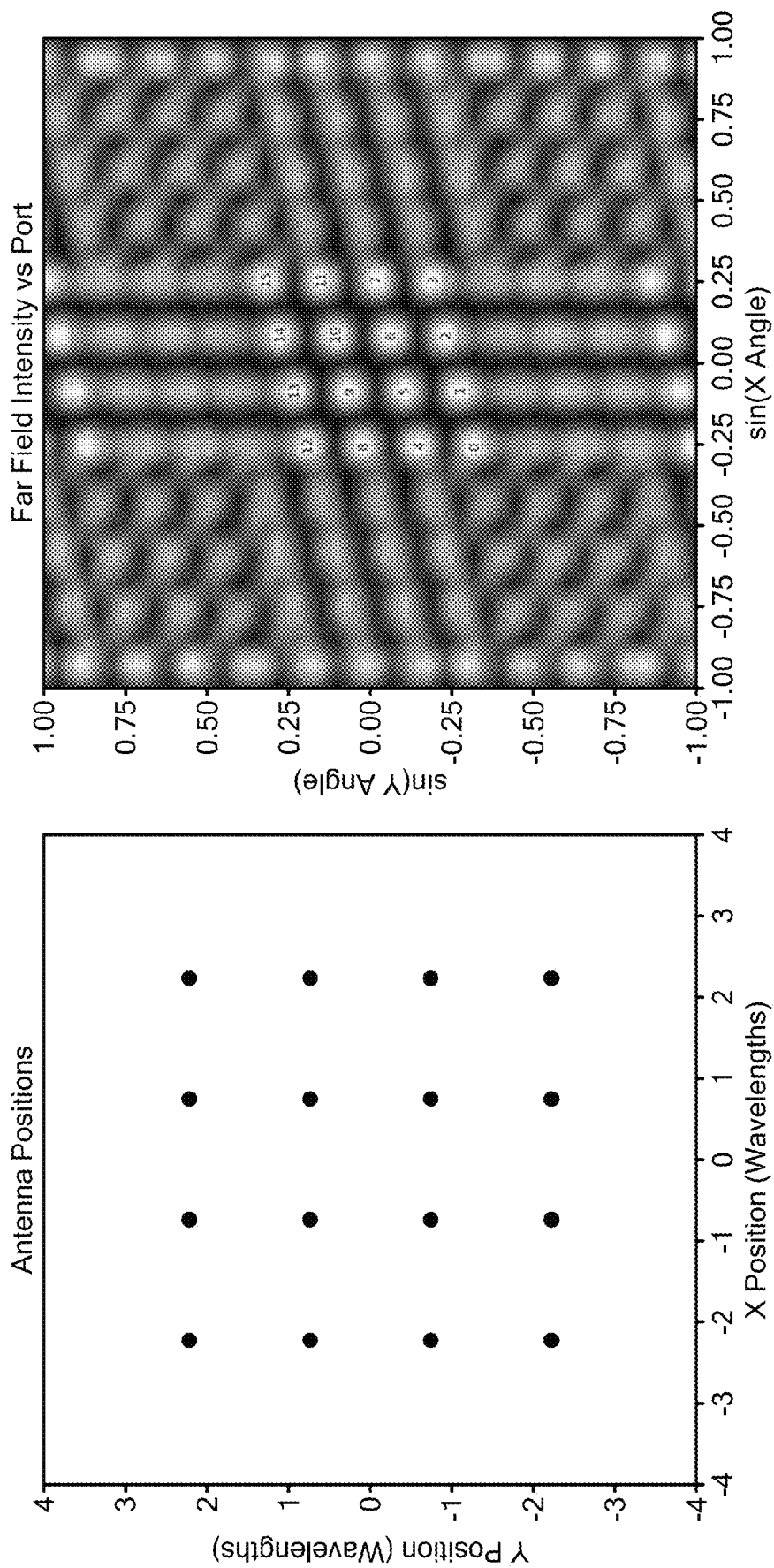
FIGS. 39-41 illustrate a similar relationship between antenna spacing and pixel size, for a larger array of antennas than in FIG. 38, according to an embodiment of the present invention.
Figure 40:
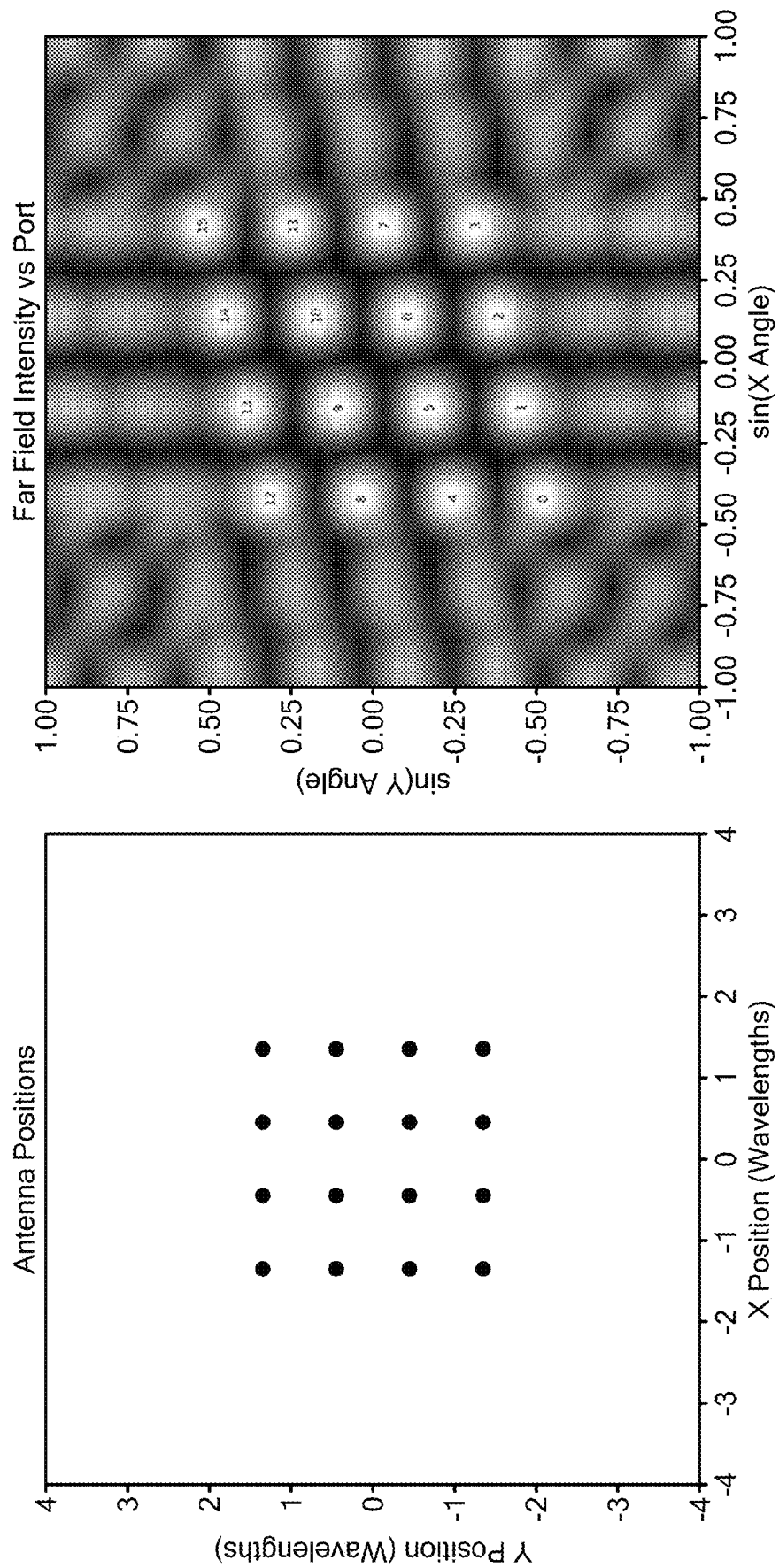
Figure 41:
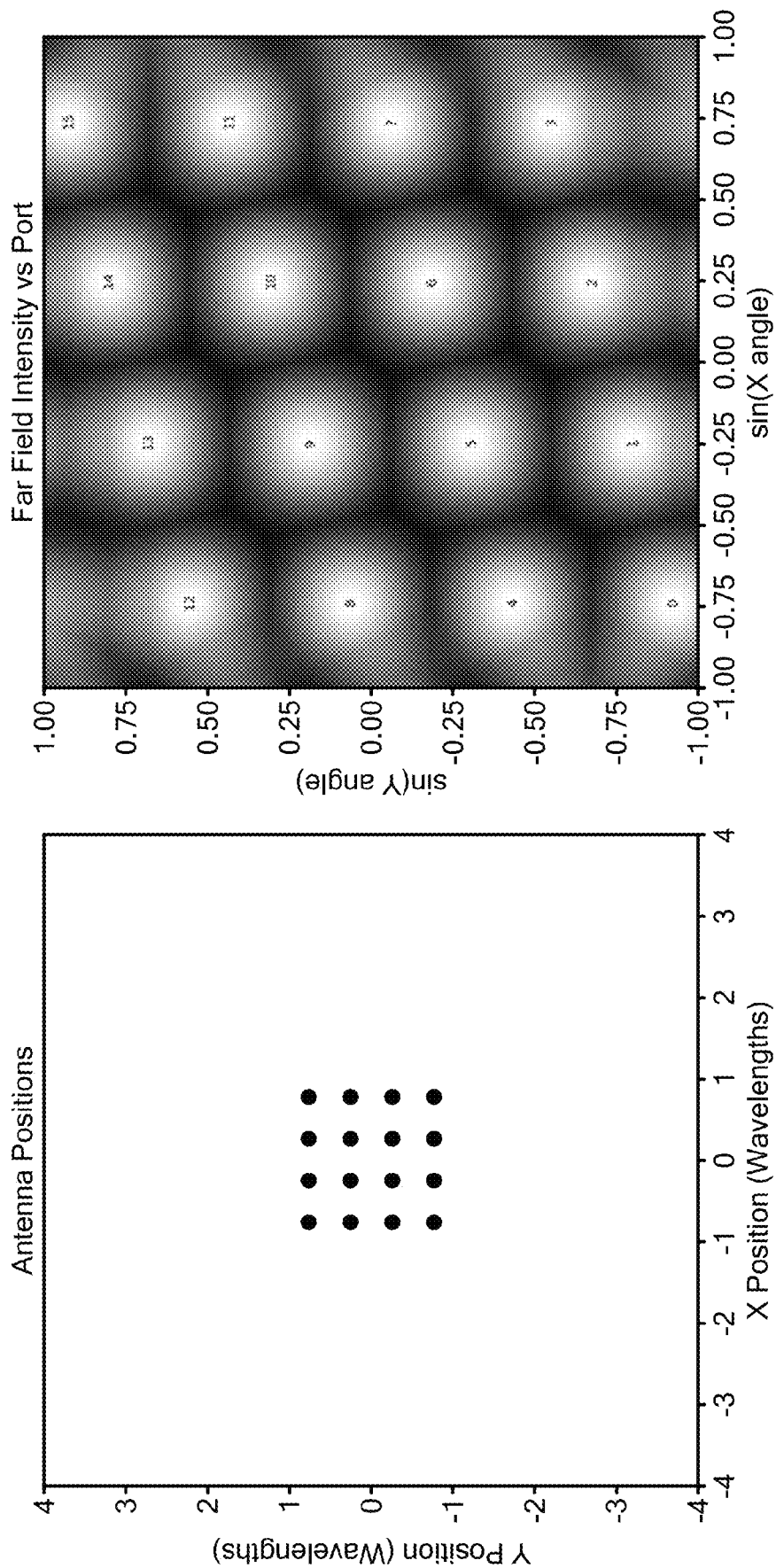

The relationship between antenna spacing and pixel size is further illustrated for a larger antenna system 400 in FIGS. 39-41. The color/hash code 2600 of FIG. 26 also applies to FIGS. 39-41. FIGS. 39-41 show progressively smaller spacings between antennas of the antenna system 400 and corresponding progressively larger pixel sizes. For systems in which a smaller field of view is manageable or desirable, keeping a larger antenna spacing is also an option. Instead of pushing the grating lobes outwards until they disappear at the edge of angle space by decreasing the antenna spacing as in FIGS. 38-41, the grating lobes can instead be suppressed while the broadband main lobes are kept and the size of the field of view maintained by using a lens array or another antenna-wise light collecting method.

Continuous Medium Delay Lines

Figure 44:
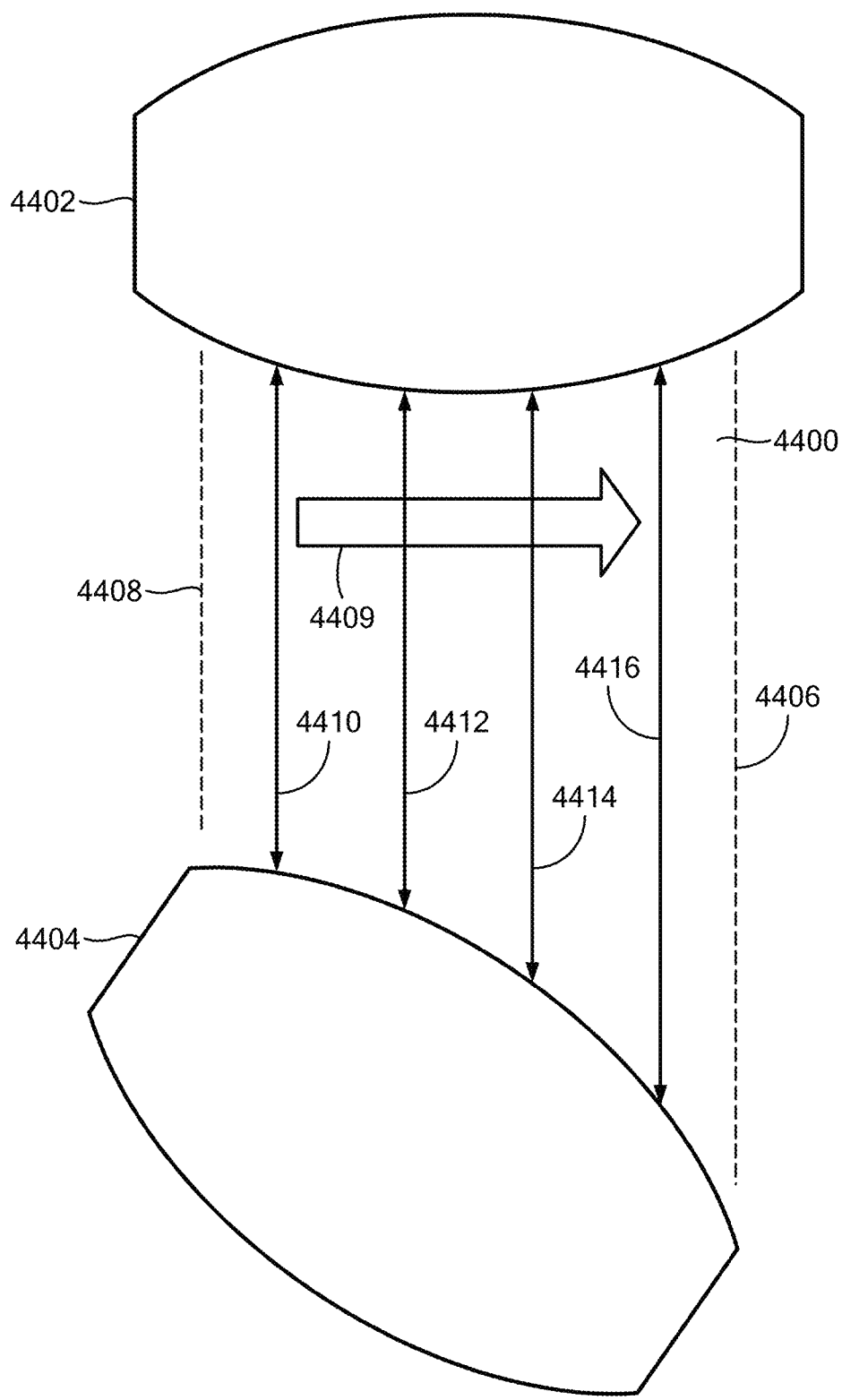
FIG. 44 illustrates an electromagnetic coupling between first and second beamforming networks provided by a continuous bulk medium, rather than individual waveguides, according to an alternative embodiment of the present invention.

Although the feedline groups 2342-2344 between first and second stages 2302 and 2304 have been described as being made up of discrete feedlines, in another embodiment, an exemplary portion of which is shown in FIG. 44, an electromagnetic coupling between the first and second stages 2302 and 2304 is provided by a continuous bulk medium 4400, such as oil, air or a full or partial vacuum. The medium 4400 extends continuously vertically between the two stages 2302 and 2304, here represented by two Rotman lenses 4402 and 4404, and horizontally at least between two boundaries 4406 and 4408 that extend parallel to a direction of propagation of EM signals between the two Rotman lenses 4402 and 4404. All the EM signals that propagate between the two Rotman lenses 4402 and 4404 propagate within a width defined by the two boundaries 4406 and 4408.

One of the two Rotman lenses 4404 is disposed at a non-zero angle, relative to the other Rotman lens 4402, so the two Rotman lenses 4402 and 4404 are not parallel to each other. Consequently, distances traveled by EM signals between the two Rotman lenses 4402 and 4404 vary monotonically laterally 4409 across the medium 4400, as indicated by lengths of arrows 4410, 4412, 4414 and 4416. The arrows 4410-4416 represent respective paths taken by the EM signals between the two Rotman lenses 4402 and 4404. In some embodiments, Ulexite ($NaCaB_5O_6(OH)_6 \cdot 5H_2O$, hydrated sodium calcium borate hydroxide), sometimes known as TV rock, may be used for the medium 4400.

Other Considerations

Figure 42:
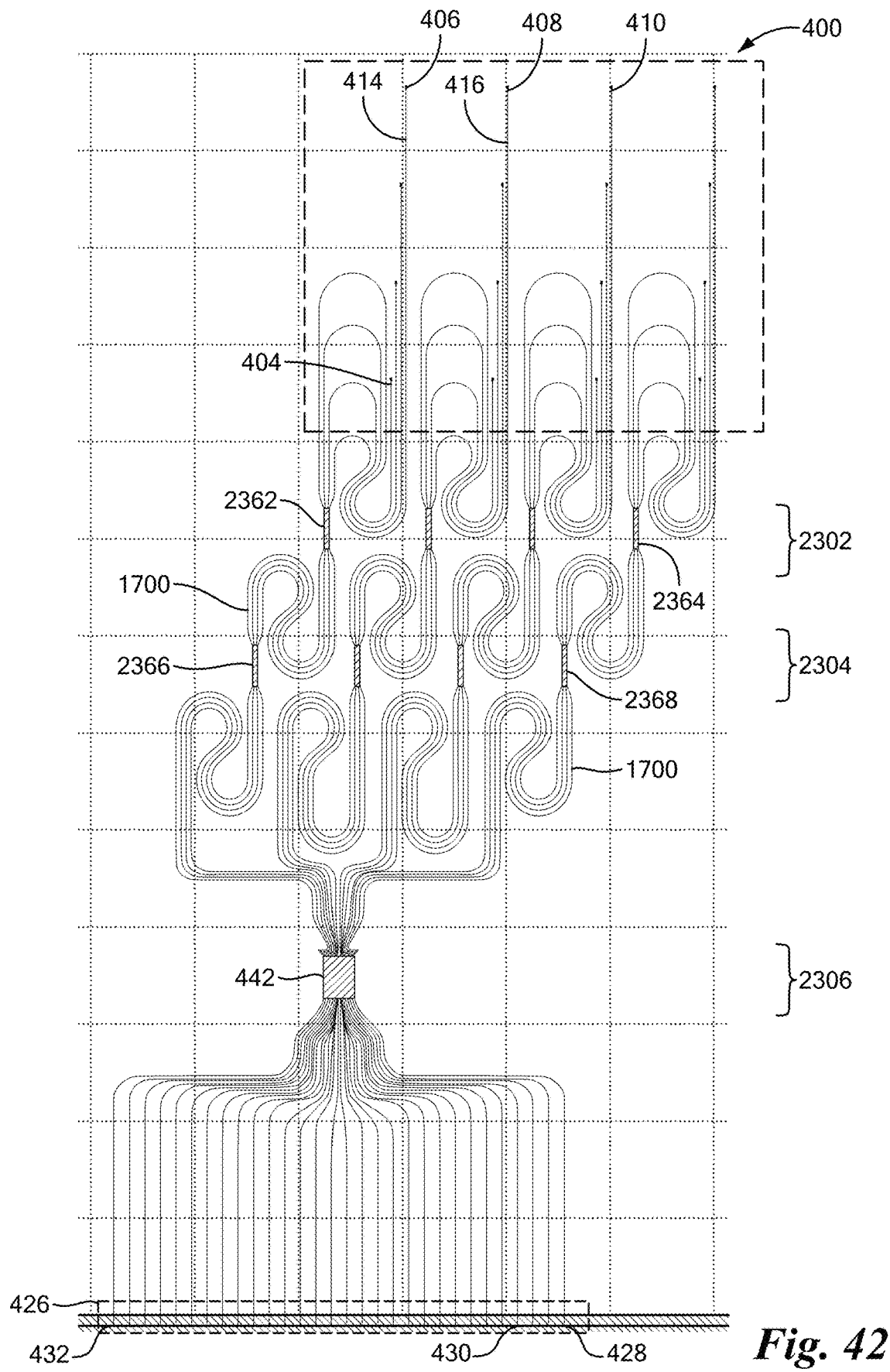
FIG. 42 is a scale drawing of a prototype 4×4 crossover-free antenna system capable of two-dimensional beamforming, fabricated on a photonic integrated circuit, according to an embodiment of the present invention.

FIG. 42 is a scale drawing of a prototype 4×4 crossover-free antenna system 400 capable of two-dimensional beamforming, fabricated on a photonic integrated circuit, including features described herein.

As noted with respect to FIGS. 15 and 16, either the array of antennas 402 or the pixel array is tilted. However, if the relative path delays between first and second stage beamforming networks are multiplied by a correction factor of $$1 + \left(\frac{1}{N}\right)^2,$$

both the array of antennas and the pixel array may be square.

More generally, for an N×M parallelogram-shaped antenna array 402, the maximum difference in delay (scaling factor) in the two-dimensional beamforming network 420 is calculated according to equation (14):

$$\text{Scaling factor} = 2 \times \left(\frac{N-1}{2}\right) \times \left(\frac{M-1}{2}\right) \tag{14}$$

To make it into a square device, i.e., both the antennas and the far field pixels are rectangular, rather than parallelograms, multiply the delay lengths by the correction factor of 1+2 2 Thus, the scaling factor equation for an N×M, i.e., N rows by M columns, antenna array 402 becomes:

$$\text{Scaling factor} = 2 \times \left(\frac{N-1}{2}\right) \times \left(\frac{M-1}{2}\right) \times \left(1 + \left(\frac{1}{N}\right)^2\right) \tag{15}$$

As examples: a 4×5 rectangular antenna array 402 has a maximum delay difference of 6.375; and a 4×4 parallelogram-shaped antenna array 402 has a maximum delay difference of 4.5.

The three stages 2302-2306 (FIG. 23) of the two-dimensional beamforming network 420 can be reversed, i.e., the Rotman lens 422 of the third stage 2306 can be coupled to the antenna array 402, and the Rotman lenses 2362-2364 of the first stage 2302 can be coupled to the beam ports 428-432. The two-dimensional beamforming network 420 implements a centered, discrete, two-dimensional Fourier transform, which is the same as its transpose, i.e. inputs and outputs swapped. The individual Fourier transform devices that make up the first, second, and third layers have a similar property in that they also function similarly forwards as backwards, so one or more of them may be reversed, without modifying the function of the overall device.

As with Rotman lens-based systems, signals can be simultaneously applied to more than one of the ports 428-432, or more than one segment, of the beam-side interface 426, and the antenna systems 400, 2300, 2500 and beamforming networks 420 described herein simultaneously produce multiple radiated beams, each in a different direction. Similarly, due to the reciprocity theorem, multiple signals simultaneously received from respective different directions by the antenna array 402 cause output signals to be simultaneously available at the corresponding ports 428-432, or segments, of the beam-side interface 426. In both receive and transmit cases, the multiple simultaneous signals need not necessarily have equal amplitudes or, especially in the case of broadband embodiments, equal wavelengths.

One advantage provided by embodiments of the present invention lies in the fact that increasing the number of pixels, or beams or antennas, along each dimension of the field of view 500 (FIG. 5) does not necessarily increase the number of distinct elementary components that are traversed by a photon passing through the antenna system 400, 2300, 2500. The two-dimensional beamforming network 420 can be considered as including a plurality of distinct elementary components. As used herein, a distinct elementary component is a signal handling component, such as a Rotman lens, a planar crossover, a phase shifter, a grating coupler, a resonator, or a waveguide. The word "elementary" is used to prevent the entire beamforming network being considered a single component. The word "distinct" is used, because some embodiments include multiple instances of a given component. For example, the antenna system 2300 described with respect to FIG. 23 includes four Rotman lenses 2362-2364 in the four first beamforming networks 2308-2312.

Each dimension of a grating lobe-free two-dimensional field of view 502-508 (FIG. 5) includes a respective number of pixels. In some embodiments, the two-dimensional beamforming network (420) is configured such that photons traverse, on average, a number of the distinct elementary components that is essentially constant, with respect to the number of pixels, or antennas or resolution, along each dimension of the grating lobe-free field of view (502-508). "Constant, with respect to the number of pixels" means that increasing the number of pixels, or beams or antennas, along each dimension does not necessarily increase the number of traversed components. This is valuable, since losses occur at component interfaces. Thus, increasing the number of pixels, or beams or antennas, along each dimension does not increase the total loss from component interfaces. As used herein, the term "photon" has its conventional meaning, i.e., the term photon applies to both light and radio frequency electromagnetic signals.

"On average" means relative to the amount of light, i.e., photons or flux. When we say a "photon passing through the antenna system," we mean the photon through the entire antenna system, between an antenna 404-410 and a port 428-432, or segment, of the beam-side interface 426.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within +20%. Terms, such as "equal path length," "equal to intra-element column spacing," and "parallel" mean within manufacturing tolerances.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. References to a "module" are for convenience and not intended to limit its implementation. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

The Rotman lenses, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

As used herein, numerical terms, such as "first," "second" and "third," are used to distinguish respective beamforming networks from one another and are not intended to indicate any particular order or total number of beamforming networks in any particular embodiment. Thus, for example, a given embodiment may include only a second beamforming network and a third beamforming network.

What is claimed is:

1. An antenna system comprising:
a plurality of disjoint sets of antennas, each disjoint set of antennas comprising a plurality of antennas of the array of antennas;
N second Fourier transform-based array phasers; and
N third Fourier transform-based array phasers; wherein:
each second Fourier transform-based array phaser is associated with a distinct disjoint set of antennas and has a respective array-side interface and a respective beam-side interface;
the antennas of each disjoint set of antennas are communicably coupled by respective non-crossing second couplings to the array-side interface of the associated second Fourier transform-based array phaser;
each third Fourier transform-based array phaser is associated with a distinct second Fourier transform-based array phaser and has a respective array-side interface and a respective beam-side interface;
the beam-side interface of each third Fourier transform-based array phaser is communicably coupled to the beam-side interface of the corresponding second Fourier transform-based array phaser by a respective non-crossing third coupling;
the array-side interface of each third Fourier transform-based array phaser is communicably coupled to the array-side interface of the first Fourier transform-based array phaser by a respective non-crossing fourth coupling; and
the non-crossing first coupling includes the non-crossing second couplings, the N second Fourier transform-based array phasers, the non-crossing third couplings, the N third Fourier transform-based array phasers, and the non-crossing fourth couplings.

2. The antenna system of claim 1, wherein:
each third coupling includes a respective distinct ordered plurality of third waveguides;
waveguides of each ordered plurality of third waveguides are configured to delay signals propagating therethrough by respective delay amounts; and
each ordered plurality of third waveguides is configured such that the delay amount varies monotonically transversely across the ordered plurality of third waveguides.

3. The antenna system of claim 1, wherein:
each fourth coupling includes a respective distinct ordered plurality of fourth waveguides;
waveguides of each ordered plurality of fourth waveguides are configured to delay signals propagating therethrough by respective delay amounts; and
each ordered plurality of fourth waveguides is configured such that the delay amount varies monotonically transversely across the ordered plurality of fourth waveguides.

* * * * *